United States Patent
Katoh et al.

(10) Patent No.: US 9,925,845 B2
(45) Date of Patent: Mar. 27, 2018

(54) HEAT EXCHANGE SYSTEM

(75) Inventors: Yoshiki Katoh, Chita-gun (JP); Atsushi Inaba, Okazaki (JP); Satoshi Itoh, Kariya (JP); Masahiro Shimoya, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 445 days.

(21) Appl. No.: 13/996,232

(22) PCT Filed: Dec. 20, 2011

(86) PCT No.: PCT/JP2011/007120
§ 371 (c)(1),
(2), (4) Date: Jun. 20, 2013

(87) PCT Pub. No.: WO2012/086187
PCT Pub. Date: Jun. 28, 2012

(65) Prior Publication Data
US 2013/0283835 A1  Oct. 31, 2013

(30) Foreign Application Priority Data

Dec. 21, 2010  (JP) ................................. 2010-284830
Dec. 13, 2011  (JP) ................................. 2011-272273

(51) Int. Cl.
*F25D 17/00*  (2006.01)
*B60H 1/00*  (2006.01)
(Continued)

(52) U.S. Cl.
CPC ..... *B60H 1/00335* (2013.01); *B60H 1/00328* (2013.01); *B60H 1/00342* (2013.01);
(Continued)

(58) Field of Classification Search
CPC ............ B60H 1/00335; B60H 1/00735; B60H 1/00921; B60H 1/00328; B60H 1/00342;
(Continued)

(56) References Cited

U.S. PATENT DOCUMENTS 4,248,292 A * 2/1981 Beacham ................ F25B 49/02
165/50
4,378,087 A * 3/1983 Sakurai .............. B60H 1/00842
165/42
(Continued)

FOREIGN PATENT DOCUMENTS

EP  1108575 A1  6/2001
JP  63-306353 A  12/1988
(Continued)

OTHER PUBLICATIONS

Shinichi et al., Air Conditioner, Nov. 5, 2009, WO2009133640A1, Whole Document.*
(Continued)

*Primary Examiner* — Larry Furdge
(74) *Attorney, Agent, or Firm* — Harness, Dickey & Pierce, P.L.C.

(57) ABSTRACT

A heat exchange system for realizing an adequate heat exchange among a plural type of fluids uses a refrigerant radiator and a radiator which are combined to have one unit for enabling heat exchange between a refrigerant and a coolant, and decreases an inflow amount of the coolant flowing into the radiator when coolant temperature of the coolant flowing into the radiator is equal to or higher than a second standard temperature, which is set to be lower than a temperature of the refrigerant flowing into the refrigerant radiator, and is equal to or lower than a predetermined first standard temperature. In such manner, heat from the refrigerant is effectively transferred to an outside air by reducing (Continued)

an unwanted heat exchange between the refrigerant and the outside air.

14 Claims, 16 Drawing Sheets

(51) Int. Cl.
*F28D 1/03* (2006.01)
*F28D 1/04* (2006.01)
*F28D 1/053* (2006.01)

(52) U.S. Cl.
CPC ..... *B60H 1/00735* (2013.01); *B60H 1/00921* (2013.01); *F28D 1/035* (2013.01); *F28D 1/0316* (2013.01); *F28D 1/0435* (2013.01); *F28D 1/05391* (2013.01)

(58) Field of Classification Search
CPC ...... F28D 1/0435; F28D 1/0316; F28D 1/035; F28D 1/05391
See application file for complete search history.

(56) References Cited

U.S. PATENT DOCUMENTS

| | | | | |
|---|---|---|---|---|
| 5,052,472 | A * | 10/1991 | Takahashi | F25B 13/00 165/101 |
| 6,328,100 | B1 * | 12/2001 | Haussmann | F24H 1/009 165/140 |
| 8,740,104 | B2 * | 6/2014 | Bigler | B60H 1/00885 180/65.275 |
| 2002/0014085 | A1 * | 2/2002 | Sakakibara | F25B 9/008 62/201 |
| 2004/0011068 | A1 | 1/2004 | Hatakeyama | |
| 2004/0060316 | A1 | 4/2004 | Ito et al. | |
| 2004/0134204 | A1 * | 7/2004 | Honda | B60H 1/004 62/134 |
| 2004/0194949 | A1 | 10/2004 | Ban et al. | |
| 2009/0205353 | A1 | 8/2009 | Takahashi | |
| 2010/0071637 | A1 * | 3/2010 | Shintani | F01P 11/028 123/41.02 |

FOREIGN PATENT DOCUMENTS

| | | |
|---|---|---|
| JP | 04-81318 A | 3/1992 |
| JP | 11-157326 A | 6/1999 |
| JP | 2000-62446 A | 2/2000 |
| JP | 3275415 B2 | 4/2002 |
| JP | 2003-285619 A | 10/2003 |
| JP | 2004-268752 A | 9/2004 |
| JP | 2005-016326 A | 1/2005 |
| JP | 2006-059573 A | 3/2006 |
| JP | 2006266596 A * | 10/2006 |
| JP | 4023320 B2 | 12/2007 |
| JP | 2009-190687 A | 8/2009 |
| JP | 4311115 B2 | 8/2009 |
| JP | 2010-125913 A | 6/2010 |
| WO | WO2009133640 A1 * | 11/2009 |

OTHER PUBLICATIONS

Koji, Hot Water Storage Type Water Heater, Oct. 5, 2006, JP2006266596A, Whole Document.*
Office Action dated Nov. 21, 2014 in corresponding Chinese Application No. 201180061876.1.
Office Action dated Jan. 21, 2014 in corresponding JP Application No. 2011-272273 (with English translation).
International Search Report and Written Opinion (both in Japanese with English translation) for PCT/JP2011/007120, dated Apr. 3, 2012; ISA/JP.

* cited by examiner (a)

(b)

(a)

(b)

(a)

(b)

(a)

(b)

(a)

(b)

(c)

HEAT EXCHANGE SYSTEM

CROSS REFERENCE TO RELATED APPLICATIONS

This application is a 371 National Stage application of PCT international application PCT/JP2011/007120, filed on Dec. 20, 2011, which claims priority to Japanese Patent Application Nos. 2010-284830 filed on Dec. 21, 2010, and No. 2011-272273 filed on Dec. 13, 2011, the disclosures of which are incorporated herein by reference.

TECHNICAL FIELD

The present disclosure generally relates to a heat exchange system in which heat is exchanged among a plurality of fluids.

BACKGROUND

Conventionally, as disclosed in Japanese patent documents 1 and 2, a vehicular air conditioner heats air, i.e., a blowing air to be sent into a vehicle compartment, by exchanging heat between the air (i.e., a third fluid) and a discharged refrigerant (i.e., a first fluid) discharged from a compressor. Further, the above documents 1, 2 further disclose a configuration that the vehicular air conditioner heats the blowing air by heat exchange between the blowing air and a heat medium that is different from the discharged refrigerant (i.e., a second fluid).

In other words, the vehicular air conditioner in the above documents 1, 2 uses a heat exchange system for exchanging heat between a plurality of fluids (i.e., a discharged refrigerant, a heat medium, and a blowing air). More practically, the heat exchange system is used as the one in which heat from two types of fluids (i.e., the first/second fluids) is transferred to the other fluid (i.e., the third fluid).

More practically, in the patent document 1, a heat exchange system for radiating heat from the discharged refrigerant and from a brine to the blowing air can be realized as a combined-type heat exchanger by combining two heat exchangers in one unit, that is, by combining a heating heat exchanger that heats the blowing air by the heat exchange between the blowing air and the discharged refrigerant and a heater core that heats the blowing air by the heat exchange between the blowing air and the brine that is a heat medium heated by a combustion-type heater.

Further, in the combined-type heat exchanger in the patent document 1, a temperature difference between the discharged refrigerant and the blowing air as well as a temperature difference between the brine and the blowing air are secured by positioning, on a downstream side of the heating heat exchanger in terms of the blowing air flowing therethrough, the heater core through which the brine having higher temperature than the discharged refrigerant is circulated.

Further, in the patent document 2, just like the disclosure in the patent document 1, a heat exchange system for radiating heat from the discharged refrigerant and from a coolant to the blowing air can be realized as a combined-type heat exchanger by combining two heat exchangers in one unit, that is, by combining a heating heat exchanger similar to the one in the patent document 1 and a heater core that heats the blowing air by the heat exchange between the blowing air and a coolant (i.e., a second fluid) for cooling an engine.

Further, in the combined-type heat exchanger in the patent document 2, a volume reduction for preventing a volume increase of an entire body of the heat exchanger is planned by combining a refrigerant tube and a coolant tube on their flat surfaces, i.e., by combining the refrigerant tube having a flat cross-section for passing the coolant through the heating heat exchanger and the coolant tube having a flat cross-section for passing the coolant through the heater core.

PRIOR ART DOCUMENT

Patent Document (Patent document 1) Japanese patent No. 3275415
(Patent document 2) Japanese patent No. 4311115

However, in a hybrid vehicle and in an idle-stop vehicle (i.e., an engine-stop function equipped vehicle), temperature of an engine coolant is slow to rise in comparison to a normal vehicle that always operates the engine, due to the stopping of the internal combustion engine during the travel of the vehicle or at a time of a temporary stop of the vehicle for the purpose of improving the fuel mileage.

Therefore, if the heat exchange system of the patent document 1 is installed in the hybrid/idle-stop vehicle and an engine coolant is used as a brine in the heater core, the heating heat exchanger may be able to heat the blowing air, but the heater core may not be capable of heating the blowing air when a temperature of the coolant is lower than temperature of the discharged refrigerant.

In other words, heat will not be transferred in the heater core from the low temperature coolant to the blowing air that has already been heated in the heating heat exchanger. Instead, there may be a case that the blowing air having already been heated by the heating heat exchanger dissipates heat to the coolant, which is an unwanted exchange of heat.

Further, if the heat exchange system of the patent document 2 is installed in the hybrid/idle-stop vehicle, not only the heater core but also the heating heat exchanger may not be capable of sufficiently heating the blowing air when a temperature of the coolant is lower than temperature of the discharged refrigerant.

Such a problem arises because the heat exchanger in the patent document 2 directly combines the coolant tube and the coolant tube. That is, in such a direct combination structure, the heat conductivity between the discharged refrigerant and the coolant is possibly higher than the heat conductivity between the discharged refrigerant and the blowing air or the heat conductivity between the coolant and the blowing air.

In case, as described above, that the heat conductivity between the refrigerant and the coolant is higher than the heat conductivity between the coolant and the blowing air, almost all the heat from the discharged refrigerant is transferred to the coolant and the blowing air may be not sufficiently heated when a drop of the coolant temperature causes a large temperature difference between the discharge refrigerant and the coolant, i.e., even when the coolant temperature is higher than the blowing air temperature.

Therefore, when one of the two types of fluids (i.e., the first and second fluids) has a temperature change, the heat exchange systems in the patent documents 1 and 2 will not be able to adequately dissipate heat from both of the two types of fluids to the other (i.e., third) fluid. That is, an adequate heat exchange will not be realized among the plural types of fluids in such a situation.

SUMMARY OF THE INVENTION

In view of the foregoing, it is an object of the present disclosure to provide a heat exchange system that is capable of exchanging heat adequately among a plurality of fluids.

For achieving the above object, according to a first aspect of the present disclosure, a heat exchange system includes: a first heat exchanger for radiating heat from a first fluid to a third fluid by performing heat exchange between the first fluid and the third fluid; a second heat exchanger for performing heat exchange between a second fluid and the third fluid; and a second-fluid flow amount adjustment unit for adjusting an inflow amount of the second fluid flowing into the second heat exchanger. The first fluid passing the first heat exchanger and the second fluid passing the second heat exchanger are configured to be heat-transferable with each other, and temperature of the first fluid flowing into the first heat exchanger has a higher value than temperature of the third fluid flowing into the first heat exchanger. The second-fluid flow amount adjustment unit decreases the inflow amount of the second fluid when a temperature of the second fluid flowing into the second heat exchanger is equal to or higher than a predetermined second standard temperature and is equal to or lower than a predetermined first standard temperature, as compared with the inflow amount of the second fluid when a temperature of the second fluid flowing into the second heat exchanger is higher than the first standard temperature, or as compared with the inflow amount of the second fluid when a temperature of the second fluid flowing into the second heat exchanger is lower than the second standard temperature. Further, the first standard temperature and the second standard temperature are respectively set to be equal to or lower than temperature of the first fluid flowing into the first heat exchanger and the first standard temperature is set to have a higher value than temperature of the third fluid flowing into the second heat exchanger.

In such configuration, when a temperature of the second fluid is higher than the first standard temperature, heat is transferred from the first fluid to the third fluid at the first heat exchanger, and heat is transferred from the second fluid to the third fluid at the second heat exchanger. In other words, an adequate heat exchange can be realized at the first and second heat exchangers for radiating heat from the first and second fluids to the third fluid.

Further, since the second-fluid flow amount adjustment unit decreases the inflow amount of the second fluid when a temperature of the second fluid flowing into the second heat exchanger is equal to or higher than the second standard temperature and is equal to or lower than the first standard temperature, an adequate heat dissipation can be performed even when a temperature of the second fluid flowing into the second heat exchanger is equal to or lower than the first standard temperature.

In other words, even when a temperature difference between temperature of the first fluid and temperature of the second fluid is increased by the decreasing of temperature of the second fluid flowing into the second heat exchanger to be equal to or lower than the first standard temperature, an unwanted heat exchange between the first fluid and the second fluid is restricted, so as to efficiently dissipate heat from the first fluid to the third fluid.

Further, when the temperature difference between the temperature of the first fluid and the temperature of the second fluid is further increased by the decreasing of temperature of the second fluid flowing into the second heat exchanger below the second standard temperature, heat exchange between the first fluid and the second fluid is facilitated without decreasing the inflow amount of the second fluid, thereby increasing the heat radiation amount from the first fluid based on the dissipation of heat from the first fluid to both of the second and the third fluid.

Therefore, without depending on temperature change in the second fluid, an adequate heat exchange among the plural type fluids can be realized by the heat exchange system for exchanging heat among the plural type fluids. Further, wording "a decreasing of an inflow amount" indicates not only that an amount of flow is decreased, but also that an amount of flow is reduced to zero, i.e., the heat exchanger has no inflow flowing thereinto.

According to a second aspect of the present disclosure, the first heat exchanger has a plurality of first tubes in which the first fluid flows, and the second heat exchanger has a plurality of second tubes in which the second fluid flows, and a third fluid passage is formed around the plurality of first tubes and around the plurality of second tubes. Further, an outer fin is connected to an outer surface of the first tube and an outer surface of the second tube to facilitate heat exchange in both of the first and second heat exchanger and to enable heat transfer between the first fluid flowing in the first tube and the second fluid flowing in the second tube.

In such configuration, since the outer fin is connected to an outer surface of the first tube and an outer surface of the second tube, heat transfer between the first fluid flowing in the first tube and the second fluid flowing in the second tube is enabled extremely easily.

Further, as the heat transfer between the first fluid and the second fluid can be performed through the outer fin, heat of the first fluid is more easily transferred to the third fluid than to the second fluid in a course of transfer to the outer fin. Therefore, when the inflow amount is decreased, a heat exchange between the first fluid and the third fluid is efficiently performed.

According to a third aspect of the present disclosure, the heat exchange system may be configured that, at least one of the plurality of first tubes is positioned between the plurality of second tubes, and at least one of the plurality of second tubes is positioned between the plurality of first tubes, and a space that is formed at least between the first tube and the second tube defines the third fluid passage.

According to a fourth aspect of the present disclosure, the heat exchange system may be configured that, the first heat exchanger has a first tank part that collects or distributes the first fluid flowing in the first tube, and the second heat exchanger has a second tank part that collects or distributes the second fluid flowing in the second tube, and the plurality of first tubes and the plurality of second tubes are formed as an upstream side tube group that is positioned on an upstream side in a flow direction of the third fluid and a downstream side tube group that is positioned on a downstream side in the flow direction of the third fluid.

Further, according to a fifth aspect of the present disclosure, the heat exchange system may include: a bypass passage through which the second fluid flows while bypassing the second heat exchanger, and the second-fluid flow amount adjustment unit may decrease the inflow amount of the second fluid by flowing the second fluid into the bypass passage.

Further, according to a sixth aspect of the present disclosure, the heat exchange system may include a heat radiation amount adjustment unit for adjusting a heat radiation amount of heat possessed by the first fluid in the first heat exchanger. In such case, the heat radiation amount adjustment unit may decrease the heat radiation amount of heat possessed by the first fluid in the first heat exchanger when a temperature of the second fluid flowing into the second heat exchanger is higher than a protection standard temperature that is set in advance to be equal to or higher than the first standard temperature.

In such configuration, when a temperature of the second fluid flowing into the second heat exchanger is higher than a protection standard temperature, heat dissipation from the second fluid to the third fluid is facilitated by decreasing the heat radiation amount from the first fluid at the first heat exchanger, for the purpose of decreasing temperature of the second fluid. Therefore, an adequate heat exchange can be realized for radiating heat from the first and second fluids to the third fluid at the first and second heat exchanger.

For example, according to seventh and eighth aspects of the present disclosure, the first fluid may be a discharged refrigerant discharged from a compressor of a heat pump cycle, or may be a heat medium that is heated by heat possessed by the discharged refrigerant that is discharged from the compressor of the heat pump cycle.

Further, according to a ninth aspect of the present disclosure, the heat exchange system includes: a refrigerant radiator for radiating heat from a discharged refrigerant that is discharged from a compressor of a heat pump cycle, the radiating of heat from the discharged refrigerant being caused by heat exchange between the discharged refrigerant and a heat exchange object fluid; a heat medium radiator for radiating heat from a heat medium, the radiating of heat from the heat medium being caused by heat exchange between the heat medium and the heat exchange object fluid; and a heat medium flow amount adjustment unit for adjusting an inflow amount of the heat medium flowing into the heat medium radiator. The discharged refrigerant passing the refrigerant radiator and the heat medium passing the heat medium radiator are configured to be heat-transferable with each other, and temperature of the discharged refrigerant flowing into the refrigerant radiator has a higher value than temperature of the heat exchange object fluid flowing into the refrigerant radiator. The heat medium flow amount adjustment unit decreases the inflow amount of the heat medium when a temperature of the heat medium flowing into the heat medium radiator is equal to or higher than a predetermined second standard temperature and is equal to or lower than a predetermined first standard temperature, as compared with the inflow amount of the heat medium when a temperature of the heat medium flowing into the heat medium radiator is higher than the first standard temperature, or as compared with the inflow amount of the heat medium when a temperature of the heat medium flowing into the heat medium radiator is lower than the second standard temperature. Further, the first standard temperature and the second standard temperature are respectively set to be equal to or lower than temperature of the discharged refrigerant flowing into the refrigerant radiator and the first standard temperature is set to have a higher value than temperature of the heat exchange object fluid flowing into the heat medium radiator.

In such configuration, when a temperature of the heat medium is equal to or higher than the first standard temperature, an adequate heat exchange can be realized for radiating heat from the refrigerant to the heat exchange object fluid at the refrigerant radiator and for radiating heat from the heat medium to the heat exchange object fluid at the heat medium radiator.

Further, the heat medium flow amount adjustment unit decreases the inflow amount of the heat medium when a temperature of the heat medium flowing into the heat medium radiator is equal to or higher than a predetermined second standard temperature and is equal to or lower than a predetermined first standard temperature. Therefore, even when a temperature of the heat medium is lower than the second standard temperature, an adequate heat exchange can be performed among the discharged refrigerant, the heat medium, and the heat exchange object fluid.

As a result, an adequate heat exchange can be performed in the heat exchange system among the discharged refrigerant, the heat medium, and the heat exchange object fluid without depending on temperature of the heat medium.

Specifically, it is extremely effective in terms of increasing the refrigeration capacity of the heat pump cycle by facilitating heat exchange between the discharged refrigerant and the heat medium, which enables an increase of the heat radiation amount from the discharged refrigerant.

In the heat exchange system according to a tenth aspect of the present disclosure, the heat medium flow amount adjustment unit decreases the inflow amount of the heat medium when a pressure of the refrigerant in the refrigerant radiator is equal to or higher than a predetermined standard refrigerant pressure.

In such configuration, by setting the standard refrigerant pressure at a pressure such that a saturation temperature of the refrigerant becomes higher than a saturation temperature of the heat exchange object fluid flowing into the refrigerant radiator, temperature of the discharged refrigerant flowing into the refrigerant radiator is securely kept at a higher temperature relative to temperature of the heat exchange object fluid flowing into the refrigerant radiator. Further, when a temperature of the heat medium flowing into the heat medium radiator decreases below the second standard temperature, a temperature difference between temperature of the discharged refrigerant and temperature of the heat medium is kept to have a sufficient margin.

A heat exchange system according to an eleventh aspect of the present disclosure includes: a refrigerant radiator for radiating heat from a discharged refrigerant that is discharged from a compressor of a heat pump cycle, the radiating of heat from the discharged refrigerant being caused by heat exchange between the discharged refrigerant and a heat exchange object fluid; a heat medium radiator for radiating heat from a heat medium, the radiating of heat from the heat medium being caused by heat exchange between the heat medium and the heat exchange object fluid; and a heat medium flow amount adjustment unit for adjusting an inflow amount of the heat medium flowing into the heat medium radiator. The discharged refrigerant passing the refrigerant radiator and the heat medium passing the heat medium radiator are configured to be heat-transferable with each other, and temperature of the discharged refrigerant flowing into the refrigerant radiator has a higher value than temperature of the heat exchange object fluid flowing into the refrigerant radiator. The heat medium flow amount adjustment unit decreases the inflow amount of the heat medium when a temperature of the heat medium flowing into the heat medium radiator is equal to or higher than a predetermined third standard temperature that is calculated by subtracting a predetermined temperature from a saturation temperature of the discharged refrigerant in the refrigerant radiator and is equal to or lower than a predetermined first standard temperature, as compared with the inflow amount of the heat medium when a temperature of the heat medium flowing into the heat medium radiator is higher than the first standard temperature, or compared with the inflow amount of the heat medium when a temperature of the heat medium flowing into the heat medium radiator is lower than the third standard temperature. Further, the first standard temperature and the third standard temperature are respectively set to be equal to or lower than temperature of the discharged refrigerant flowing into the refrigerant radiator and the first standard temperature is set to have a higher value than temperature of the heat exchange object fluid flowing into the heat medium radiator.

In such configuration, when a temperature of the heat medium is equal to or higher than the first standard temperature, an adequate heat exchange can be realized for radiating heat from the refrigerant to the heat exchange object fluid at the refrigerant radiator and for radiating heat from the heat medium to the heat exchange object fluid at the heat medium radiator.

Further, since the heat medium flow amount adjustment unit decreases the inflow amount of the heat medium when a temperature of the heat medium flowing into the heat medium radiator can be equal to or higher than the third standard temperature and is equal to or lower than the first standard temperature, an adequate heat exchange can be performed among the discharged refrigerant, the heat medium, and the heat exchange object fluid, even when a temperature of the heat medium flowing into the heat medium radiator is equal to or lower than the first standard temperature.

Further, since the third standard temperature is set to have a value that is calculated by subtracting a predetermined temperature from the saturation temperature of the discharged refrigerant in the refrigerant radiator, the third standard temperature can be set according to temperature of the discharged refrigerant in the refrigerant radiator. In other words, as temperature of the discharged refrigerant in the refrigerant radiator decreases, a temperature range, i.e., a temperature difference between the third standard temperature and the first standard temperature, for decreasing the inflow amount of the heat medium is increased.

Therefore, as temperature of the discharged refrigerant decreases which makes it harder to heat the heat exchange object fluid by using heat that is possessed by the discharged refrigerant, the temperature difference between the third standard temperature for a decrease of the inflow amount of the heat medium and the first standard temperature is increased, thereby enabling an adequate and efficient heat exchange between the discharged refrigerant and the heat exchange object fluid by further restricting an unwanted heat exchange between the discharged refrigerant and the heat medium.

As a result, an adequate heat exchange can be performed among the plural type fluids such as the refrigerant, the heat medium and the heat exchange object fluid without depending on temperature of the heat medium. Further, when a temperature of the heat medium flowing into the heat medium radiator decreases below the third standard temperature, the refrigeration capacity of the heat pump cycle is increased.

A heat exchange system according to a twelfth aspect of the present disclosure includes: a refrigerant radiator for radiating heat from a discharged refrigerant that is discharged from a compressor of a heat pump cycle, the radiating of heat from the discharged refrigerant being caused by heat exchange between the discharged refrigerant and a heat exchange object fluid; a heat medium radiator for radiating heat from a heat medium, the radiating of heat from the heat medium being caused by heat exchange between the heat medium and the heat exchange object fluid; and a heat medium flow amount adjustment unit for adjusting an inflow amount of the heat medium flowing into the heat medium radiator. The discharged refrigerant passing the refrigerant radiator and the heat medium passing the heat medium radiator are configured to be heat-transferable with each other, and temperature of the discharged refrigerant flowing into the refrigerant radiator has a higher value than temperature of the heat exchange object fluid flowing into the refrigerant radiator. The heat medium flow amount adjustment unit decreases the inflow amount of the heat medium when a temperature of the heat medium flowing into the heat medium radiator is equal to or lower than a predetermined first standard temperature, as compared with the inflow amount of the heat medium when a temperature of the heat medium flowing into the heat medium radiator is higher than the first standard temperature, and increases the inflow amount of the heat medium as temperature of the heat medium flowing into the heat medium radiator decreases below the first standard temperature. Further, the first standard temperature is set to be equal to or lower than temperature of the discharged refrigerant flowing into the refrigerant radiator and is set to have a higher value than temperature of the heat exchange object fluid flowing into the heat medium radiator.

In such configuration, when a temperature of the heat medium is equal to or higher than the first standard temperature, an adequate heat exchange can be realized for radiating heat from the refrigerant to the heat exchange object fluid at the refrigerant radiator and for radiating heat from the heat medium to the heat exchange object fluid at the heat medium radiator.

Further, since the heat medium flow amount adjustment unit decreases the inflow amount of the heat medium when a temperature of the heat medium flowing into the heat medium radiator is equal to or lower than the first standard temperature, an efficient heat dissipation can be performed for radiating heat from the discharged refrigerant to the heat exchange object fluid by restricting an unwanted heat exchange between the discharged refrigerant and the heat medium.

Then, as temperature of the heat medium flowing into the heat medium radiator further decreases, the inflow amount of the heat medium is increased, thereby enabling a heat dissipation from the discharged refrigerant to both of the heat medium and the heat exchange object fluid, and increasing the heat radiation amount of the discharged refrigerant. Therefore, the refrigeration capacity of the heat pump cycle is increased.

As a result, an adequate heat exchange can be performed among the plural type fluids such as the refrigerant, the heat medium and the heat exchange object fluid without depending on temperature of the heat medium.

A heat exchange system according to a thirteenth aspect of the present disclosure includes: a refrigerant radiator for radiating heat from a discharged refrigerant that is discharged from a compressor of a heat pump cycle, the radiating of heat from the discharged refrigerant being caused by heat exchange between the discharged refrigerant and a heat exchange object fluid; a heat medium radiator for radiating heat from a heat medium, the radiating of heat from the heat medium being caused by heat exchange between the heat medium and the heat exchange object fluid; and a heat medium flow amount adjustment unit for adjusting an inflow amount of the heat medium flowing into the heat medium radiator. The discharged refrigerant passing through the refrigerant radiator and the heat medium passing through the heat medium radiator are configured to be heat-transferable with each other, and temperature of the discharged refrigerant flowing into the refrigerant radiator has a higher value than temperature of the heat exchange object fluid flowing into the refrigerant radiator. The heat medium flow amount adjustment unit decreases the inflow amount of the heat medium when a temperature of the heat medium flowing into the heat medium radiator is equal to or higher than a predetermined third standard temperature that is calculated by subtracting a predetermined temperature from a saturation temperature of the discharged refrigerant in the refrigerant radiator and is equal to or lower than a predetermined first standard temperature, as compared with the inflow amount of the heat medium when a temperature of the heat medium flowing into the heat medium radiator is higher than the first standard temperature, or as compared with the inflow amount of the heat medium when a temperature of the heat medium flowing into the heat medium radiator is lower than the third standard temperature, and increases the inflow amount of the heat medium as temperature of the heat medium flowing into the heat medium radiator decreases below the first standard temperature. Further, the first standard temperature and the third standard temperature are set to be equal to or lower than temperature of the discharged refrigerant flowing into the refrigerant radiator, and the first standard temperature is set to have a higher value than temperature of the heat exchange object fluid flowing into the heat medium radiator.

In such configuration, when a temperature of the heat medium equal to or higher than the first standard temperature, an adequate heat exchange can be realized for radiating heat from the refrigerant to the heat exchange object fluid at the refrigerant radiator and for radiating heat from the heat medium to the heat exchange object fluid at the heat medium radiator.

Further, since the heat medium flow amount adjustment unit decreases the inflow amount of the heat medium when a temperature of the heat medium flowing into the heat medium radiator is equal to or higher than the third standard temperature and is equal to or lower than the first standard temperature, an adequate heat exchange can be performed among the discharged refrigerant, the heat medium, and the heat exchange object fluid, even when a temperature of the heat medium flowing into the heat medium radiator is equal to or lower than the first standard temperature.

Further, since the third standard temperature is set to have a value that is calculated by subtracting a predetermined temperature from the saturation temperature of the discharged refrigerant in the refrigerant radiator, an adequate and efficient heat exchange can be performed between the discharged refrigerant and the heat medium by restricting an unwanted heat exchange between the discharged refrigerant and the heat exchange object fluid.

Further, as temperature of the heat medium flowing into the heat medium radiator decreases below the first standard temperature, the inflow amount of the heat medium is increased, thereby enabling a heat dissipation from the discharged refrigerant to both of the heat medium and the heat exchange object fluid, and increasing the heat radiation amount from the discharged refrigerant. Therefore, the refrigeration capacity of the heat pump cycle is increased.

As a result, an adequate heat exchange can be performed among the plural type fluids such as the refrigerant, the heat medium and the heat exchange object fluid without depending on temperature of the heat medium.

In the heat exchange system according to a fourteenth aspect of the present disclosure, the refrigerant radiator has a plurality of refrigerant tubes for circulating the refrigerant, and the heat medium radiator has a plurality of heat medium tubes in which the heat medium flows, and a heat exchange object fluid passage for passing the heat exchange object fluid is formed around the plurality of refrigerant tubes and around the plurality of heat medium tubes, and an outer fin is connected to an outer surface of the refrigerant tube and an outer surface of the heat medium tube to facilitate heat exchange in the both radiators and to enable heat transfer between the discharged refrigerant flowing in the refrigerant tube and the heat medium flowing in the heat medium tube.

In such configuration, since the outer fin is bonded to the outer surface of the refrigerant tube, heat is extremely easily transferable between the discharged refrigerant flowing in the refrigerant radiator and the heat medium flowing in the heat medium radiator.

Further, since heat transfer between the discharged refrigerant and the heat medium can be performed through the outer fin, heat from the discharged refrigerant is more easily transferred to the heat exchange object fluid than to the heat medium in the course of transfer through the outer fin. Therefore, when the inflow amount is decreased, an efficient heat exchange can be performed between the discharged refrigerant and the heat exchange object fluid.

Further, the heat exchange system according to a fifteenth aspect of the present disclosure, a bypass passage through which the heat medium flows while bypassing the heat medium radiator may be provided, and the heat medium flow amount adjustment unit may be configured to decrease the inflow amount of the heat medium by flowing the heat medium into the bypass passage.

A heat exchange system according to a sixteenth aspect to a twentieth aspect of the present disclosure includes: a refrigerant radiator for radiating heat from a discharged refrigerant that is discharged from a compressor of a heat pump cycle, the radiating of heat from the discharged refrigerant being caused by heat exchange between the discharged refrigerant and a first heat medium; a first heat medium radiator for radiating heat from the first heat medium flowing out from the refrigerant radiator, the radiating heat from the first heat medium being caused by heat exchange between the first heat medium and a heat exchange object fluid; a second heat medium radiator for radiating heat from a second heat medium, the radiating of heat from the second heat medium being caused by heat exchange between the second heat medium and the heat exchange object fluid; and a second heat medium flow amount adjustment unit for adjusting an inflow amount of the second heat medium flowing into the second heat medium radiator. The first heat medium passing through the first heat medium radiator and the second heat medium passing through the second heat medium radiator are configured to be heat-transferable with each other, and temperature of the first heat medium flowing into the first heat medium radiator has a higher value than temperature of the heat exchange object fluid flowing into the first heat medium radiator.

For example, in the heat exchange system of the sixteenth aspect of the present disclosure, the second heat medium flow amount adjustment unit may decrease the inflow amount of the second heat medium when a temperature of the second heat medium flowing into the second heat medium radiator is equal to or higher than a predetermined fifth standard temperature and is equal to or lower than a predetermined fourth standard temperature, and the fourth standard temperature and the fifth standard temperature are respectively set to be equal to or lower than temperature of the first heat medium flowing into the first heat medium radiator, and the fourth standard temperature is set to have a higher value than temperature of the heat exchange object fluid flowing into the second heat medium radiator.

In such configuration, an adequate heat exchange can be performed, for radiating heat from the first heat medium to the heat exchange object fluid at the first heat medium radiator and for radiating heat from the second heat medium to the heat exchange object fluid at the second heat medium radiator, when a temperature of the second heat medium is equal to or higher than the fourth standard temperature.

Further, since the second heat medium flow amount adjustment unit decreases the inflow amount of the second heat medium when a temperature of the second heat medium flowing into the second heat medium radiator is equal to or higher than the fifth standard temperature and is equal to or lower than the fourth standard temperature, an adequate heat exchange can be performed among the first, second heat media and the heat exchange object fluid, even when a temperature of the second heat medium is lower than the fifth standard temperature.

Therefore, an adequate heat exchange can be realized in the heat exchange system for exchanging heat among the plural type fluids such as the refrigerant, the heat medium and the heat exchange object fluid without depending on temperature of the second heat medium.

Specifically, it is extremely effective in terms of increasing the refrigeration capacity of the heat pump cycle by facilitating the heat exchange among the heat mediums and by increasing the heat radiation amount from the first heat medium, when a temperature of the second heat medium flowing into the second heat medium radiator decreases below the fifth standard temperature.

In the present disclosure of the heat exchange system in the seventeenth aspect, the second heat medium flow amount adjustment unit may decrease the inflow amount of the second heat medium when a temperature of the first heat medium flowing into the first heat medium radiator is equal to or higher than a predetermined first heat medium standard temperature.

In the heat exchange system according to the eighteenth aspect of the present disclosure, the second heat medium flow amount adjustment unit may decrease the inflow amount of the second heat medium when a temperature of the second heat medium flowing into the second heat medium radiator is equal to or higher than a predetermined sixth standard temperature that is calculated by subtracting a predetermined temperature from temperature of the first heat medium flowing into the first heat medium radiator and is equal to or lower than a predetermined fourth standard temperature. In addition, the fourth standard temperature may be set to be equal to or lower than temperature of the first heat medium flowing into the first heat medium radiator and may be set to have a higher value than temperature of the heat exchange object fluid flowing into the second heat medium radiator.

In such configuration, an adequate heat exchange can be performed, for radiating heat from both of the first heat medium and the second heat medium to the heat exchange object fluid when a temperature of the second heat medium is equal to or higher than the fourth standard temperature.

Further, since the second heat medium flow amount adjustment unit decreases the inflow amount of the second heat medium when a temperature of the second heat medium flowing into the second heat medium radiator is equal to or higher than the sixth standard temperature and is equal to or lower than the fourth standard temperature, an adequate heat exchange can be performed among the first, second heat media and the heat exchange object fluid, even when a temperature of the second heat medium is lower than the fourth standard temperature.

Further, since the sixth standard temperature is set as a value that is calculated by subtracting a predetermined temperature from temperature of the first heat medium in the first heat medium radiator, the temperature difference between the sixth standard temperature and the fourth standard temperature is increased when it becomes harder to heat the heat exchange object fluid by using heat from the first heat medium, thereby enabling an adequate and efficient heat exchange between the first heat medium and the heat exchange object fluid by restricting an unwanted heat exchange among the heat media.

In the heat exchange system according to the nineteenth aspect of the present disclosure, the second heat medium flow amount adjustment unit decreases the inflow amount of the second heat medium when a temperature of the second heat medium flowing into the second heat medium radiator is equal to or lower than the predetermined fourth standard temperature, and increases the inflow amount of the second heat medium as temperature of the second heat medium flowing into the second heat medium radiator decreases below the fourth standard temperature. In addition, the fourth standard temperature may be set to be equal to or lower than temperature of the first heat medium flowing into the first heat medium radiator and may be set to have a higher value than a temperature value of the heat exchange object fluid flowing into the second heat medium radiator.

In such configuration, when a temperature of the second heat medium is equal to or higher than the fourth standard temperature, an adequate heat exchange can be performed for radiating heat from both of the first heat medium and the second heat medium to the heat exchange object fluid.

Further, since the second heat medium flow amount adjustment unit decreases the inflow amount of the second heat medium when a temperature of the second heat medium flowing into the second heat medium radiator is equal to or lower than the fourth standard temperature, an adequate heat exchange can be performed for radiating heat from the first heat medium to the heat exchange object fluid by restricting an unwanted heat exchange between the first and second heat media.

Then, as temperature of the second heat medium flowing into the second heat medium radiator further decreases, the inflow amount of the second heat medium is increased, thereby enabling to increase the heat radiation amount of heat from the first heat medium to both of the second heat medium and the heat exchange object fluid. As a result, the refrigeration capacity of the heat pump cycle is increased.

In the heat exchange system according to the twentieth aspect of the present disclosure, the second heat medium flow amount adjustment unit may decrease the inflow amount of the second heat medium when a temperature of the second heat medium flowing into the second heat medium radiator is equal to or higher than the predetermined sixth standard temperature that is calculated by subtracting a predetermined temperature from temperature of the first heat medium flowing into the first heat medium radiator and is equal to or lower than the predetermined fourth standard temperature, and may increase the inflow amount of the second heat medium as temperature of the second heat medium flowing into the second heat medium radiator decreases below the fourth standard temperature. In addition, the fourth standard temperature may be set to be equal to or lower than temperature of the first heat medium flowing into the first heat medium radiator and may be set to have a higher value than a temperature value of the heat exchange object fluid flowing into the second heat medium radiator.

In such configuration, when the temperature of the second heat medium is equal to or higher than the fourth standard temperature, an adequate heat exchange can be realized, for radiating heat from both of the first heat medium and the second heat medium to the heat exchange object fluid.

Further, since the inflow amount of the second heat medium is decreased when a temperature of the second heat medium flowing into the second heat medium radiator is equal to or higher than the sixth standard temperature and is equal to or lower than the fourth standard temperature, an adequate heat exchange can be performed among the heat media and the heat exchange object fluid, even when a temperature of the second heat medium is lower than the fourth standard temperature.

Further, the sixth standard temperature is set to have a value that is calculated by subtracting a predetermined temperature from temperature of the first heat medium in the first heat medium radiator, it restricts an unwanted heat exchange in each of the heat media and to realize an adequate heat exchange between the first heat medium and the heat exchange object fluid.

Further, as temperature of the second heat medium flowing into the second heat medium radiator further decreases, the inflow amount of the second heat medium is increased, thereby enabling to increase the heat radiation amount of heat from the first heat medium to both of the second heat medium and the heat exchange object fluid. As a result, the refrigeration capacity of the heat pump cycle is increased.

In the heat exchange system according to a twenty-first aspect of the present disclosure, an outer fin may be connected to an outer surface of the first heat medium tube that forms the first heat medium radiator and an outer surface of the second heat medium tube that forms the second heat medium radiator. In such case, heat transfer is enabled to be extremely easy between the first heat medium flowing in the first heat medium radiator and the second heat medium flowing in the second heat medium radiator.

Specifically, heat from the first heat medium is more easily transferred to the heat exchange object fluid than to the second heat medium in a course of heat transfer through the outer fin, because heat transfer between the first heat medium and the second heat medium can be performed through the outer fin. Therefore, an effective heat exchange can be performed between the first heat medium and the heat exchange object fluid when the inflow amount of the second heat medium is decreased.

In the present disclosure of the heat exchange system in a twenty-second form, a bypass passage that circulates the second heat medium in a bypassing manner that bypasses the second heat medium radiator may be provided. The second heat medium flow amount adjustment unit may decrease the inflow amount of the second heat medium by causing the second heat medium to flow into the bypass passage.

A heat exchange system according to twenty-third and twenty-fourth aspects of the present disclosure includes: a first heat exchanger having a plurality of first tubes for radiating heat from a first fluid to a third fluid by performing heat exchange between the first fluid and the third fluid; a second heat exchanger having a plurality of second tubes for performing heat exchange between a second fluid and the third fluid; and a second-fluid flow amount adjustment unit for adjusting an inflow amount of the second fluid flowing into the second heat exchanger are provided. The first fluid passing the first heat exchanger and the second fluid passing the second heat exchanger are configured to be heat-transferable with each other, and at least one of the plurality of first tubes is positioned between the plurality of second tubes, and at least one of the plurality of second tubes is positioned between the plurality of first tubes, and a space that is formed at least between the first tube and the second tube defines a third fluid passage for passing a third fluid. Furthermore, temperature of the first fluid flowing into the first heat exchanger and temperature of the second fluid flowing into the second heat exchanger have higher values than temperature of the third fluid before flowing into the first heat exchanger or the second heat exchanger.

The heat exchange system according to the twenty-third aspect of the present disclosure may have, for example, the second-fluid flow amount adjustment unit, which is configured to decrease the inflow amount of the second fluid, when a temperature of the first fluid flowing into the first heat exchanger is equal to or higher than temperature of the second fluid flowing into the second heat exchanger and a temperature difference between temperature of the first fluid flowing into the first exchanger and temperature of the second fluid flowing into the second heat exchanger is equal to or greater than a predetermined standard temperature difference.

In such configuration, in case that a temperature difference between temperature of the second fluid flowing into the second heat exchanger and temperature of the first fluid flowing into the first heat exchanger expands to be equal to or greater than the predetermined standard temperature difference when a temperature of the first fluid flowing into the first heat exchanger is equal to or higher than temperature of the second fluid flowing into the second heat exchanger, the inflow amount of the second fluid is decreased, thereby enabling an increase of temperature of the second fluid by restricting heat exchange between the second fluid and the third fluid at the second heat exchanger. In such manner, the temperature difference between temperature of the second fluid flowing into the second heat exchanger and temperature of the first fluid flowing into the first heat exchanger is decreased. As a result, an adequate heat exchange can be realized for radiating heat from the first and second heat media to the third heat medium at the first and second heat exchangers.

The heat exchange system according to a twenty-fourth aspect of the present disclosure may have, for example, the second-fluid flow amount adjustment unit that increases the inflow amount of the second fluid when a temperature of the first fluid flowing into the first heat exchanger is lower than temperature of the second fluid flowing into the second heat exchanger and a temperature difference between temperature of the first fluid flowing into the first heat exchanger and temperature of the second fluid flowing into the second heat exchanger is equal to or greater than a predetermined standard temperature difference.

In such configuration, in case that a temperature difference between temperature of the second fluid flowing into the second heat exchanger and temperature of the first fluid flowing into the first heat exchanger expands to be equal to or greater than the predetermined standard temperature difference when a temperature of the first fluid flowing into the first heat exchanger is lower than temperature of the second fluid flowing into the second heat exchanger, the inflow amount of the second fluid is increased, thereby enabling a decrease of temperature of the second fluid by facilitating heat dissipation from the second fluid to the third fluid at the second heat exchanger. In such manner, a decrease of the temperature difference between temperature of the second fluid flowing into the second heat exchanger and temperature of the first fluid flowing into the first heat exchanger is enabled. As a result, an adequate heat exchange can be realized for radiating heat from the first and second heat mediums to the third heat medium at the first and second heat exchangers.

The heat exchanger according to a twenty-fifth aspect of the present disclosure may include a heat radiation amount adjustment unit for adjusting a heat radiation amount of heat possessed by the first fluid in the first heat exchanger. In such case, the heat radiation amount adjustment unit is capable of decreasing the heat radiation amount of heat possessed by the first fluid in the first heat exchanger when a temperature of the second fluid flowing into the second heat exchanger increases above a predetermined protection standard temperature.

In such configuration, when a temperature of the second fluid is higher than the protection standard temperature, the heat dissipation at the second heat exchanger from the second fluid to the third fluid can be facilitated by decreasing the heat dissipation at the first heat exchanger from the first fluid, thereby enabling a decrease of temperature of the second fluid. Therefore, an adequate heat exchange can be realized for radiating heat from the first and second heat media to the third heat medium at the first and second heat exchangers.

In the heat exchanger according to a twenty-sixth aspect of the present disclosure, in case that the first fluid is a discharged refrigerant that is discharged from a compressor of a heat pump cycle, the heat radiation amount adjustment unit may decrease a refrigerant discharge capacity of the compressor when a temperature of the second fluid flowing into the second heat exchanger is higher than the protection standard temperature. In such configuration, the heat radiation amount of heat from the first fluid at the first heat exchanger is decreased.

In the heat exchanger according to a twenty-seventh aspect of the present disclosure, in case that the first fluid is a heat medium that is heated by heat possessed by a discharged refrigerant that is discharged from the compressor of the heat pump cycle, the heat radiation amount adjustment unit may decrease a refrigerant discharge capacity of the compressor when a temperature of the second fluid flowing into the second heat exchanger is higher than the protection standard temperature. In such configuration, the heat radiation amount from the first fluid at the first heat exchanger is decreased.

A heat exchange system according to a twenty-eighth aspect of the present disclosure may be applied to an air conditioner that cools a blowing air to be blown into an air conditioning object space by performing heat exchange between the blowing air and a refrigerant at an evaporator of a heat pump cycle. In this case, the first fluid is a heat medium that is heated by heat possessed by a discharged refrigerant discharged from the compressor of the heat pump cycle, the heat radiation amount adjustment unit may decrease a heat load of the heat pump cycle by changing a ratio of an inside air and an outside air, in order to have a greater amount of the inside air than the outside air to be circulated or introduced into the evaporator respectively from an inside and an outside of the air conditioning object space when a temperature of the second fluid flowing into the second heat exchanger is higher than the protection standard temperature.

In such configuration, a ratio of the inside air is increased than a ratio of the outside air, to introduce a greater amount of the inside air that has lower temperature than the outside air for decreasing a required heat absorption amount at the evaporator, thereby enabling a decrease of the heat load of the evaporator. As a result, a refrigerant discharge capacity of the compressor is decreased, thereby enabling a decrease of the heat radiation amount from the first fluid at the first heat exchanger.

BRIEF DESCRIPTION OF THE DRAWINGS

Other objects, features and advantages of the present disclosure will become more apparent from the following detailed description disposed with reference to the accompanying drawings, in which.

EMBODIMENTS FOR CARRYING OUT THE INVENTION

A plurality of embodiments respectively enabling the present disclosure are described in the following with reference to the drawings. In each of the embodiments, the same part may have the same numeral that is used in a preceding embodiment, for the brevity of description. In case that a part of the configuration is described in an embodiment, the rest of the configuration depends on the preceding embodiment. The combination of two or more parts of the respective embodiments is possible not only between the parts that are explicitly described as combinable but also between the parts unless otherwise indicated, without explicit indication, if such combination of the parts is not hindered.

(First Embodiment)

Figure 1:
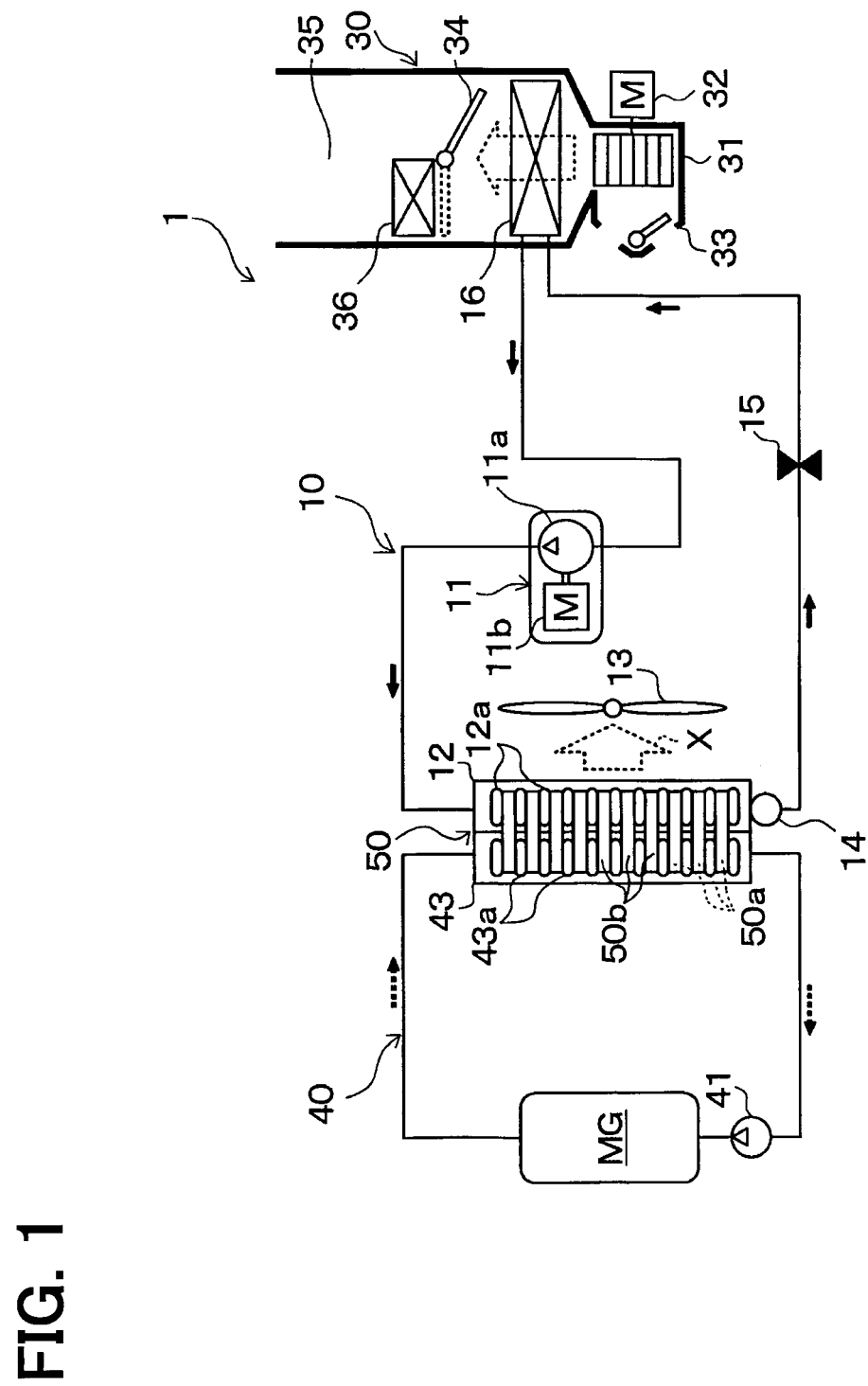
FIG. 1 is a schematic diagram showing a total configuration of a vehicular air conditioner in a first embodiment.

With reference to FIG. 1 to FIG. 8(b), the first embodiment of the present disclosure will be described. In the present embodiment, a heat exchange system of the present disclosure is implemented to realize a vehicular air conditioner 1 used in a hybrid vehicle which derives a driving power for the travel of the vehicle from an internal combustion engine (i.e., an engine) and from an electric motor MG. FIG. 1 is a schematic diagram of a total configuration of the vehicular air conditioner 1 of the present embodiment.

The hybrid vehicle can perform switching between two traveling states, i.e., one traveling state in which the vehicle travels obtaining the driving force from both of the engine and the electric motor MG for traveling by operating or stopping the engine according to a traveling load on the vehicle or the like and the other traveling state in which the vehicle travels obtaining the driving force only from the electric motor MG for traveling by stopping the engine. Thus, the hybrid vehicle can improve the fuel efficiency as compared to a standard vehicle obtaining a driving force for traveling only from the engine.

The heat exchange system applied to the vehicular air conditioner 1 of the present embodiment includes a heat pump cycle 10 that is formed as a steam compression-type refrigeration cycle, a coolant circulation circuit 40 for circulating a coolant that is used to cool the electric motor MG for traveling, and the like.

The heat pump cycle 10 is a device that provides a function to cool a blowing air that is blown into a vehicle compartment that is an object air-conditioning space in a vehicle. The heat pump cycle 10 of this embodiment employs a normal flon-based refrigerant as a refrigerant, and forms a subcritical refrigeration cycle whose high-pressure side refrigerant pressure does not exceed the critical pressure of the refrigerant. Into the refrigerant, a refrigerant oil for lubricating a compressor 11 is mixed, and a part of the refrigerant oil circulates through the cycle together with the refrigerant.

The compressor 11 is positioned in an engine room, and is configured to suck, compress, and discharge the refrigerant in the heat pump cycle 10. The compressor is an electric compressor which drives a fixed displacement compressor 11a having a fixed discharge capacity by using an electric motor 11b. Specifically, various types of compression mechanisms, such as a scroll type compression mechanism, or a vane compression mechanism, can be employed as the fixed displacement compressor 11a.

The electric motor 11b is the one whose operation (i.e., the number of rotations) is controlled by a control signal output from a controller to be described later. The motor 11b may either be an AC motor or a DC motor. By controlling the number of rotations of the motor 11b, a refrigerant discharge capacity of the compressor 11 is changed/controlled. Thus, in the present embodiment, the electric motor 11b serves as a discharge capacity change unit of the compressor 11.

A refrigerant discharge port of the compressor 11 is coupled to a refrigerant inlet side of a refrigerant radiator 12. The refrigerant radiator 12 is installed in the engine room, and exchanges heat between the discharged refrigerant (i.e., a first fluid) from the compressor 11 and an outside air (i.e., a third fluid) blown from a blower fan 13 to which heat is transferred/radiated for radiating heat from the discharged refrigerant to the outside air that serves as a heat exchange object fluid.

The blower fan 13 of the present embodiment is an electric blower, and an operation rate, i.e., the rotation number of the fan 13 or an amount of blown air, is controlled according to a control voltage that is output from the controller. Further, the refrigerant radiator 12 of the present embodiment is formed in one unit with a radiator 43 that exchanges heat between the coolant (i.e., a second fluid) which is a heat medium for cooling the electric motor MG for traveling and an outside air that is blown by the blower fan 13.

The blower fan 13 of the present embodiment serves as an outer blower for blowing the outside air toward both the refrigerant radiator 12 and the radiator 43. The detailed structures of a one unit combination of the refrigerant radiator 12 and the radiator 43 (hereinafter referred to as a "heat exchanger structure 50") will be described in detail below.

A receiver 14, which stores a surplus liquid-phase refrigerant by separating a gas from a liquid refrigerant that flows out from the refrigerant radiator 12, is coupled to a refrigerant outlet side of the refrigerant radiator 12. Further, a liquid-phase refrigerant outlet of the receiver 14 is coupled to an inlet side of a thermo-expansion valve 15, and an outlet side of the thermo-expansion valve 15 is coupled to a refrigerant inlet side of a refrigerant evaporator 16.

The thermo-expansion valve 15 is a decompression unit, which has a not-illustrated temperature sensing portion that is disposed in a refrigerant passage on an outlet side of the refrigerant evaporator 16 and which mechanically adjusts a valve opening degree (i.e., a flow amount of the refrigerant) based on a detected amount of heat of the refrigerant on the outlet side of the refrigerant evaporator 16 which is derived from temperature and pressure of the refrigerant.

The refrigerant evaporator 16 is a cooling heat exchanger for cooling the blowing air, which is arranged in a casing 31 of an interior air conditioning unit 30 and exchanges, for cooling of the blowing air by the evaporation of the low pressure refrigerant, heat between the low-pressure refrigerant that is decompressed and expanded by the thermo-expansion valve 15 and a blowing air that is to be blown into the vehicle compartment. The refrigerant outlet side of the refrigerant evaporator 16 is coupled to a refrigerant suction port of the compressor 11.

The interior air conditioning unit 30 is described below. The interior air conditioning unit 30 is arranged in an inside of a dashboard (i.e., an instrument panel) that is positioned at a front-most part of the vehicle compartment, and includes, in an inside of the casing 31 that serves as an outer shell of the unit 30, a blower 32, the above-described refrigerant evaporator 16, an electric heater 36, and the like.

The casing 31 has in its inside an air passage of the blowing air that is blown into the vehicle compartment, and is formed by using a resin material that has a certain degree of elasticity and a strength, such as a polypropylene or the like. On the most upstream side of the blowing air in the casing 31, an inside/outside air switching device 33 is disposed for switching air to introduce either an outside air from outside or an inside air from the vehicle compartment.

The inside/outside air switching device 33 has an inside air inlet for introducing the inside air into the casing 31 and an outside air inlet for introducing the outside air into the casing 31. Further, inside of the inside/outside air switching device 33, an inside/outside air switching door is provided, which changes a ratio of the inside air flow and the outside air flow based on the continuous control of an opening area of both of the inside air inlet and the outside air inlet.

The blower 32 for blowing the air that is sucked via the inside/outside air switching device 33 into the vehicle compartment is disposed on a downstream side of the air flow of the inside/outside air switching device 33. The blower 32 is an electric blower which includes a centrifugal multi-blade fan (i.e., a sirocco fan) driven by an electric motor, and whose number of rotations (i.e., an amount of air) is controlled by a control voltage output from the controller.

On a downstream side of the air flow from the blower 32, the refrigerant evaporator 16 and the electric heater 36 are arranged in this order in the flow of the blowing air. In other words, the refrigerant evaporator 16 is arranged on an upstream side in the air flow relative to the electric heater 36. The electric heater 36 is a heat unit for heating air that has passed through the refrigerant evaporator 16 by having a PTC element (i.e., thermistor having a positive characteristic) that emits heat by receiving a power supply from the controller.

Further, an air mixture door 34 for adjusting a ratio of air amount to be passed through the electric heater 36 among the blowing air that has passed the refrigerant evaporator 16 is arranged on the downstream side of the air flow from the refrigerant evaporator 16 and on the upstream side of the air flow to the electric heater 36.

Further, a mixture space 35 is arranged on the downstream side of the air flow from the electric heater 36, which is used for mixing two blow airs, i.e., the one that has been heated through heat exchange with the refrigerant by the electric heater 36 and the other that has not been heated due to bypassing of the electric heater 36.

An air outlet for blowing the conditioned air mixed in the mixture space 35 into the vehicle compartment that is an object of cooling is disposed on the most downstream side of the air flow in the casing 31. More specifically, a face air outlet for blowing the conditioned air toward an upper body of the vehicle occupant in the compartment, a foot air outlet for blowing the conditioned air toward the foot of the vehicle occupant, and a defroster outlet for blowing the conditioned air toward an inside of a front windshield of the vehicle are provided (not illustrated).

Therefore, the air mixture door 34 adjusts the ratio of the air amount passing through the electric heater 36 to thereby adjusting temperature of the conditioned air mixed in the mixture space 35, thus controlling temperature of the conditioned air blown from each of the air outlets. In other words, the air mixture door 34 serves as a temperature adjustment device for adjusting temperature of the conditioned air blown into the vehicle compartment. The air mixture door 34 is driven by a servo motor (not illustrated) whose operation is controlled based on the control signal output from the controller.

Further, on an air flow upstream side of the face air outlet, the foot air outlet and the defroster air outlet, a face door for adjusting an opening area of the face air outlet, a foot door for adjusting an opening area of the foot air outlet, and a defroster door for adjusting an opening area of the defroster air outlet are provided, respectively (not illustrated).

The face door, the foot door, and the defroster door respectively serve as an air outlet mode changing device for changing an air outlet mode, which are driven by a servo motor (not illustrated) whose operation is controlled based on a control signal output from the controller.

Next, a coolant circulation circuit 40 will be described below. The coolant circulation circuit 40 is a coolant circulation circuit for cooling the electric motor MG for traveling by allowing the coolant (e.g., an ethylene glycol aqueous solution) as a cooling fluid to circulate through a coolant passage formed in the above electric motor MG for traveling, which is one of the vehicle-mounted devices generating heat in operation. The coolant circulation circuit 40 is provided with a coolant pump 41 and the radiator 43.

The coolant pump 41 is an electric pump in the coolant circulation circuit 40 for pressurizing the coolant into a coolant passage formed in the electric motor MG for traveling, and whose number of rotations (i.e., a flow amount) is controlled by a control signal output from the controller.

Thus, according to the operation of the coolant pump 41 under control of the controller, the coolant is circulated from the coolant pump 41 to the electric motor MG for traveling, to the radiator 43, and to the coolant pump 41 in order. Therefore, the coolant pump 41 serves as a heat medium flow amount adjustment unit (i.e., a second-fluid flow amount adjustment unit) that adjusts a flow amount of the coolant that flows into the radiator 43.

The radiator 43 is a heat-dissipation heat exchanger that is disposed in an engine room, which exchanges heat between the coolant (i.e., a second fluid) that flows out from the coolant passage formed in the electric motor MG and the outside air (i.e., a third fluid) blown from the blower fan 13, for radiating heat from the coolant to the outside air.

Therefore, in this coolant circulation circuit 40, when the controller operates the coolant pump 41, the coolant passing through the electric motor MG for traveling absorbs waste heat from the electric motor MG for traveling for cooling the electric motor MG for traveling. Further, the coolant having high temperature by absorbing waste heat of the electric motor MG for traveling flows into the radiator 43 and is cooled by radiating heat to the outside air. In other words, the electric motor MG for traveling serves as an external heat source for heating the coolant.

Figure 2:
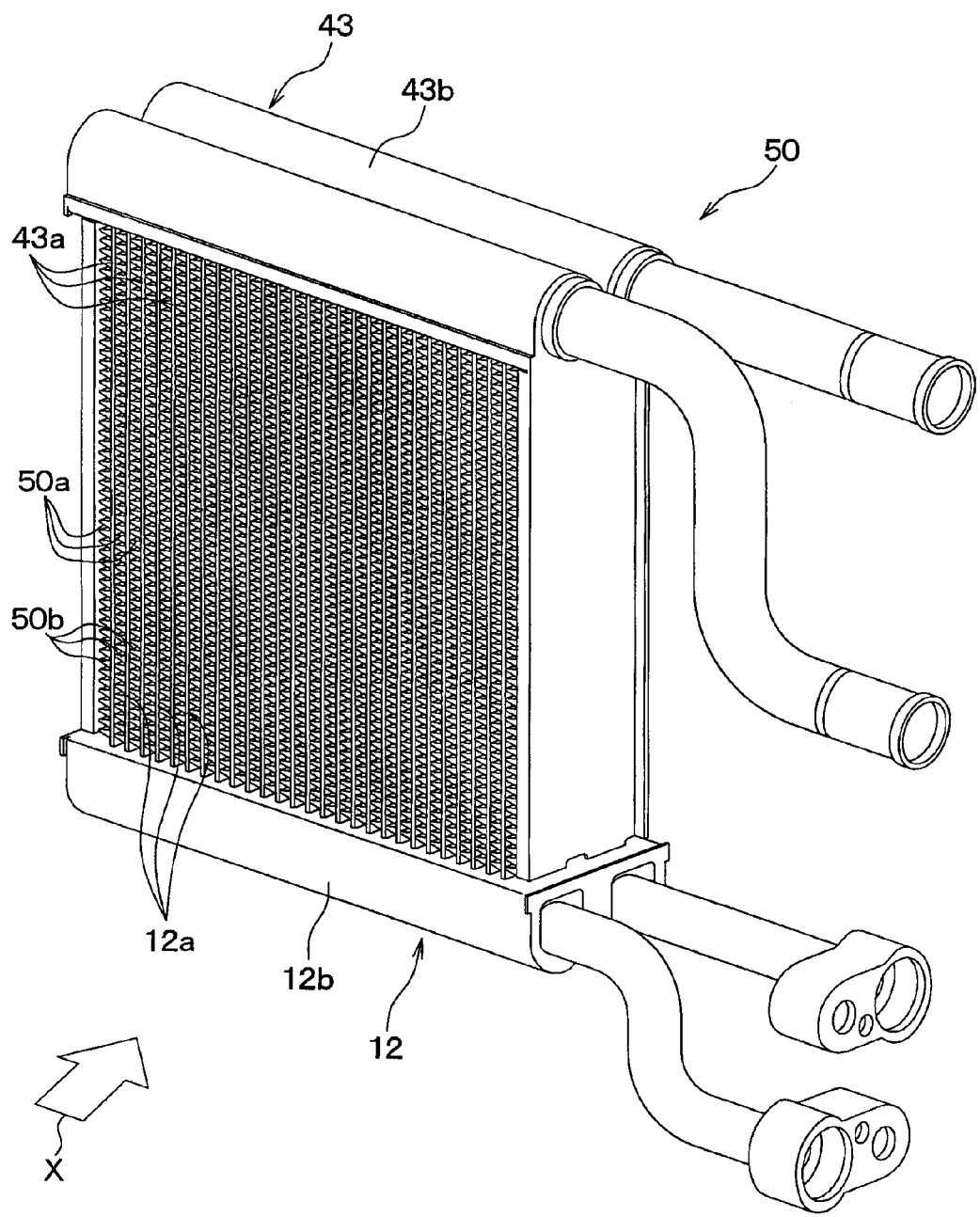
FIG. 2 is a perspective view of a heat exchanger structure in the first embodiment.
Figure 3:
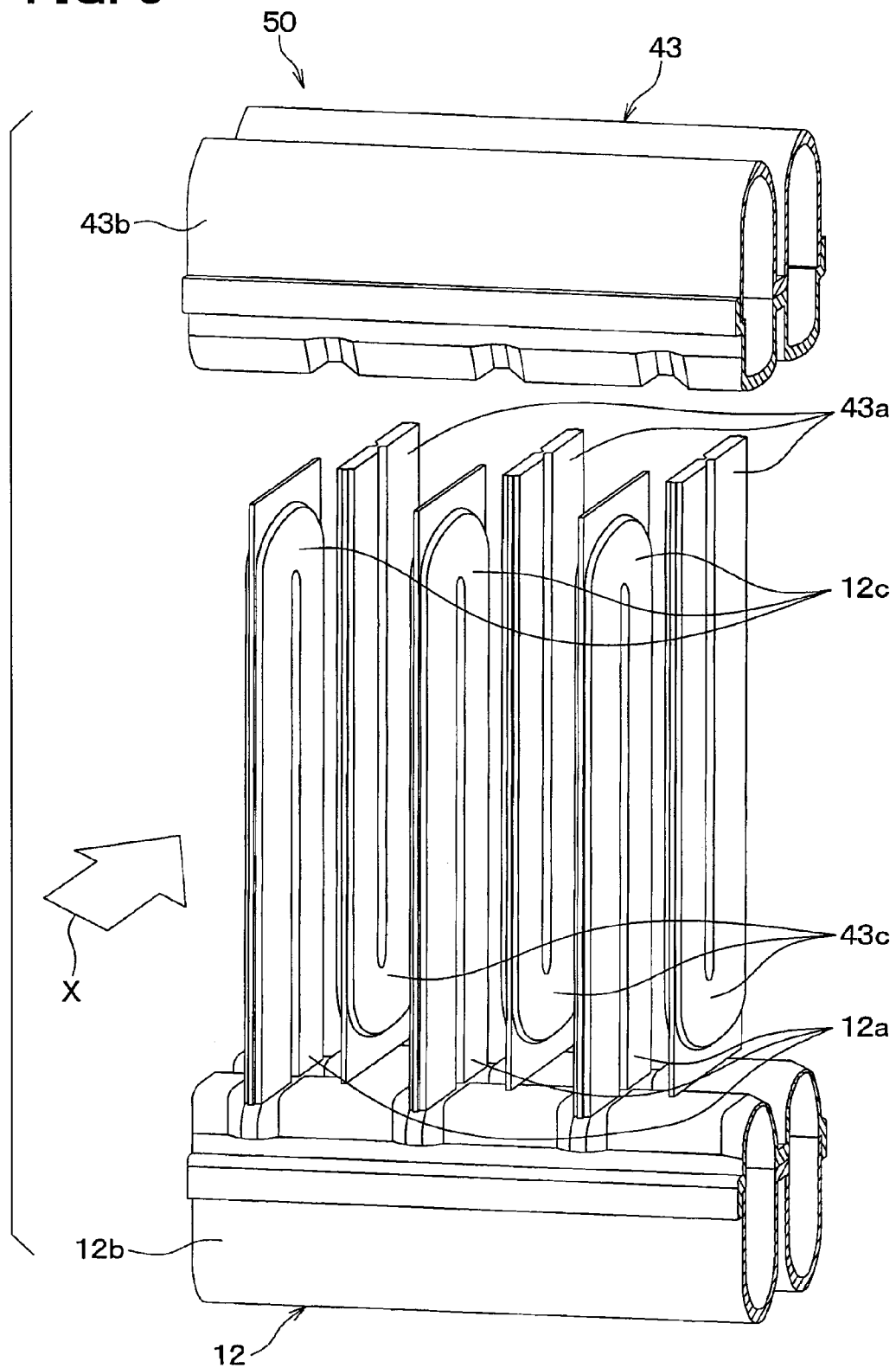
FIG. 3 is an exploded perspective view showing a part of the heat exchanger structure in the first embodiment.
Figure 4:
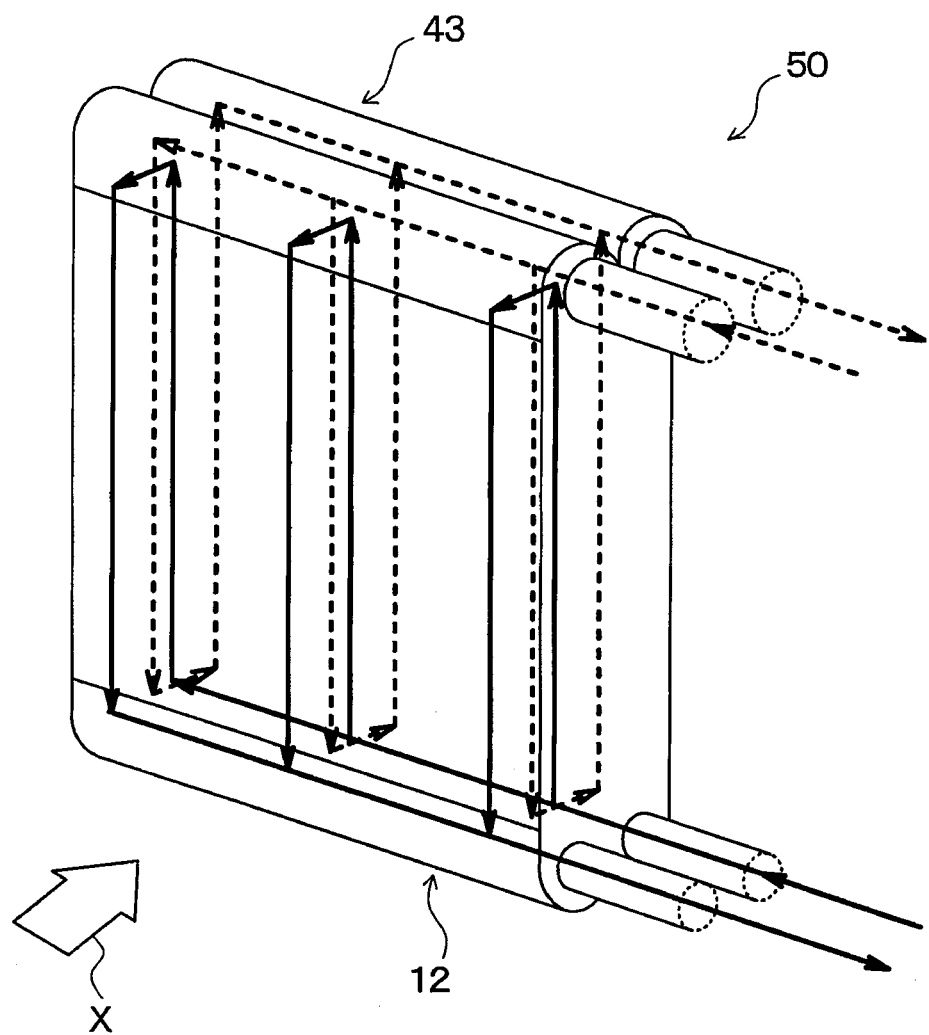
FIG. 4 is a schematic perspective view of a part of the heat exchanger structure for illustrating a flow of a refrigerant and a flow of a coolant in the first embodiment.
Figure 5:
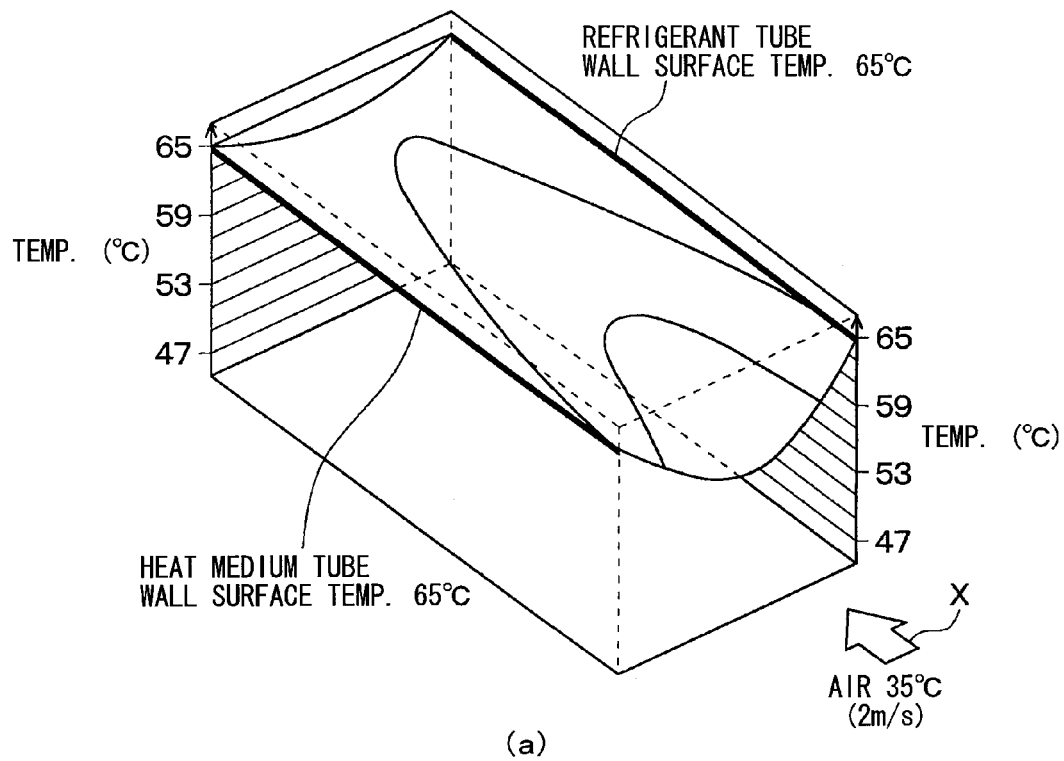
FIG. 5(a) is a diagram of temperature distribution of an outer fin when coolant temperature has a predetermined value.
FIG. 5(b) is an illustration showing a temperature distribution when being viewed from an X arrow of FIG. 5(a), which is a flow direction of an outside air.
Figure 5:
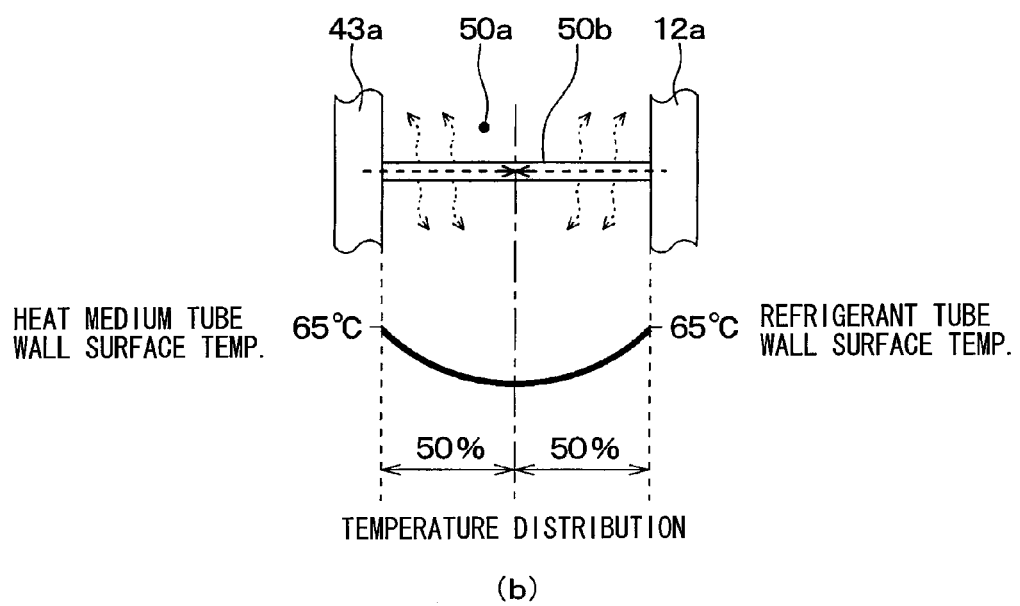
Figure 6:
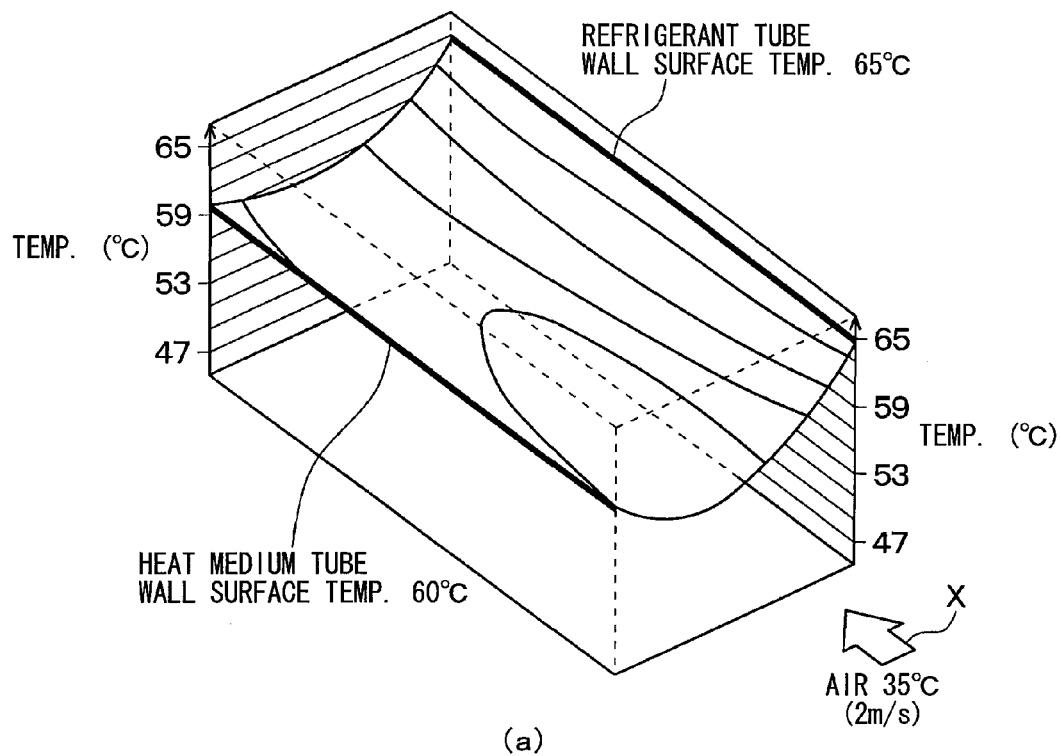
FIG. 6(a) is a diagram of temperature distribution of an outer fin when coolant temperature has a predetermined value.
FIG. 6(b) is an illustration showing a temperature distribution when being viewed from an X arrow of FIG. 6(a), which is a flow direction of an outside air.
Figure 6:
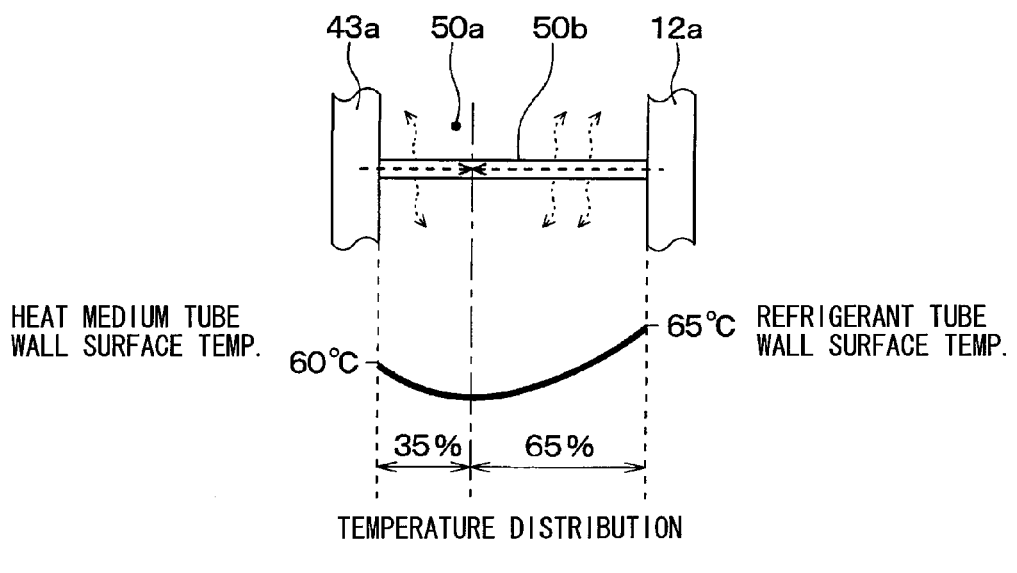
Figure 7:
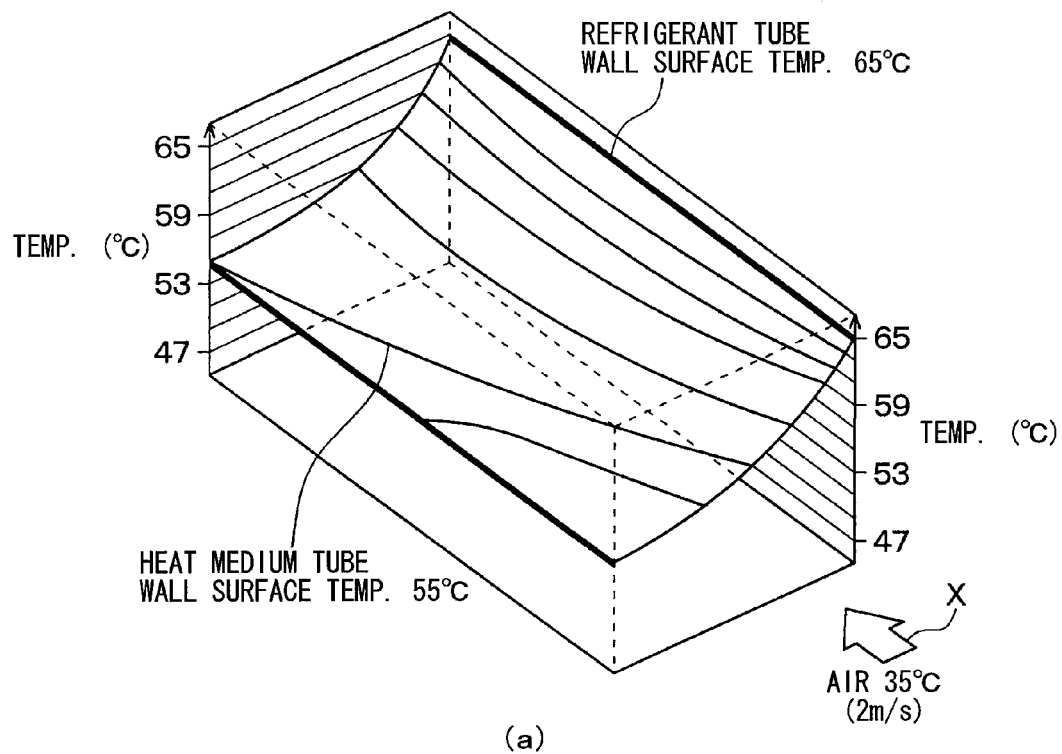
FIG. 7(a) is a diagram of temperature distribution of an outer fin when coolant temperature has a predetermined value.
FIG. 7(b) is an illustration showing a temperature distribution when being viewed from an X arrow of FIG. 7(a), which is a flow direction of an outside air.
Figure 7:
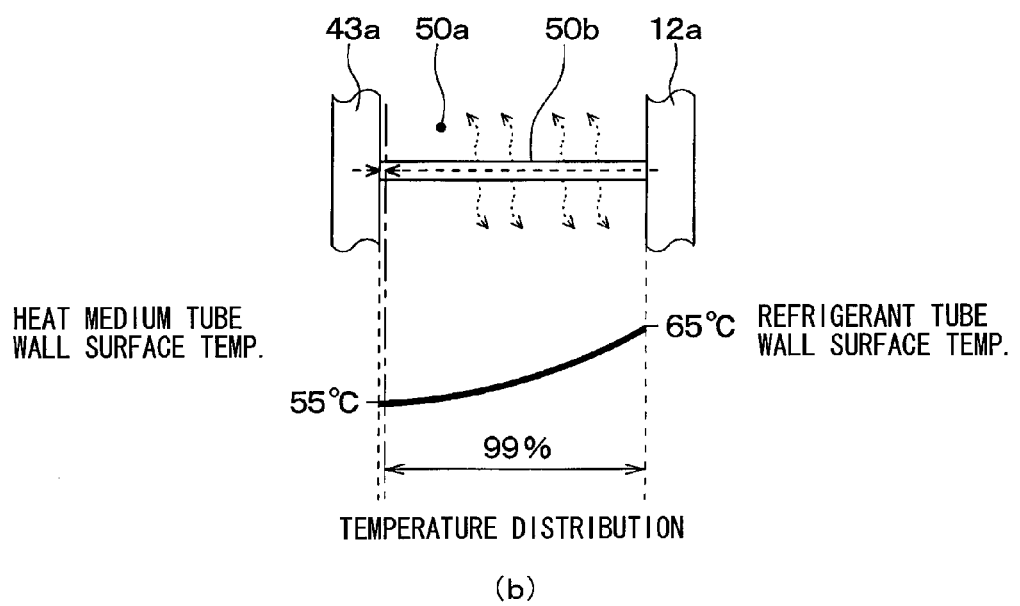
Figure 8:
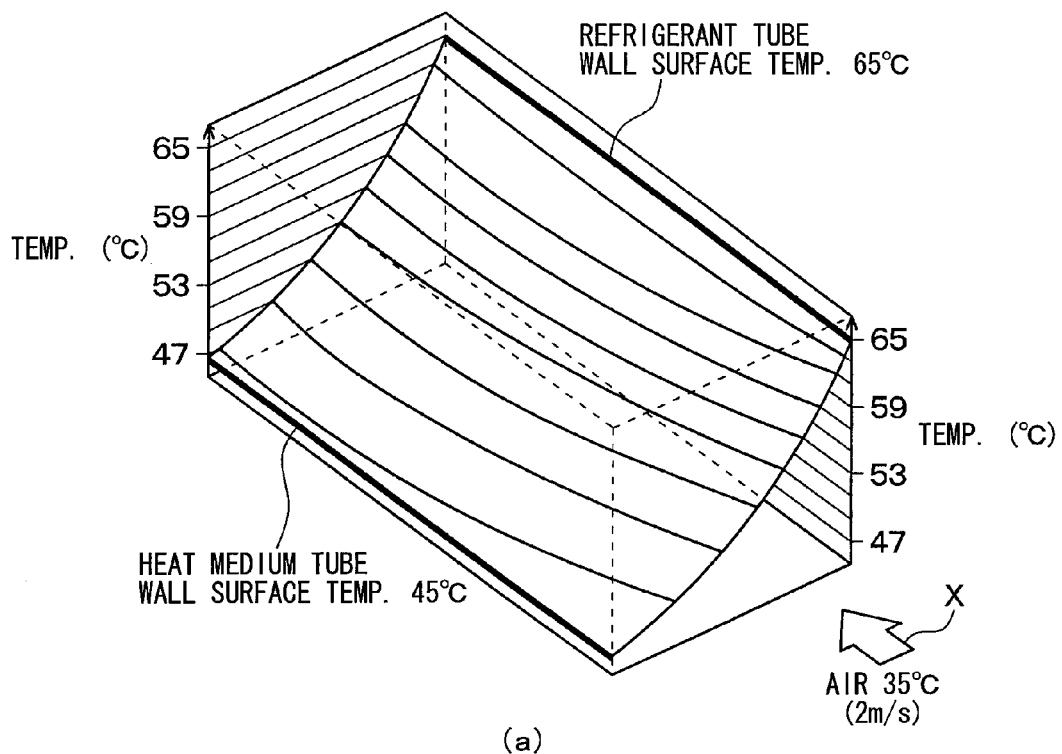
FIG. 8(a) is a diagram of temperature distribution of an outer fin when coolant temperature has a predetermined value.
FIG. 8(b) is an illustration showing a temperature distribution when being viewed from an X arrow of FIG. 8(a), which is a flow direction of an outside air.
Figure 8:
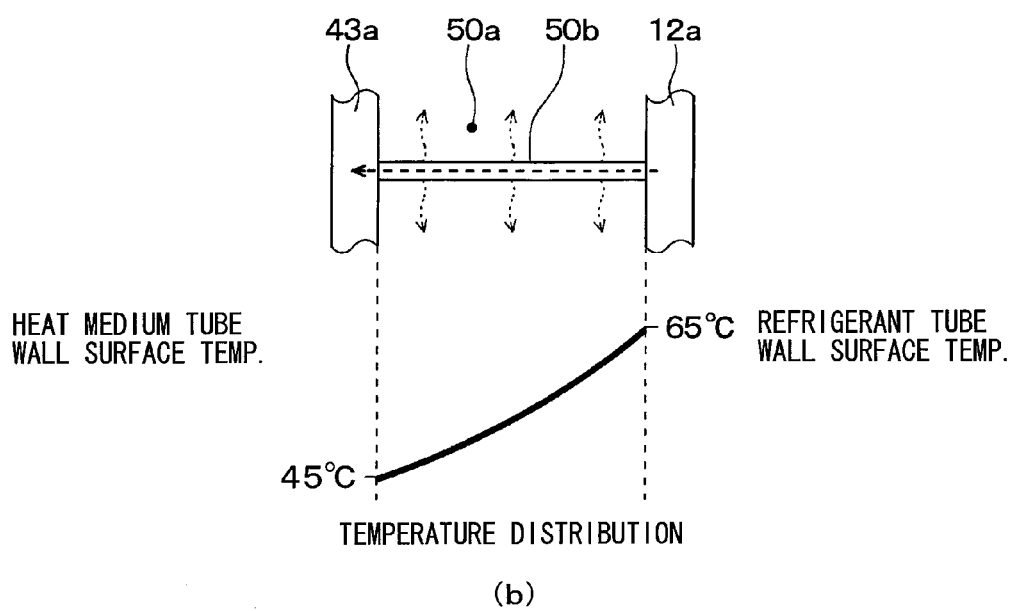

With reference to FIG. 2 to FIG. 4, a detailed configuration of the heat exchanger structure 50 is described below. In the following, FIG. 2 is a perspective view of the heat exchanger structure 50, and FIG. 3 is an exploded perspective view of a part of the heat exchanger structure 50, and FIG. 4 is a perspective view of a part of the heat exchanger structure 50 for illustrating a flow of the refrigerant and a flow of the coolant.

The heat exchanger structure 50 is a combined-type heat exchanger combining the refrigerant radiator 12 and the radiator 43 in one unit. The refrigerant radiator 12 and the radiator 43 are respectively formed as a so-called tank and tube type heat exchanger, respectively having a plurality of tubes 12a, 43a for passing the refrigerant/coolant and a pair of tanks on both ends of the plurality of tubes for collecting and distributing the refrigerant/coolant together with other parts.

More practically, the refrigerant radiator 12 is a first heat exchanger, which has a plurality of refrigerant tubes 12a (i.e., a first tube) for passing the refrigerant which is a first fluid and a refrigerant header tank part 12b (i.e., a first tank part) for collecting and distributing the refrigerant passing through the plurality of tubes 12a in an extending form extending in a laminating layer direction of the plurality of tubes 12a, for exchanging heat between the refrigerant passing in the refrigerant tubes 12a and the air that flows around the refrigerant tubes 12a (i.e., the outside air blown by the blower fan 13).

On the other hand, the radiator 43 is a second heat exchanger, which has a plurality of heat medium tubes 43a (i.e., a second tube) for passing a coolant which is a second fluid and a heat medium header tank part 43b (i.e., a second tank part) for collecting and distributing the coolant passing through the plurality of heat medium tubes 43a in an extending form extending in a laminating layer direction of the plurality of heat medium tubes 43a, for exchanging heat between the coolant passing in the heat medium tubes 43a and air that flows around the heat medium tubes 43a (i.e., the outside air blown by the blower fan 13).

Further, the refrigerant tubes 12a and the heat medium tubes 43a are respectively formed as a so-called plate tube that has a center-hollow structure by combining a pair of convex-concave-shape plates to have a hollow therein. Further, the refrigerant tubes 12a and the heat medium tubes 43a are made of material that has high heat conductivity (e.g., an aluminum alloy in the present embodiment).

Further, the refrigerant tubes 12a and the heat medium tubes 43a are positioned between the refrigerant header tank part 12b and the heat medium header tank part 43b as shown in FIG. 2 and FIG. 3. In other words, the refrigerant header tank part 12b is positioned on one end in a longitudinal direction of the refrigerant tubes 12a and the heat medium tubes 43a, and the heat medium header tank part 43b is positioned on the other end in the longitudinal direction of the refrigerant tubes 12a and the heat medium tubes 43a.

In an inside of the refrigerant tubes 12a, two refrigerant passages extending in a longitudinal direction of the refrigerant tubes 12a (i.e., a perpendicular direction that is perpendicular to a flow direction of the outside air that is blown from the blower fan 13) are arranged in parallel with each other along a flow line of the outside air from the blower fan 13 which is indicated by an arrow X. The cross section of the refrigerant passage has a shape that extends along the flow line of the outside air indicated by the arrow X.

Further, as shown in FIG. 3, an end of both of the two refrigerant passages that are arranged in two rows on a refrigerant header tank part 12b side has an opening that opens toward an outside of an end on the refrigerant tube 12a side. In the present embodiment, such an opening end of the refrigerant passage is positioned on the refrigerant header tank part 12b for communication between an inner space of the refrigerant header tank part 12b and both of the two refrigerant passages.

On the other hand, an end of both of the two refrigerant passages that are arranged in two rows on a heat medium header tank part 43b side does not have an opening that opens toward an outside, and such end of the two passages is connected with each other by a refrigerant turn part 12c. In such manner, an inner space of the heat medium header tank part 43b is not in communication with the refrigerant tube 12a, and the refrigerant passages in two rows are in communication with each other.

Therefore, in the refrigerant tube 12a of the present embodiment, the refrigerant flows into one of the two refrigerant passages from the refrigerant header tank part 12b as shown by a solid line arrow in FIG. 4, turns its flow direction at the refrigerant turn part 12c to flow into the other refrigerant passage, and returns to the refrigerant header tank part 12b.

The basic configuration of the heat medium tube 43a is similar to the refrigerant tube 12a. Therefore, a heat medium passage having a flat cross section and extending in a longitudinal direction of the heat medium tube 43a is formed in two rows in an inside of the heat medium tube 43a, along the flow line of the outside air from the blower fan 13 which is indicated by the arrow X.

Further, the heat medium passage of the heat medium tube 43a communicates with an inner space of the heat medium header tank part 43b on an end of a heat medium header tank part 43b side, and an end of both of the two heat medium passages on the refrigerant header tank part 12b is connected with each other by a heat medium turn part 43c that has the same structure as the refrigerant turn part 12c.

Therefore, in the heat medium tube 43a in the present embodiment, the coolant flows into one of the two heat medium passages from the heat medium header tank part 43b as shown by a broken line arrow in FIG. 4, turns its flow direction at the heat medium turn part 43c to flow into the other heat medium passage, and returns to the heat medium header tank part 43b.

Further, the refrigerant tube 12a and the heat medium tube 43a are alternatively layered with a predetermined gap interposed therebetween, with the outer surfaces of both tubes arranged in parallel with each other. In other words, the refrigerant tube 12a is arranged in between two heat medium tubes 43a, and the heat medium tube 43a is arranged in between two refrigerant tubes 12a in return.

Further, the predetermined gap, or the space between the refrigerant tube 12a and the heat medium tube 43a, serves as an outside air passage 50a (i.e., a third fluid passage, a heat exchange object fluid passage) that allows the outside air from the blower fan 13 to pass therethrough. In other words, the outside air passage 50a for passing the outside air is formed around the refrigerant tube 12a and the heat medium tube 43a.

Further, in the outside air passage 50a, an outer fin 50b is disposed, which is connected onto outer surfaces of the heat medium tube 43a and of the refrigerant tube 12a that face with each other, for facilitating heat exchange between the coolant and the outside air in the refrigerant radiator 12 and for facilitating heat exchange between the coolant and the outside air in the radiator 43, and for heat transfer between the refrigerant passing through the refrigerant tube 12a and the coolant passing through the heat medium tube 43a.

Further, in the present embodiment, the refrigerant header tank part 12b, the heat medium header tank part 43b and the outer fin 50b are made of the same metal material as the refrigerant tube 12a and the heat medium tube 43a, and are structured to have one unit by brazing. Further, the outer fin 50b is omitted from FIG. 3, for the clarity of illustration.

In the present embodiment, by adopting the heat exchanger structure 50 described above, a heat exchange system for heat exchange among plural types of fluids (i.e., among the refrigerant, the coolant and the air) can be realized. More practically, the heat exchange system for radiating heat from two fluids (i.e., the refrigerant and the coolant) to another fluid (i.e., the air) can be realized.

Now, an electric control unit (i.e., a controller hereinafter) of the present embodiment is described below. The controller of the present embodiment is comprised of a well-known microcomputer including a CPU, a ROM, and a RAM, and peripheral circuits thereof. The controller controls the operation of each of the air conditioning controllers 11, 13, 41, and the like connected to its output by executing various operations and processing based on air conditioning control programs stored in the ROM.

Further, a group of various sensors for control of air conditioning is coupled to the input side of the controller. The sensors include an inside air sensor for detecting a temperature of the vehicle compartment, an outside air sensor for detecting a temperature of the outside air, a solar radiation sensor for detecting an amount of solar radiation in the vehicle compartment, and an evaporator temperature sensor for detecting a temperature Te of the blowing air from the evaporator 16 (i.e., an evaporator temperature). The various sensors also include a discharged refrigerant temperature sensor for detecting a temperature of the discharged refrigerant discharged from the compressor 11, a discharged refrigerant pressure sensor for detecting a pressure of the discharged refrigerant from the compressor 11, which serves as a discharge pressure detection unit, a refrigerant temperature sensor for detecting a refrigerant temperature in the refrigerant radiator 12, which serves as a refrigerant temperature detection unit, a coolant temperature sensor for detection a temperature Tw of the coolant that flows out from the electric motor MG for traveling, which serves as a coolant temperature detection unit, and the like.

Further, the coolant temperature Tw flowing out from the electric motor MG for traveling is a temperature of the coolant flowing into the radiator 43. Therefore, such temperature may be detected in a passage ranging between a coolant outlet of the electric motor MG for traveling and the coolant inlet of the radiator 43.

Further, an operation panel which is positioned in a proximity of the instrument panel of the front part in the vehicle compartment (not illustrated) is coupled to an input side of the controller, for an input of operation signals from various air conditioning operation switches disposed on the operation panel. Various air conditioning operation switches on the operation panel may include, for example, an operation switch of the vehicular air conditioner, temperature setting switches for setting a vehicle compartment temperature and the like.

Further, the controller has, integrated therewith, a control device for controlling an operation of the electric motor 11b of the compressor 11 and the like. In the present embodiment, a configuration, i.e., a combination of hardware and software, in the controller is adapted for each of the control devices that respectively control the operations of control objects. That is, for example, a control configuration for controlling the operation of the compressor 11 is adapted as a discharge capacity control unit, and a control configuration for controlling the operation of the coolant pump 41 which serves as a heat medium flow amount adjustment unit is adapted as a heat medium flow amount control unit.

The operation of the above configuration in the present embodiment is described in the following. When the operation switch (not illustrated) of the vehicular air conditioner on the operation panel is put in an ON state (i.e., when the switch is turned ON) which the vehicle start switch is put in an ON state (i.e., when the switch is turned ON), the controller executes a program for the air conditioning control that is pre-memorized in a memory circuit. When executing the program, the controller reads detection signals from the group of sensors for the air conditioning control and reads the operation signal of the operation panel.

Then, the controller calculates a target blow temperature TAO which is a target temperature of the blowing air blown into the vehicle compartment based on the values of the detection signals and the value of the operation signal. Further, based on the calculated target blow temperature TAO and the detection signals of the sensor group, the controller determines the operation conditions of various air conditioning controllers connected to the output side of the controller.

For example, the refrigerant discharge capacity, or the control signal output to the electric motor of the compressor 11, is determined as follows. At first, based on the target blow temperature TAO, the controller determines a target evaporator blow temperature TEO of the refrigerant evaporator 16 with reference to a control map pre-memorized in the controller.

Then, the control signal output to the electric motor of the compressor 11 is determined based on a deviation between the target evaporator blow temperature TEO and the blowing air temperature Te that is detected by the evaporator temperature sensor in the refrigerant evaporator 16, so that the air temperature of the blowing air from the refrigerant evaporator 16 approaches the target evaporator blow temperature TEO by using a feedback control method.

Further, regarding the control signal output to a servo-motor of the air mixture door 34, it is determined based on the target blow temperature TAO and the blowing air temperature from the refrigerant evaporator 16 with reference to a control map pre-memorized in the controller, so that the temperature of the blowing air that is blown into the vehicle compartment becomes an occupant-desired temperature that is set by using a compartment temperature setting switch.

Then, the control signals determined in the above-described manner together with other signals are output to various air conditioning controllers. After such output, at predetermined intervals, a control routine repeats a cycle of (i) reading of the above detection/operation signals, (ii) calculation of the target blow temperature TAO, (iii) determination of operation states of various air conditioning controllers, and (iv) output of the control voltage and the control signal, until a request for stopping of the operation of the vehicular air conditioner is input from the operation panel.

Therefore, in the heat pump cycle 10, the discharged refrigerant discharged from the compressor 11 flows into the refrigerant radiator 12 for radiating heat therefrom by the heat exchange with the blowing air that is blown by the blower fan 13. Further, according to a study by the inventor of the present disclosure, it is understood that, in this heat pump cycle 10, the pressure of the discharged refrigerant rises to or higher than a standard refrigerant pressure P1 (e.g., about 1.5 MPa) at a normal drive time, and a surface temperature (i.e., a wall surface temperature) of the refrigerant tube 12a in the refrigerant radiator 12 rises to 60 to 65 degrees Celsius or the like by a high temperature refrigerant discharged from the compressor 11.

The refrigerant flowing out from the refrigerant radiator 12 is separated into the gas and the liquid at the receiver 14. The liquid phase refrigerant flowing out of the receiver 14 is decompressed and is expanded in the thermo-expansion valve 15 to become a low-pressure refrigerant. At such moment, the valve opening of the thermo-expansion valve 15 is controlled so as to control the degree of heating of the refrigerant on the outlet side of the refrigerant evaporator 16 within a predetermined value range.

The low-pressure refrigerant that is decompressed and expanded in the thermo-expansion valve 15 flows into the refrigerant evaporator 16, to evaporate by absorbing heat from the blowing air that is blown by the blower 32. In such manner, the blowing air blown into the vehicle compartment is cooled. The refrigerant flowing out from the refrigerant evaporator 16 is sucked by the compressor 11, and is compressed again.

On the other hand, as for the blowing air (i.e., a cooled air) cooled by the refrigerant evaporator 16, a part of the blowing air (i.e., a cooled air) which is determined by the opening degree of the air mixture door 34 is heated by the electric heater 36, and is mixed with the blowing air bypassed the heater 36 in the mixture space 35, for the adjustment of temperature. Then, temperature-adjusted blow air is blown into the vehicle compartment through each outlet from the mixture space 35.

By such blow air blown into the vehicle compartment, a cooling of the vehicle compartment can be realized when the inner temperature in the compartment is decreased to be lower than the outer temperature, or a heating of the vehicle compartment can be realized when the inner temperature in the compartment is increased to be higher than the outer temperature.

The operation of the coolant pump 41 of the coolant circulation circuit 40 is described below. As described above, in the hybrid vehicle of the present embodiment, the controller operates the engine or the electric motor MG for traveling, according to the travel load of the vehicle or the like. Because the electric motor MG for traveling is an in-vehicle device that emits heat at the time of operation, the temperature of the coolant rises when the controller operates the electric motor MG for traveling.

Further, it is preferable that the temperature of the electric motor MG for traveling (i.e., a coolant temperature) is equal to or higher than a lowest protection temperature Tlw (e.g., 60 degrees Celsius in the present embodiment) which is set for the reduction of the friction loss which is caused by an increase of the viscosity of a lubricant in the electric motor MG for traveling and is equal to or lower than a highest protection temperature Thi (e.g., 65 degrees Celsius in the present embodiment) which is set for the prevention of overheat of the electric motor MG for traveling.

Therefore, the controller controls the operation of the coolant pump 41 so that the coolant temperature Tw detected by the coolant temperature sensor is equal to or higher than the lowest protection temperature Tlw and is equal to or lower than the highest protection temperature Thi when the electric motor MG for traveling is in operation in the present embodiment.

More practically, when the coolant temperature Tw decreases below the lowest protection temperature Tlw, the controller decreases the inflow amount of the coolant flowing into the radiator 43 by decreasing the discharge amount of the coolant pump 41 to be a small flow amount, and when the coolant temperature Tw rises above the highest protection temperature Thi, the controller increases the inflow amount of the coolant flowing into the radiator 43 by increasing the discharge amount of the coolant pump 41 to be a large flow amount. In such manner, the coolant temperature Tw is controlled to be within the range between the lowest protection temperature Tlw and the highest protection temperature Thi when the electric motor MG for traveling is in operation.

Further, when the electric motor MG for traveling is in operation and the coolant temperature Tw decreases below the lowest protection temperature Tlw, it is preferable to stop the operation of the coolant pump 41 to restrict the dissipation of heat from the coolant in the radiator 43. However, if the operation of the coolant pump 41 stops completely, the coolant temperature sensor cannot adequately detect the change of the coolant temperature Tw of the coolant that flows out from the coolant passage of the electric motor MG for traveling.

Therefore, in the present embodiment, when the discharge amount of the coolant pump 41 is controlled to have a small flow amount, the inflow amount is controlled to stay at a level that enables the adequate detection of the change of the coolant temperature Tw of the coolant flowing out from the coolant passage by the coolant temperature sensor, and at a level that substantially prevents the heat exchange between the coolant and the outside air in the radiator 43. Further, when the discharge amount of the coolant pump 41 is controlled to have a large flow amount, the inflow amount is controlled to stay at a level that allows a sufficient heat exchange in the radiator 43 between the coolant and the outside air or between the coolant and the refrigerant.

On the other hand, when the electric motor MG for traveling is not in operation, the coolant temperature Tw may decrease below the lowest protection temperature Tlw since the electric motor MG for traveling does not emit heat. For example, the coolant temperature Tw is far below the lowest protection temperature Tlw just after the start of the vehicle operation, for example. Therefore, the controller of the present embodiment controls the discharge amount of the coolant pump 41 depending on the coolant temperature Tw when the coolant temperature Tw is lower than the lowest protection temperature Tlw.

More practically, when the pressure of the discharged refrigerant is equal to or higher than the above-described standard refrigerant pressure P1, and the coolant temperature Tw is equal to or higher than a predetermined second standard temperature T2 (i.e., 50 degrees Celsius) and is equal to or lower than a predetermined first standard temperature T1 (i.e., 60 degrees Celsius), the discharge amount of the coolant pump 41 is controlled to have a small flow amount, and, when the coolant temperature Tw is lower than the second standard temperature T2, the discharge amount of the coolant pump 41 is controlled to have a large flow amount.

In the present embodiment, the first standard temperature T1 is set to be equal to the lowest protection temperature Tlw. However, the first standard temperature T1 may be set to have a value that is lower than temperature of the discharged refrigerant flowing into the refrigerant radiator 12 (e.g., a value that is lower than a highest possible temperature of the discharged refrigerant), and a value that is higher than the temperature of the outside air flowing into the radiator 43. Further, the second standard temperature T2 may be set to the temperature that is lower than the first standard temperature T1.

In the present embodiment, according to the above-described control of the operation of the coolant pump 41 by the controller, heat exchange in the heat exchanger structure 50 can be performed in the following manner. With reference to FIG. 5(a) to FIG. 8(b), heat exchange between the refrigerant, the coolant and the air (i.e., the outside air) is described in the following.

Case (A): the lowest protection temperature Tlw<the coolant temperature Tw≤the highest protection temperature Thi The heat exchange among the refrigerant, the coolant and the air (i.e., the outside air) when the coolant temperature Tw is higher than the lowest protection temperature Tlw (i.e., 60 degrees Celsius) and is equal to or lower than the highest protection temperature Thi (65 degrees Celsius) is described with reference to FIGS. 5(a) and 5(b) and FIGS. 6(a) and 6(b).

FIG. 5(a) is a three-dimensional temperature distribution diagram illustrating a simulation result of the temperature distribution on the outer fin 50b when the surface temperature (i.e., the wall surface temperature) of the heat medium tube 43a of the radiator 43 is 65 degrees Celsius, the surface temperature (i.e., the wall surface temperature) of the refrigerant tube 12a of the refrigerant radiator 12 is 65 degrees Celsius, and an outside temperature is 35 degrees Celsius. FIG. 5(b) is an illustration of the temperature distribution on the outer fin 50b in an X arrow view that is aligned with a flow direction of the outside air on the same temperature condition.

Further, FIGS. 6(a) and 6(b) are the diagrams similar to those of FIGS. 5(a) and 5(b) when the surface temperature of the heat medium tube 43a of the radiator 43 is 60 degrees Celsius, and the surface temperature of the refrigerant tube 12a of the refrigerant radiator 12 is 65 degrees Celsius. In FIG. 5(b) and FIG. 6(b), the transfer of heat is indicated by a broken line arrow.

As shown in FIGS. 5(a) and 5(b), when the surface temperature of the refrigerant tube 12a is same as the surface temperature of the heat medium tube 43a, heat of the coolant and heat of the discharged refrigerant discharged from the compressor 11 are radiated through the outer fin 50b to the outside air that flows in the outside air passage 50a. In the course of dissipation (heat radiation), 50% of the outer fin 50b on a heat medium tube 43a side is used for radiating heat from the coolant to the outside air, and the rest, i.e., 50%, of the outer fin 50b on a refrigerant tube 12a side is used for radiating heat from the discharged refrigerant to the outside air.

Further, as shown in FIGS. 6(a) and 6(b), even when the temperature difference between the surface temperature of the heat medium tube 43a and the surface temperature of the refrigerant tube 12a is 5 degree Celsius, heat of the coolant and heat of the discharged refrigerant are radiated to the outside air through the outer fin 50b. In the course of dissipation (heat radiation), 65% of the outer fin 50b on the heat medium tube 43a side is used for radiating heat from the coolant to the outside air, and the rest, i.e., 35%, of the outer fin 50b on a refrigerant tube 12a side is used for radiating heat from the discharged refrigerant to the outside air.

In other words, when the temperature difference between the surface temperature of the heat medium tube 43a and the surface temperature of the refrigerant tube 12a is equal to or lower than a predetermined value (i.e., 5 degree Celsius in the present embodiment), that is, when the coolant temperature Tw is higher than 60 degrees Celsius and is equal to or lower than 65 degrees Celsius, a heat dissipation area of the outer fin 50b for radiating heat from the coolant to the outside air and another heat dissipation area of the outer fin 50b for radiating heat from the refrigerant to the outside air are controlled according to the temperature difference, for adequately radiating heat from the coolant and from the discharged refrigerant to the outside air.

In other words, heat from the discharged refrigerant is transferred to the outside air by the refrigerant radiator 12 and heat from the coolant is transferred to the outside air by the radiator 43. As a result, a heat exchange system which performs heat exchange adequately among the plural types of fluids can be realized.

Case (B): the second standard temperature T2≤the coolant temperature Tw≤the first standard temperature T1

The heat exchange among the refrigerant, the coolant and the air (i.e., the outside air) when the pressure of the discharged refrigerant is equal to or higher than the above-described standard refrigerant pressure P1, and the coolant temperature Tw is equal to or higher than the second standard temperature T2 (i.e., 50 degrees Celsius) and is equal to or lower than the first standard temperature T1 (i.e., 60 degrees Celsius) is described with reference to FIGS. 7(a) and 7(b).

Further, FIGS. 7(a) and 7(b) are the similar diagrams to FIGS. 5(a) and 5(b), in a situation where the surface temperature of the heat medium tube 43a of the radiator 43 is 55 degrees Celsius, and the surface temperature of the refrigerant tube 12a of the refrigerant radiator 12 is 65 degrees Celsius.

As shown in FIGS. 7(a) and 7(b), when the coolant temperature Tw is equal to or higher than the second standard temperature T2 (i.e., 50 degrees Celsius) and is equal to or lower than the first standard temperature T1 (i.e., 60 degrees Celsius), the discharge amount of the refrigerant pump 41 becomes a small flow amount, such that an the operation of the coolant pump 41 is substantially stopped. Therefore, a very small amount of heat is transferred from the coolant to the outside air, and heat of the discharged refrigerant is transferred to the outside air. In other words, almost all area (99%) of the outer fin 50b is used to dissipate heat from the discharged refrigerant to the outside air.

Therefore, even when the coolant temperature Tw decreases below the first standard temperature T1 and the temperature difference between the temperature of the discharged refrigerant and the temperature of the coolant increases, the unwanted heat exchange between the discharged refrigerant and the coolant is prevented, for efficiently radiating heat from the discharged refrigerant to the outside air.

In other words, heat dissipation by the refrigerant radiator 12 from the discharged refrigerant to the outside air can be performed, and heat exchange by the radiator 43 between the coolant and the outside air/discharged refrigerant is restricted. As a result, a heat exchange system which performs heat exchange adequately among the plural types of fluids can be realized.

Case (C): the coolant temperature Tw<the second standard temperature T2

The heat exchange among the refrigerant, the coolant and the air (i.e., the outside air) when the coolant temperature Tw is lower than the second standard temperature T2 (i.e., 50 degrees Celsius) is described with reference to FIG. 8A/B. Further, FIGS. 8(a) and 8(b) are the similar diagrams as FIGS. 5(a) and 5(b), showing a situation in which the surface temperature of the heat medium tube 43a of the radiator 43 is 45 degrees Celsius, and the surface temperature of the refrigerant tube 12a of the refrigerant radiator 12 is 65 degrees Celsius.

When the second coolant temperature Tw is below the second standard temperature T2 (i.e., 50 degrees Celsius) as shown in FIGS. 8(a) and 8(b), even though the discharge amount of the coolant pump 41 becomes a large flow amount, heat will not be transferred from the coolant to the outside air. That is, heat from the discharged refrigerant is transferred to the outside air, and, heat exchange between the coolant and the discharged refrigerant can be performed by the radiator 43. In such case, heat is transferable from the discharged refrigerant to the coolant by an amount that is capable of heating the entire coolant circulation circuit 40. Therefore, when the temperature difference between the discharged refrigerant and the coolant is large and the temperature of the coolant is low, a very large amount of heat can be transferred from the discharged refrigerant to the coolant circulation circuit 40.

In other words, the entire area of the outer fin 50b is used to dissipate heat from the discharged refrigerant to the outside air, and the outer fin 50b is also used to dissipate heat from the discharged refrigerant to the coolant. Therefore, when the coolant temperature Tw decreases below the second standard temperature T2 to have an increased temperature difference between the discharged refrigerant and the coolant, heat exchange between the discharged refrigerant and the coolant is facilitated to dissipate heat from the discharged refrigerant to both of the outside air and the coolant, thereby increasing the amount of heat exchange (i.e., a heat radiation amount) on a discharged refrigerant side.

This is very effective in particular for the cool down driving at the time of the start of the vehicle or the like. In other words, when the heat generation amount of the electric motor MG for traveling is small and the temperature of the coolant is low, the heat pump cycle 10 has to be operated at the maximum cooling power, even though the cooling capacity of the electric motor MG for traveling in the coolant circulation circuit 40 is not required. Therefore, by radiating heat from the discharged refrigerant by a larger amount in such situation, the efficient air conditioning is achieved.

As described above, the present embodiment realizes a heat exchange system that adequately exchanges heat among the plural types of fluids (i.e., among a discharged refrigerant, a coolant, and an air) regardless of the temperature change of the coolant. Specifically, when the temperature difference between the discharged refrigerant and the coolant increases, the heat radiation amount is increased by facilitating heat exchange between the discharged refrigerant and the coolant. Such a capability of increasing the heat radiation amount at the time of having a greater temperature difference between the discharged refrigerant and the coolant is very effective, in term of increase of the refrigeration capacity of the heat pump cycle 10.

Therefore, the second standard temperature T2 may be set to a value that is lower than the first standard temperature T1, and to a value that enables the increase of the refrigeration capacity of the heat pump cycle 10 by the increase of the heat radiation amount of the discharged refrigerant when heat exchange between the discharged refrigerant and the coolant is facilitated.

Further, in the present embodiment, the flow amount of the coolant is decreased when the pressure of the discharged refrigerant is higher than the standard refrigerant pressure P1. Therefore, the temperature of the discharged refrigerant securely rises to 60 to 65 degrees Celsius. Thus, the temperature difference between the discharged refrigerant and the coolant is securely reserved when the coolant temperature Tw is lower than the second standard temperature T2 (i.e., 50 degrees Celsius).

Further, in the present embodiment, the refrigerant radiator 12 and the radiator 43 are structured as the heat exchanger structure 50. Therefore, heat transfer between the discharged refrigerant and the coolant is made extremely easy.

Further, heat transfer between the discharged refrigerant and the coolant can be performed through the outer fin 50b. Therefore, heat from the discharged refrigerant is more easily transferred to the outside air than to the coolant when heat is firstly transferred to the outer fin 50b. Thus, when the flow amount of the coolant is decreased, heat from the discharged refrigerant is efficiently transferred to the outside air.

(Second Embodiment)

Figure 9:
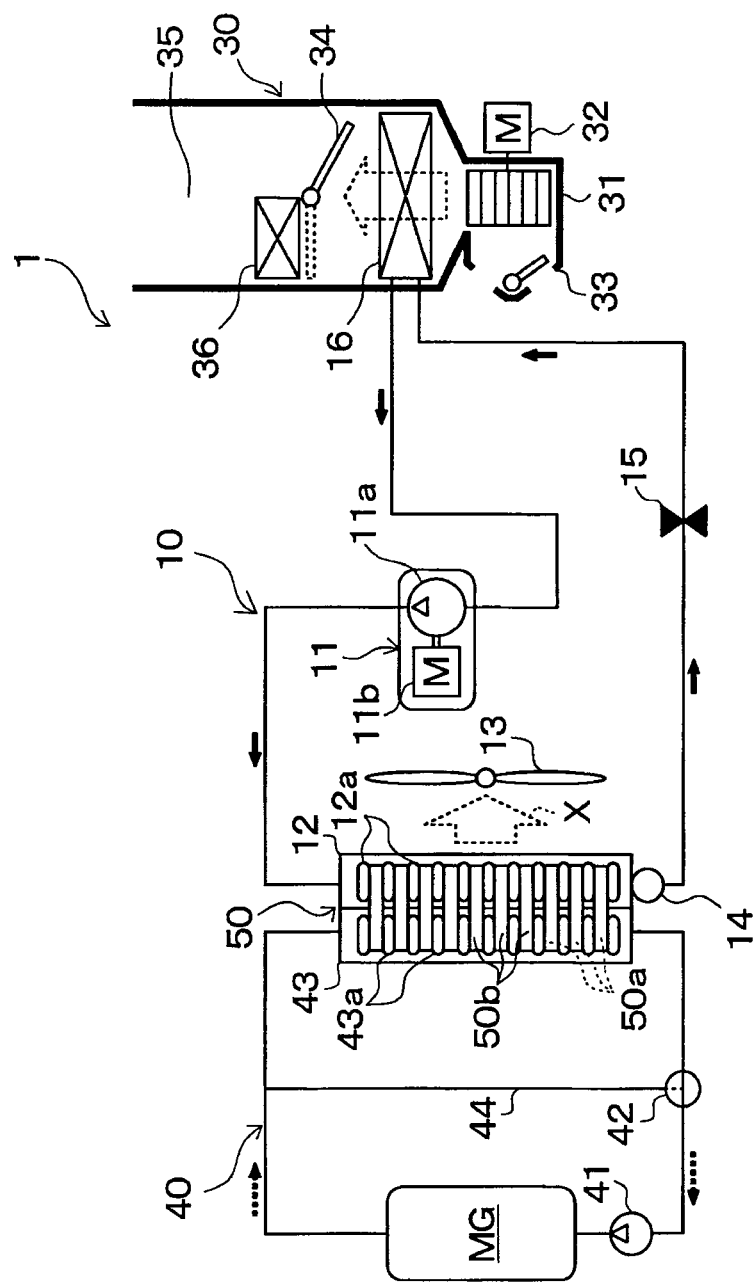
FIG. 9 is a schematic diagram showing a total configuration of a vehicular air conditioner in a second embodiment.

In the present embodiment, as shown in FIG. 9, a configuration of the coolant circulation circuit 40 is changed from the first embodiment. More practically, the coolant circulation circuit 40 has, in addition to the coolant pump 41 and the radiator 43, an electric-type three-way valve 42 and a bypass passage 44 that bypasses a flow of the coolant around the radiator 43. Further, in FIG. 9, like parts have like numbers as the first embodiment. Such numbering also applies to the other drawings.

The three-way valve 42 switches two circuits, that is, a heat medium circuit that connects an inlet side of the coolant pump 41 and an outlet side of the radiator 43 to introduce the coolant flowing into the radiator 43 and let detour around the radiator 43, and a heat medium circuit that connects an inlet side of the coolant pump 41 and an outlet side of the bypass passage 44 to bypass the coolant around the radiator 43. Further, the operation of the three-way valve 42 is controlled by a control voltage that is output from the controller.

In other words, in the coolant circulation circuit 40 of the present embodiment, a heat medium circuit from the coolant pump 41 to the electric motor MG for traveling, to the radiator 43, and to the coolant pump 41 and a heat medium circuit from the coolant pump 41 to the electric motor MG for traveling, to the bypass passage 44, and to the coolant pump 41 are switched.

Further, when the three-way valve 42 switches a circuit to the one that controls the coolant to bypass the radiator 43, the coolant will not flow into the radiator 43. In other words, the inflow amount of the coolant flowing into the radiator 43 is reduced. Therefore, the three-way valve 42 of the present embodiment serves as a heat medium flow amount adjustment unit.

Further, when the vehicle start switch is turned on (i.e., switched ON) in the present embodiment, the controller operates the coolant pump 41 so that a predetermined discharge amount is discharged from the pump 41. Further, when the electric motor MG for traveling is in operation, the controller controls the operation of the three-way valve 42 so that the coolant temperature Tw is kept to be equal to or higher than the lowest protection temperature Tlw and to be equal to or lower than the highest protection temperature Thi.

More practically, when the coolant temperature Tw decreases below the lowest protection temperature Tlw, the controller switches the heat medium circuit to the one that flows the coolant to bypass the radiator 43, and, when the coolant temperature Tw rises above the highest protection temperature Thi, the controller switches the heat medium circuit to the one that flows the coolant into the radiator 43. Further, in the present embodiment, even when the heat medium circuit is switched to the one that flows the coolant to bypass the radiator 43, the controller does not change the discharge amount of the coolant pump 41. Therefore, the change of the coolant temperature Tw is securely detected at such time.

Further, in a case where the electric motor MG for traveling is not in operation, when the pressure of the discharged refrigerant is equal to or higher than above-described standard refrigerant pressure P1, and, under such circumstance, when the coolant temperature Tw is equal to or higher than the second standard temperature T2 that is determined in the same manner as the first embodiment and is equal to or lower than the first standard temperature T1 that is determined in the same manner as the first embodiment, the controller switches the heat medium circuit to the one that flows the coolant to bypass the radiator 43. In contrast, when the coolant temperature Tw is below the second standard temperature T2, the controller switches the heat medium circuit to the one that flows the coolant into the radiator 43.

Other configuration and operation of the present embodiment is same as the first embodiment. Therefore, the heat exchange system of the present embodiment is controlled substantially in the same manner as the heat exchange system of the first embodiment, thereby enabling an adequate heat exchange system that exchanges heat among the plural types of fluids (i.e., among a discharged refrigerant, a coolant, and an air), regardless of the temperature change of the coolant.

(Third Embodiment)

Figure 10:
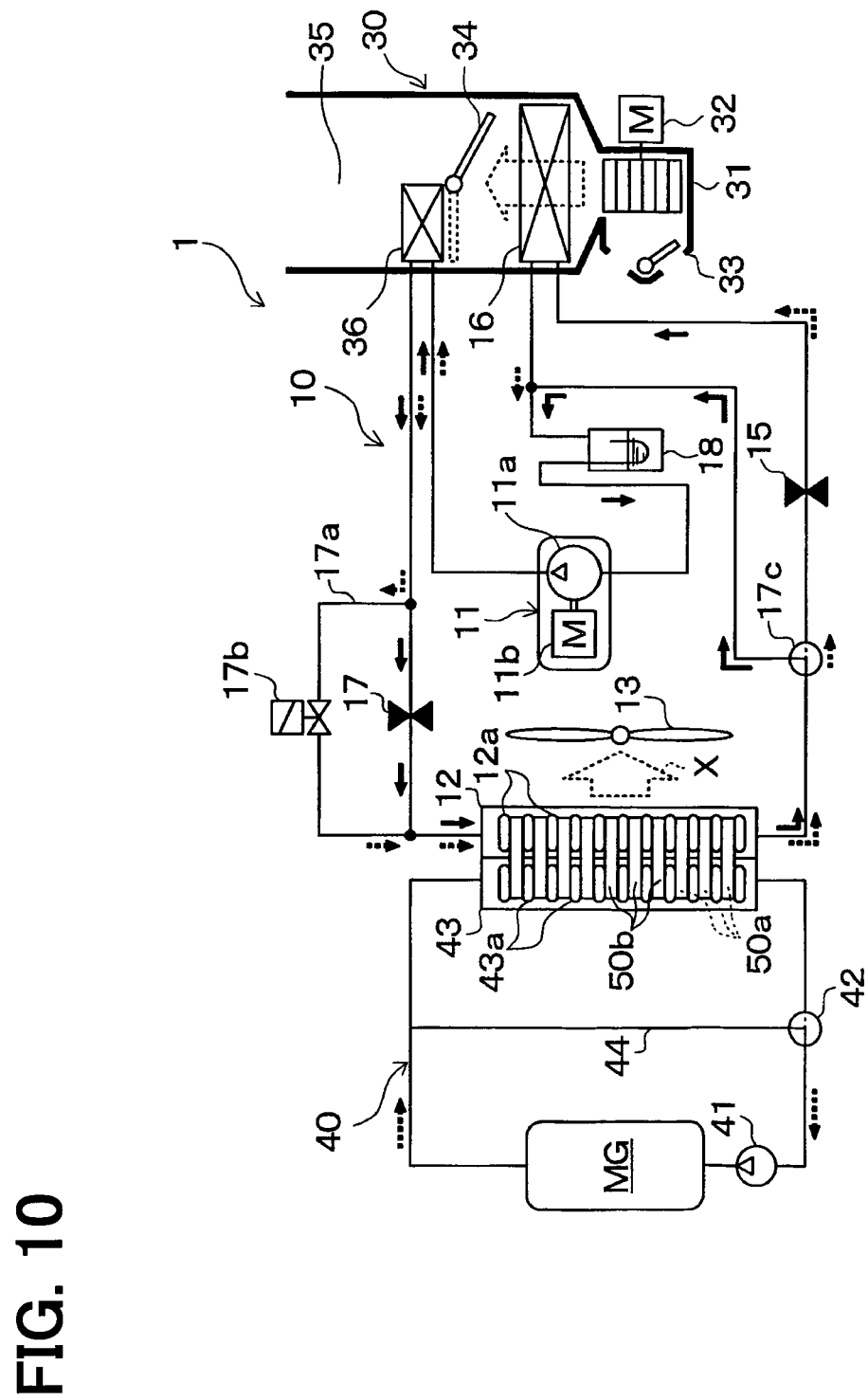
FIG. 10 is a schematic diagram showing a total configuration of a vehicular air conditioner in a third embodiment.

In the present embodiment, as shown in FIG. 10, a configuration of the heat pump cycle 10 is changed from the second embodiment. The heat pump cycle 10 of the present embodiment has a switchable refrigerant circuit that is switchable between a heating operation and a cooling operation, i.e., the heating operation for heating a blowing air that is blown into the vehicle compartment (i.e., "heating mode") and the cooling operation for cooling a blowing air that is blown into the vehicle compartment (i.e., "cooling mode").

More practically, a refrigerant inlet side of an interior condenser 37 is connected to a refrigerant discharge port of the compressor 11 in the present embodiment. The interior condenser 37 is a heater (i.e., a heat exchanger for heating), disposed in the casing 31 of an interior air conditioning unit 30 of the vehicular air conditioner 1, for heat exchange between a high-temperature high-pressure refrigerant flowing therein (i.e., in the casing 31) and a blowing air blown into the vehicle compartment after passing the refrigerant evaporator 16. Therefore, in the present embodiment, the electric heater 36 is not used.

A heating fixed throttle 17, which serves as a decompression unit for heating operation that depressurizes and expands the refrigerant which flows out from the interior condenser 37 at the time of heating operation, is connected to the refrigerant outlet side of the interior condenser 37. As the heating fixed throttle 17, an orifice, a capillary tube or the like may be used. A refrigerant inlet side of the refrigerant radiator 12 is connected to the outlet side of the heating fixed throttle 17.

Further, in the present embodiment, the refrigerant radiator 12 functions, in the cooling operation, as a heat radiating heat exchanger for radiating heat from the refrigerant to the outside air by switching the refrigerant circuits of the heat pump cycle 10, and functions, in the heating operation, as a heat absorbing heat exchanger for absorbing heat from the outside air to the refrigerant. Therefore, in the following explanation of the present embodiment, the "refrigerant radiator 12" is designated as an "exterior heat exchanger 12."

Further, a fixed throttle bypass passage 17a for directing the refrigerant flowing out from the interior condenser 37 to the exterior heat exchanger 12 side by bypassing the heating fixed throttle 17 is connected to the refrigerant outlet side of the interior condenser 37.

The fixed throttle bypass passage 17a has an open-close valve 17b that opens and closes the fixed throttle bypass passage 17a. The open-close valve 17b is an electromagnetic valve that controls its opening and closing operation according to the control voltage output by the controller.

Further, due to the reason that a pressure loss of the refrigerant when the refrigerant passes through the open-close valve 17b is extremely smaller than a pressure loss when the refrigerant passes through the fixed throttle 17, the refrigerant flowing out from the interior condenser 37 flows into the exterior heat exchanger 12 through a fixed throttle bypass passage 17a side when the open-close valve 17b is open, and flows into the exterior heat exchanger 12 through the heating fixed throttle 17 when the open-close valve 17b is closed.

In such manner, the open-close valve 17b can switch the refrigerant passages of the heat pump cycle 10. Therefore, the open-close valve 17b of the present embodiment serves as a refrigerant passage switch unit.

Further, the electric-type three-way valve for switching a refrigerant circuit that connects an outlet side of the interior condenser 37 and an inlet side of the heating fixed throttle 17 and a refrigerant circuit that connects an outlet side of the interior condenser 37 and an inlet side of the fixed throttle bypass passage 17a may also be used as a refrigerant passage switch unit.

An electric-type three-way valve 17c is connected to an outlet side of the exterior heat exchanger 12. The operation of the three-way valve 17c is controlled according to the control voltage from the controller, and the three-way valve 17c serves as a refrigerant passage switch unit together with the above-described open-close valve 17b.

More practically, the three-way valve 17c switches, in the heating operation, a refrigerant flow to a refrigerant passage that connects an outlet side of the exterior heat exchanger 12 and an inlet side of an accumulator 18 that is described later, and switches, in the cooling operation, a refrigerant flow to a refrigerant passage that connects an outlet side of the exterior heat exchanger 12 and an inlet side of a cooling fixed throttle 19.

The cooling fixed throttle 19 is a decompression unit for the cooling operation which expands the refrigerant flowing out from the exterior heat exchanger 12 in the cooling operation, and a basic configuration of the fixed throttle 19 is similar to the heating fixed throttle 17. Further, a refrigerant inlet side of the refrigerant evaporator 16 is connected to an outlet side of the cooling fixed throttle 19, and an inlet side of the accumulator 18 is connected to a refrigerant outlet side of the refrigerant evaporator 16.

The accumulator 18 serves as a low-pressure side refrigerant gas-liquid separator for separating the refrigerant flowing therein into gas and liquid and for storing a surplus refrigerant in the cycle. A suction side of the compressor 11 is connected to a gas-phase refrigerant outlet of the accumulator 18. Therefore, the accumulator 18 restricts the suction of the liquid-phase refrigerant by the compressor 11, and prevents a liquid compression of the compressor 11. The other configuration of the present embodiment is similar to the one in the second embodiment.

The operation of the present embodiment in the above configuration is described in the following. As described above, the vehicular air conditioner 1 of the present embodiment switches the refrigerant circuit of the heat pump cycle 10 to perform either a heating operation (i.e., heating mode) for heating the vehicle compartment or a cooling operation (i.e., cooling mode) for cooling the vehicle compartment.

The heating operation is described first. The heating operation is started when a not-illustrated vehicle start switch is put in an ON state (i.e., is turned ON) and the operation switch of the vehicular air conditioner on the operation panel is put in an ON state (i.e., is turned ON), and a selector switch on the operation panel is used to select a heating operation mode.

In the heating operation, the controller closes the open-close valve 17b and switches the three-way valve 17c to the refrigerant passage that connects an inlet side of the accumulator 18 to an outlet side of the exterior heat exchanger 12. In such manner, the heat pump cycle 10 is switched to have the refrigeration passage in which the refrigerant flows in a solid line arrow direction of FIG. 10.

In such configuration of the refrigerant passage, the controller reads the detection signals of the above-described sensor group for the air conditioning control and the operation signal of the operation panel, and then, in the same manner as the first embodiment, calculates the target blow temperature TAO to which temperature of the blowing air blown into the vehicle compartment is adjusted based on the detection signals and the operation signal. Further, based on the calculated target blow temperature TAO and the detection signals of the sensor group, the controller determines operation conditions of various air conditioning controllers that are connected to an output side of the controller.

Then, the controller outputs control signals to various air conditioning controllers so that the determined operation conditions are realized. Then, until a request for stopping the operation of the vehicular air conditioner is provided by the operation panel, the control routine of the following operations is repeated at predetermined intervals. That is, the routine repeats a cycle of (i) the reading of the detection/operation signal, (b) the calculation of the target blow temperature TAO, (ii) the determination of the operation condition of the various air conditioning controllers, and (iii) the output of the control voltage and the control signal.

Then, in the heat pump cycle 10 of the heating operation, a high pressure refrigerant discharged from the compressor 11 flows into the interior condenser 37. The refrigerant which has flowed into the interior condenser 37 exchanges heat with the blowing air that is blown from the blower 32 and has passed through the refrigerant evaporator 16, for radiating heat. In such manner, the blowing air to be blown into the vehicle compartment is heated.

The high pressure refrigerant flowing out from the interior condenser 37 flows into the heating fixed throttle 17 to be depressurized and expanded, because the open-close valve 17b is closed. The low-pressure refrigerant that is depressurized and expanded by the heating fixed throttle 17 then flows into the exterior heat exchanger 12. The low-pressure refrigerant that has flowed into the exterior heat exchanger 12 absorbs heat from the outside air that is blown by the blower fan 13 and evaporates.

The refrigerant flowing out from the exterior heat exchanger 12 flows into the accumulator 18 for the separation of gas from liquid, because the three-way valve 17c is switched to the refrigerant passage that connects an inlet side of the accumulator 18 to an outlet side of the exterior heat exchanger 12. Then, a gas-phase refrigerant separated by the accumulator 18 is sucked by the compressor 11, to be compressed again.

At such moment, in the coolant circulation circuit 40, the operation of the three-way valve 42 is controlled just like the second embodiment, so that the coolant temperature Tw rises to be equal to or higher than the lowest protection temperature Tlw and to be equal to or lower than the highest protection temperature Thi, if the electric motor MG for traveling is in operation.

Therefore, when the electric motor MG for traveling is in operation, the low-pressure refrigerant which has flowed into the exterior heat exchanger 12 can efficiently absorb heat from the coolant through the outer fin 50b.

Further, when the electric motor MG for traveling is not in operation and the coolant temperature Tw is lower than the protection temperature Tlw and the refrigerant temperature in the exterior heat exchanger 12 detected by the refrigerant temperature sensor is higher than 0 degree Celsius, the controller controls the operation of the three-way valve 42 to switch the heat medium circuit to the one that flows the coolant to bypass the radiator 43.

Therefore, when the coolant temperature Tw is lower than the lowest protection temperature Tlw and the refrigerant temperature in the exterior heat exchanger 12 detected by the refrigerant temperature sensor is higher than 0 degree Celsius, heat dissipation from the coolant to the refrigerant flowing in the exterior heat exchanger 12 will not be caused, and the heat absorption by the coolant from the refrigerant flowing in the exterior heat exchanger 12 will not be caused.

On the other hand, when the electric motor MG for traveling is not in operation and the coolant temperature Tw is lower than the protection temperature Tlw and the refrigerant temperature in the exterior heat exchanger 12 detected by the refrigerant temperature sensor is equal to or lower than 0 degree Celsius, the controller controls the operation of the three-way valve 42 to switch the heat medium circuit to the one that introduces the coolant into the radiator 43, since such a low temperature may have caused frost formation on an outer surface of the exterior heat exchanger 12.

In such manner, heat is transferred from the coolant to the exterior heat exchanger 12 through the outer fin 50b, for defrosting the exterior heat exchanger 12.

The cooling operation is now described. The cooling operation is started when the operation switch on the operation panel is put in an ON state (i.e., is turned ON), and a selector switch on the operation panel is used to select a cooling operation mode. At the time of cooling operation, the controller opens the open-close valve 17b and switches the three-way valve 17c to the refrigerant passage that connects an inlet side of the cooling fixed throttle 19 to an outlet side of the exterior heat exchanger 12.

In such manner, the heat pump cycle 10 is switched to have the refrigeration passage in which the refrigerant flows in a broken line arrow direction. In other words, the configuration of the refrigerant passage is switched to the one that is same as the first and second embodiment. Further, at the time of the cooling operation, the controller controls the operation of each of the control object devices in the same manner as the second embodiment.

Therefore, the heat exchange system of the present embodiment also enables, in the same manner as the second embodiment, an adequate heat exchange system that exchanges heat among the plural types of fluids (i.e., among a discharged refrigerant, a coolant, and an air) at the time of cooling operation, regardless of the temperature change of the coolant.

(Fourth Embodiment)

The first embodiment describes a situation that the discharge amount of the coolant pump 41 is reduced, when the pressure of the discharged refrigerant is equal to or higher than the above-described standard refrigerant pressure P1, and the coolant temperature Tw is equal to or higher than the second standard temperature T2 and is equal to or lower than the first standard temperature T1. The present embodiment is about a situation that the control of the coolant pump 41 is changed from the above. The total configuration of the vehicular air conditioner 1 is same as the first embodiment, which is shown in FIG. 1.

In the present embodiment, in case that the electric motor MG for traveling is in operation, the controller controls the operation of the coolant pump 41, so that the coolant temperature Tw detected by the coolant temperature sensor is controlled to be equal to or higher than the lowest protection temperature Tlw and to be equal to or lower than the highest protection temperature Thi, in the same manner as the first embodiment.

On the other hand, in case that the electric motor MG for traveling is not in operation, the discharge amount of the coolant pump 41 is controlled to have a small flow amount when the coolant temperature Tw is equal to or higher than a third standard temperature T3 and is equal to or lower than the first standard temperature T1 (i.e., 60 degrees Celsius)

that is determined in the same manner as the first embodiment. Further, as the coolant temperature Tw further decreases below the first standard temperature T1, the discharge amount of the coolant pump 41 is increased.

Further, when the coolant temperature Tw is lower than the third standard temperature T3, the discharge amount of the coolant pump 41 is controlled to have a large flow amount. Further, the third standard temperature T3 is set to have a value that is calculated by subtracting a predetermined value ΔT (10 degrees Celsius in the present embodiment) from a saturation temperature of the discharged refrigerant in the refrigerant radiator 12 which is determined based on a pressure of the discharged refrigerant from the compressor 11 and temperature of the discharged refrigerant in the refrigerant radiator 12 respectively detected by a discharged pressure sensor and a refrigerant temperature sensor.

Further, in the present embodiment, for the calculation of an accurate saturation temperature of the discharged refrigerant in the refrigerant radiator 12, both of the detected pressure of the discharged pressure sensor and the detected temperature of the refrigerant temperature sensor are used for such calculation. However, the saturation temperature may be calculated based on only one of the values from the discharged pressure sensor and the refrigerant temperature sensor.

Figure 11:
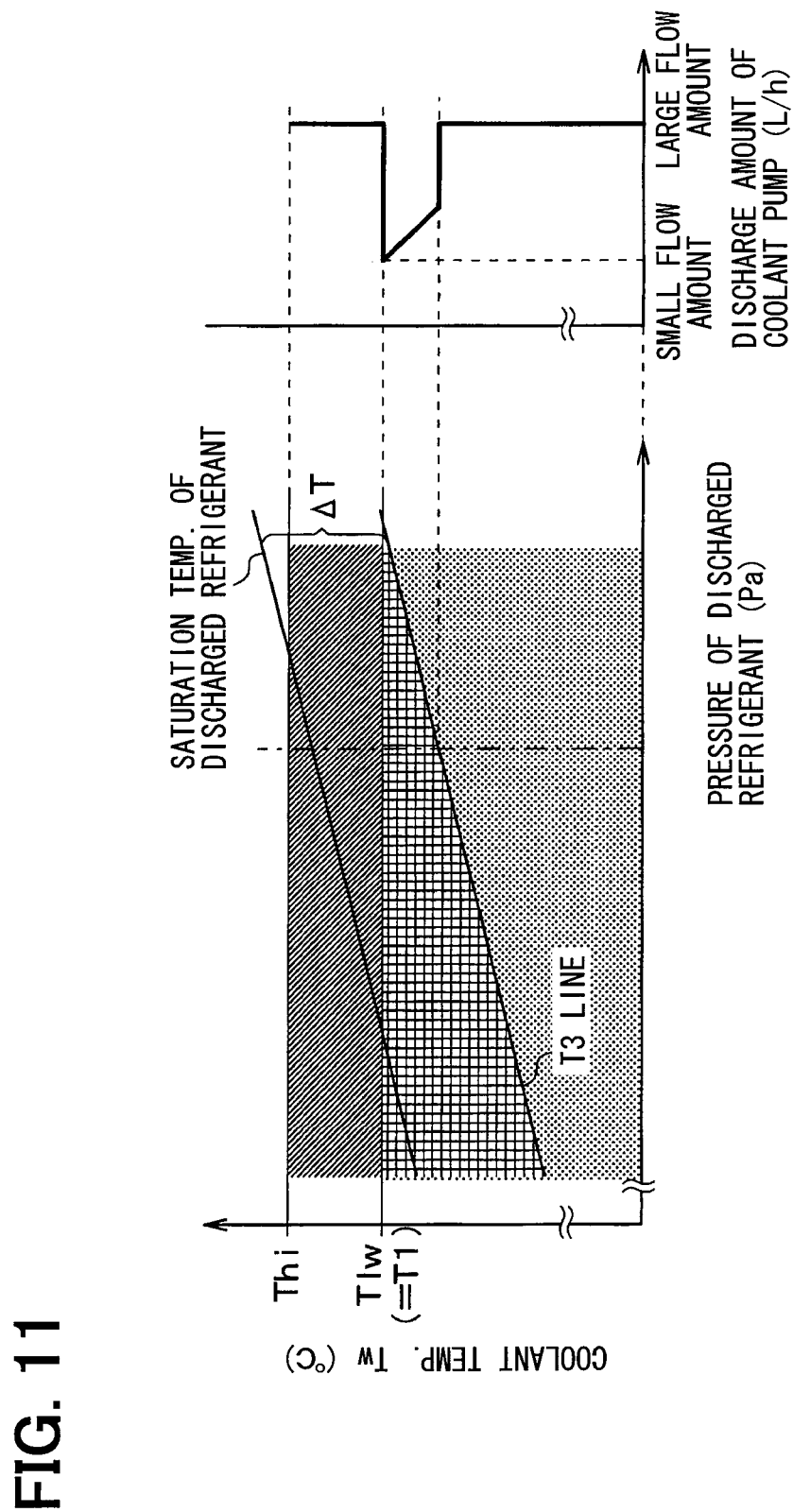
FIG. 11 is a diagram for explaining an operation of a coolant pump in a fourth embodiment.

Therefore, in the present embodiment, the operation of the coolant pump 41 is controlled in a manner that is illustrated in the drawing of FIG. 11, for an adequate heat exchange among plural types of fluids (i.e., among a refrigerant, a coolant, and an air).

More practically, when the electric motor MG for traveling is in operation, that is, in a slash line hatching area of FIG. 11, the coolant temperature Tw is controlled to be within a range between the lowest protection temperature Tlw and the highest protection temperature Thi. Therefore, as already described in the case (A) "the lowest protection temperature Tlw<the coolant temperature Tw≤the highest protection temperature Thi" in the first embodiment, heat is adequately transferred from the coolant and the refrigerant to the outside air.

Further, when the coolant temperature Tw is equal to or higher than the third standard temperature T3 and is equal to or lower than the first standard temperature T1, that is, in a net pattern hatching area of FIG. 11, the discharge amount of the coolant pump 41 is reduced. Therefore, as already described in the case (B) "the second standard temperature T2≤the coolant temperature Tw≤the first standard temperature T1" in the first embodiment, the outer fin 50b is used to dissipate heat from the discharged refrigerant to the outside air, for efficiently radiating heat from the discharged refrigerant to the outside air.

In such case, since the third standard temperature T3 is set to have a value that is calculated by subtracting a predetermined value from the saturation temperature of the discharged refrigerant in the refrigerant radiator 12, the third standard temperature T3 is set according to temperature of the discharged refrigerant that is discharged from the refrigerant radiator 12.

In other words, it enables an increase of a temperature range in which the discharge amount of the coolant pump 41 is controlled to decrease according to the decrease of the temperature of the discharged refrigerant from the refrigerant radiator 12. That is, a difference between the third standard temperature T3 and the first standard temperature T1 is increased.

Therefore, as the temperature of the discharged refrigerant decreases, making it harder to heat the heat exchange object fluid, the difference between the third standard temperature T3 and the first standard temperature T1 is increased, which facilitates an adequate and efficient heat exchange between the discharged refrigerant and the outside air by further restricting the unwanted heat exchange between the discharged refrigerant and the coolant.

Further, in the present embodiment, as the first coolant temperature Tw decreases below the first standard temperature T1 and toward a further lower temperature, the inflow amount of the coolant flowing into the radiator 43 is gradually increased. Therefore, as already described in the case (C) "the coolant temperature Tw<the second standard temperature T2," heat is transferred from the discharged refrigerant not only to the outside air but also to the coolant, thereby enabling a gradual increase of the heat radiation amount for radiating heat from the discharged refrigerant.

Further, when the coolant temperature Tw decreases below the third standard temperature T3, i.e., in a dot hatching area of FIG. 11, the discharge amount of the coolant pump 41 is controlled to have a large flow amount again. Therefore, as already described in the case (C) "the coolant temperature Tw<the second standard temperature T2" in the first embodiment, by facilitating heat exchange between the discharged refrigerant and the coolant for radiating heat from the discharged refrigerant to both of the outside air and the coolant, the heat radiation amount from the discharged refrigerant is increased.

As described above, the heat exchange system of the present embodiment realizes an adequate heat exchange among the plural types of fluids (i.e., among a discharged refrigerant, a coolant, and an air) regardless of the temperature change of the coolant. Further, since the third standard temperature T3 is set according to the temperature of the discharged refrigerant from the refrigerant radiator 12, an adequate heat exchange among the plural types of fluids, even when the operation condition of the heat pump cycle 10 is changed.

Furthermore, among various controls of the coolant pump 41 in the present embodiment, a control to increase the discharge amount of the coolant pump 41 when the coolant temperature Tw decreases below the first standard temperature T1 may be abolished.

In other words, when the coolant temperature Tw is equal to or higher than the third standard temperature T3 and is equal to or lower than the first standard temperature T1 (i.e., 60 degrees Celsius) that is determined in the same manner as the first embodiment, the discharge amount of the coolant pump 41 may be controlled to have a small flow amount, and, when the coolant temperature Tw is lower than the third standard temperature T3, the discharge amount of the coolant pump 41 may be controlled to have a large flow amount.

Furthermore, among various controls of the coolant pump 41 the present embodiment, a control to increase the discharge amount of the coolant pump 41 to have a large flow amount when the coolant temperature Tw decreases below the third standard temperature T3 may be abolished.

In other words, when the coolant temperature Tw is equal to or lower than the first standard temperature T1 (i.e., 60 degrees Celsius), the discharge amount of the coolant pump 41 may be controlled to have a small flow amount in the first place, and then increased as the coolant temperature Tw further decreases below the first standard temperature T1.

Furthermore, the control of the present embodiment may be applied to the vehicular air conditioner 1 in the second and third embodiments. In such case, the three-way valve 42 of the second and third embodiments may be abolished, and a flow amount adjustment valve for adjusting a flow ratio between an inflow amount flowing into the radiator 43 and a bypass amount flowing into the bypass passage 44 may be used.

Then, by adjusting the operation of the flow amount adjustment valve by using the controller, the inflow amount of the coolant flowing into the radiator 43 is changed in the same manner as the present embodiment, for achieving the same effects as the present embodiment.

(Fifth Embodiment)

Figure 12:
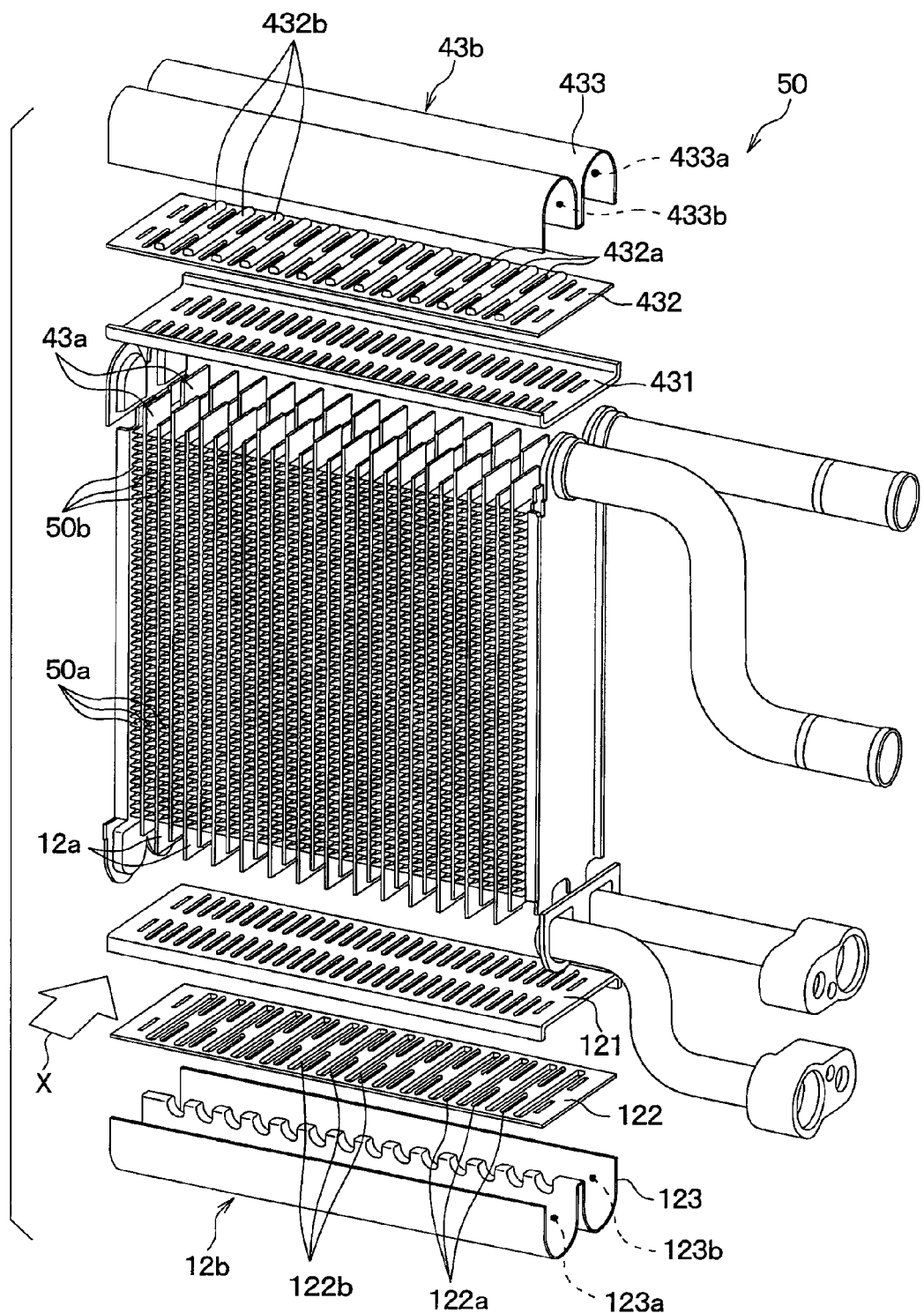
FIG. 12 is an exploded perspective view showing a part of the heat exchanger structure in a fifth embodiment.

In the present embodiment, the configuration of the heat exchanger structure 50 is modified as shown in a partially-exploded perspective view of the heat exchanger structure 50 of FIG. 12.

As for the heat medium tube 43a of the radiator 43 and as for the refrigerant tube 12a of the refrigerant radiator 12 for passing the refrigerant in the present embodiment, a flat tube having a flat shape cross section, which is taken along a perpendicular line perpendicular to a longitudinal direction of the tube 12a, is used. Further, the heat medium tube 43a and the refrigerant tube 12a are respectively formed in a two-row arrangement along the flow line of the outside air from the blower fan 13 which is indicated by the arrow X.

Figure 13:
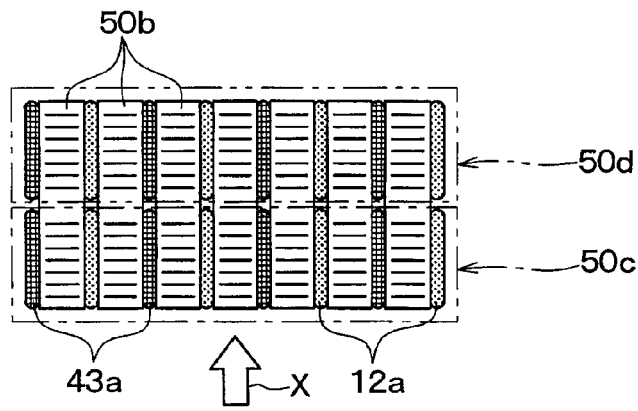
FIG. 13 is a schematic sectional view showing a header tank of the heat exchanger structure in a header-tank longitudinal direction according to the fifth embodiment.

FIG. 13 is a cross section of the header tank of the heat exchanger structure 50 in a header-tank longitudinal direction. For the clarity of distinction between the refrigerant tube 12a and the heat medium tube 43a in FIG. 13, the refrigerant tube 12a is shown by using a dot hatching and the heat medium tube 43a is shown by using a net hatching.

As shown in FIG. 13, an upstream side tube group 50c that is a group of tubes 12a, 43a on an upstream side (i.e., on an upwind side) of the outside air flow indicated by an arrow X has those tubes 12a, 43a alternatively layered with a predetermined gap interposed therebetween, with the outer surfaces of both tubes arranged to face with each other and arranged in parallel with each other. Similarly, a downstream side tube group 50d on an downstream side (i.e., on a downwind side) of the outside air flow indicated by an arrow X has those tubes 12a, 43a alternatively layered with a predetermined gap interposed therebetween.

The space in between the refrigerant tube 12a and the heat medium tube 43a forms the outside air passage 50a (i.e., a third fluid passage) that passes the outside air blown by the blower fan 13. In the outside air passage 50a, the outer fins 50b are arranged.

The refrigerant header tank part 12b and the heat medium header tank part 43b are described in the following. These tank parts 12b, 43b have basically the same configuration. As for the refrigerant header tank part 12b, three members are provided. That is, a refrigerant side fixation plate member 121 on which both of the two-row refrigerant tubes 12a and heat medium tubes 43a are fixed, a refrigerant side middle plate member 122 on which the refrigerant side fixation plate member 121 is fixed, and a refrigerant side tank formation member 123 are provided.

On the refrigerant side middle plate member 122, a plurality of dent parts 122b are formed, which form a plurality of gap spaces together with the refrigerant side fixation plate member 121 when the plate member 122 is fixed on the plate member 121, and the plurality of gap spaces allow communication with the heat medium tube 43a. The gap spaces serve as communication spaces for communication between the two heat medium tubes 43a which are arranged in two rows along the flow line of the outside air indicated by an arrow X.

Further, at positions corresponding to the refrigerant tubes 12a, the refrigerant side middle plate member 122 has communication through holes 122a that allow communication between an obverse side and a reverse side of the plate member 122, through which the refrigerant tubes 12a pass. In such manner, the refrigerant tubes 12a enter into a space that is defined by the refrigerant side tank formation member 123.

The refrigerant side tank formation member 123 forms a collection space 123a for collecting therein the refrigerant and a distribution space 123b for distributing the refrigerant by being fixed on the refrigerant side fixation plate member 121 and on the refrigerant side middle plate member 122. More practically, by using a press work, the refrigerant side tank formation member 123 is formed to have a two mountain shape (i.e., in a W shape) in a view from one of its longitudinal ends.

Then, a center part of the two mountain shape parts of the refrigerant side tank formation member 123 is connected to the refrigerant side middle plate member 122 for defining the collection space 123a and the distribution space 123b. The center part is formed to fit to a shape of the dent part 122b that is formed on the refrigerant side middle plate member 122, and the collection space 123a and the distribution space 123b are defined to prevent leakage of the refrigerant from connection portions that connect the spaces 123a, 123b with the refrigerant side fixation plate member 121 and with the refrigerant side middle plate member 122.

Further, the refrigerant tube 12a penetrates the refrigerant side middle plate member 122 through the communication through hole 122a to protrude into the collection space 123a or into the distribution space 123b, which allows communication between the refrigerant tube 12a positioned on the upwind side of the wind flow direction X of the outside air and the collection space 123a or which allows communication between the refrigerant tube 12a on the downwind side of the wind flow direction X of the outside air and the distribution space 123b.

On the other hand, the heat medium header tank part 43b has, similarly structured to the refrigerant header tank part 12b, a heat medium side fixation plate member 431, a heat medium side middle plate member 432 on which the heat medium side fixation plate member 431 is fixed, and a heat medium side tank formation member 433.

Further, between the heat medium side fixation plate member 431 and the heat medium side middle plate member 432, a refrigerant communication space is defined by having a dent part 432b, for the communication between the two refrigerant tubes 12a that are arranged in two rows along the flow direction X of the outside air.

Further, at positions corresponding to the heat medium tubes 43a, the heat medium side middle plate member 432 has communication through holes 432a that allow communication between an obverse side and a reverse side of the plate member 432, through which the heat medium tubes 43a pass.

Further, the heat medium side tank formation member 433 forms a collection space 433a for collecting the coolant and a distribution space 433b for distributing the coolant by being fixed on the heat medium side fixation plate member 431 and the heat medium side middle plate member 432. Further, in the present embodiment, the distribution space 433b is positioned on a upwind side of the flow direction X of the outside air, and the collection space 433a is positioned on the downwind side of the flow direction X of the outside air.

Therefore, in the heat exchanger structure 50 of the present embodiment, the refrigerant which has flowed into the distribution space 123b of the refrigerant header tank part 12b flows into the downwind side tube 12a of the refrigerant tubes 12a arranged in two rows along the flow direction X of the outside air.

Then, the refrigerant flowing out from the downwind side refrigerant tube 12a flows through the refrigerant communication space that is defined as a space between the heat medium side fixation plate member 431 and the heat medium side middle plate member 432 into the upwind side tube 12a of the refrigerant tubes 12a arranged in two rows along the flow direction X of the outside air.

Further, the refrigerant flowing out from the upwind side refrigerant tube 12a is collected in the collection space 123a of the refrigerant header tank part 12b, and then flows out to an outside. In other words, the heat exchanger structure 50 of the present embodiment passes a flow of the refrigerant from the downwind side refrigerant tube 12a, to the refrigerant communication space in the heat medium header tank part 43b, and to the upwind side refrigerant tube 12a, which may be designated as a U turn shape.

Similarly, the structure passes a flow of the coolant from the upwind side heat medium tube 43a, to a coolant communication space in the refrigerant header tank part 12b, to the downwind side heat medium tube 43a, which may also be designated as a U turn shape. Therefore, a flow direction of the refrigerant flowing in the refrigerant tube 12a and a flow direction of the coolant flowing in the heat medium tube 43a are opposite to each other in the tubes 12a and the tubes 43a which are arranged next to each other.

Further, the refrigerant side fixation plate member 121 and the refrigerant side tank formation member 133 are caulked and fixed with each other in a manner that binds the refrigerant side middle plate member 122 interposed therebetween, and, the heat medium side fixation plate member 431 and the heat medium side tank formation member 433 are caulked and fixed with each other in a manner that binds the heat medium side middle plate member 432 interposed therebetween.

Further, the heat exchanger structure 50 after the caulking is entirely put in a heating hearth and is heated, for melting a brazing filler material that is put on a surface of each of the components and for cooling to the brazing filler material to fix the components. The refrigerant radiator 12 and the radiator 43 are unified in such manner.

The configuration and the operation of the heat pump cycle 10 are similar to the other embodiments described above. Therefore, the heat exchange system of the present embodiment realizes, similar to the one in other embodiments, an adequate heat exchange that exchanges heat among the plural types of fluids (i.e., a refrigerant, a coolant, and an air) regardless of the temperature change of the coolant.

(Sixth Embodiment)

In the present embodiment, a control of the coolant pump 41 by the controller is changed from the other embodiment, with a focus of the embodiment put on a difficulty of enabling an adequate heat exchange among the fluids (i.e., a refrigerant, a coolant, and an air) when an increase of a temperature difference $\Delta TT$ between a temperature TT1 of the discharged refrigerant flowing into the heat exchanger structure 50 and a temperature TT2 of the coolant is observed. Further, the total configuration of the vehicular air conditioner 1 of the present embodiment is same as the one in the first embodiment in FIG. 1.

In the present embodiment, the discharge amount of the coolant pump 41 is changed according to the temperature difference $\Delta TT$ between the temperature TT1 of the discharged refrigerant and the temperature TT2 of the coolant.

Figure 14:
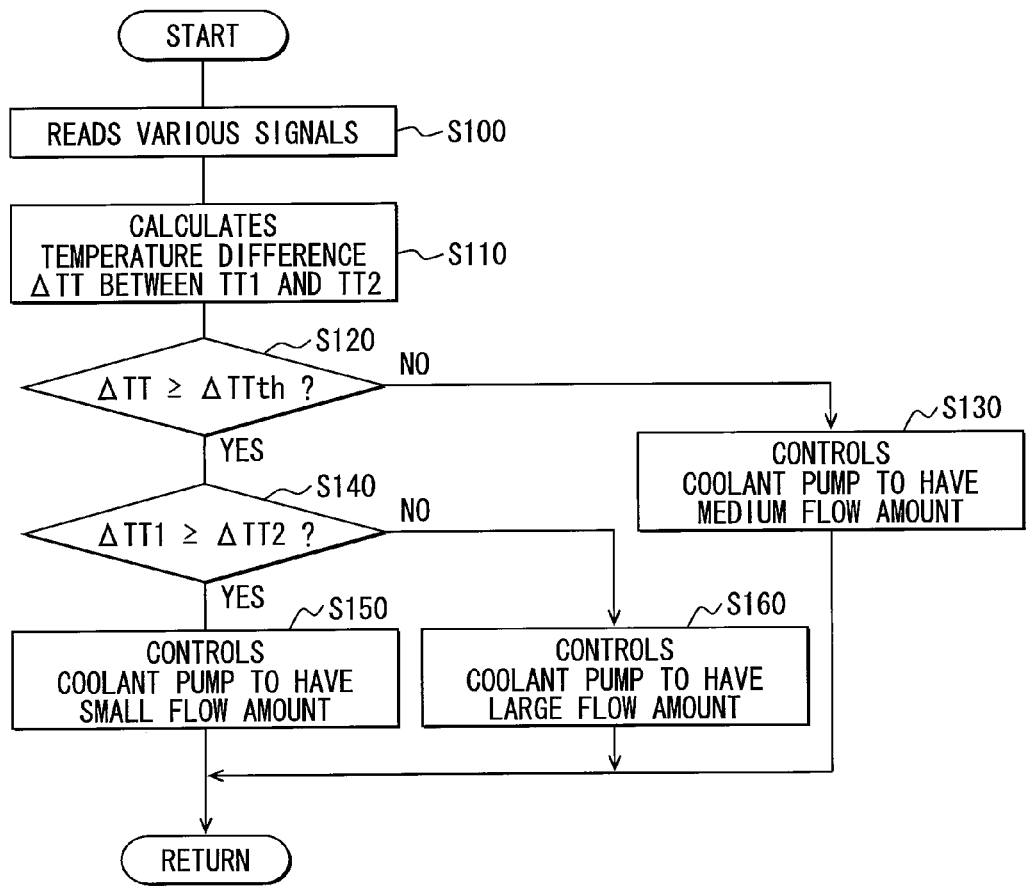
FIG. 14 is a flowchart showing a process for controlling a discharge amount of a coolant pump, which can be performed by a control device, according to a sixth embodiment.

FIG. 14 is a flowchart of a process for controlling the discharge amount of the coolant pump 41 which can be performed by the controller in the present embodiment. The control routine shown in FIG. 14 can be performed when the operation switch of the vehicular air conditioner 1 on the operation panel is put in an ON state.

As shown in FIG. 14, the controller reads various signals such as the detection signal of the discharged refrigerant temperature sensor and the detection signal of the coolant temperature sensor (S100). Then, the controller calculates the temperature difference $\Delta TT$ (i.e., an absolute value) between the temperature TT1 of the discharged refrigerant and the temperature TT2 of the coolant based on the detection signal of the discharged refrigerant temperature sensor and the detection signal of the coolant temperature sensor which are read in step S100 (S110).

Then, the process determines whether the temperature difference $\Delta TT$ between the temperature TT1 of the discharged refrigerant and the temperature TT2 of the coolant is equal to or greater than a predetermined standard temperature difference $\Delta TT$th (S120). The standard temperature difference $\Delta TT$th (S120) may be set to, for example, the temperature difference shown in the first embodiment (i.e., 10 degrees Celsius) or the like, which is a difference between the first standard temperature T1 and the second standard temperature T2.

When, as a result of the determination in step S120, it is determined that the temperature difference $\Delta TT$ between the temperature TT1 of the discharged refrigerant and the temperature TT2 of the coolant is smaller than the predetermined standard temperature difference $\Delta TT$th (S120:NO), the process controls the coolant pump 41 to have a medium flow amount G2, and dissipates heat from both of the discharged refrigerant and the coolant to the outside air (S130).

On the other hand, when, as a result of the determination in step S120, it is determined that the temperature difference $\Delta TT$ between the temperature TT1 of the discharged refrigerant and the temperature TT2 of the coolant is equal to or greater than the predetermined standard temperature difference $\Delta TT$th (S120:YES), the process further determines whether the temperature TT1 of the discharged refrigerant is equal to or higher than the temperature TT2 of the coolant (S140).

When, as a result of the determination in step S130, it is determined that the temperature TT1 of the discharged refrigerant is equal to or higher than the temperature TT2 of the coolant (S140:YES), the process controls the coolant pump 41 to have a small flow amount G1 (S150). In such manner, the heat exchange between the coolant in the radiator 43 and the outside air is restricted, thereby enabling an increase of the temperature of the coolant. Further, the small flow amount G1 is set to be an amount that is smaller than the medium flow amount G2 (G1<G2).

On the other hand, when, as a result of the determination in step S130, it is determined that the temperature TT1 of the discharged refrigerant is lower than the temperature TT2 of the coolant (S140:NO), the process controls the coolant pump 41 to have a large flow amount G3 (S160). In such manner the heat dissipation from the coolant flowing into the radiator 43 to the outside air is facilitated, to decrease the temperature of the coolant. Further, the large flow amount G3 is set to be an amount that is greater than the medium flow amount G2 (G2<G3).

In the present embodiment described above, when the temperature TT1 of the discharged refrigerant rises above the temperature TT2 of the coolant and the temperature difference ΔTT between the temperature TT1 of the discharged refrigerant and the temperature TT2 of the coolant becomes equal to or greater than the predetermined standard temperature difference ΔTTth, the coolant pump 41 is controlled to have the small flow amount G1 for restricting the heat exchange between the coolant and the outside air in the radiator 43, thereby enabling an increase of the coolant temperature. In such manner, the decreased of the temperature difference ΔTT between the temperature TT2 of the coolant flowing into the radiator 43 and the temperature TT1 of the discharged refrigerant flowing into the refrigerant radiator 12 is enabled. As a result, an adequate heat exchange for radiating heat to the outside air from the discharged refrigerant and from the coolant can be realized at the refrigerant radiator 12 and the radiator 43.

Further, in the present embodiment, when the temperature TT1 of the discharged refrigerant decreases below the temperature TT2 of the coolant and the temperature difference ΔTT between the temperature TT1 of the discharged refrigerant and the temperature TT2 of the coolant becomes equal to or greater than the predetermined standard temperature difference ΔTTth, the coolant pump 41 is controlled to have the large flow amount G3, thereby enabling a decrease of the coolant temperature by facilitating the heat dissipation from the coolant to the outside air at the radiator 43. In such manner, the decreased of the temperature difference ΔTT between the temperature TT2 of the coolant flowing into the radiator 43 and the temperature TT1 of the discharged refrigerant flowing into the refrigerant radiator 12 is enabled. As a result, an adequate heat exchange for radiating heat to the outside air from the discharged refrigerant and from the coolant can be realized at the refrigerant radiator 12 and the radiator 43.

As described above, the heat exchange system in the present embodiment realizes, in the same manner as the system in the other embodiments, an adequate heat exchange among the plural type fluids (i.e., a refrigerant, a coolant, and an air) without regards to the temperature change of the coolant.

Further, in the present embodiment, when the temperature difference ΔTT between the temperature TT1 of the discharged refrigerant and the temperature TT2 of the coolant becomes equal to or greater than the predetermined standard temperature difference ΔTTth, the discharge amount of the coolant pump 41 is controlled to have either the small flow amount G1 or the large flow amount G3 depending on the temperature relationship between the temperature TT1 of the discharged refrigerant and the temperature TT2 of the coolant. However, such control of the coolant pump 41 may be changed.

For example, the discharge amount of the coolant pump 41 may be changed only when the temperature difference ΔTT between the temperature TT1 of the discharged refrigerant and the temperature TT2 of the coolant becomes equal to or greater than the predetermined standard temperature difference ΔTTth and the temperature TT1 of the discharged refrigerant rises equal to or higher than the temperature TT2 of the coolant.

To the contrary, the discharge amount of the coolant pump 41 may be changed only when the temperature difference ΔTT between the temperature TT1 of the discharged refrigerant and the temperature TT2 of the coolant becomes equal to or greater than the predetermined standard temperature difference ΔTTth and the temperature TT1 of the discharged refrigerant decreases below the temperature TT2 of the coolant.

(Seventh Embodiment)

Figure 15:
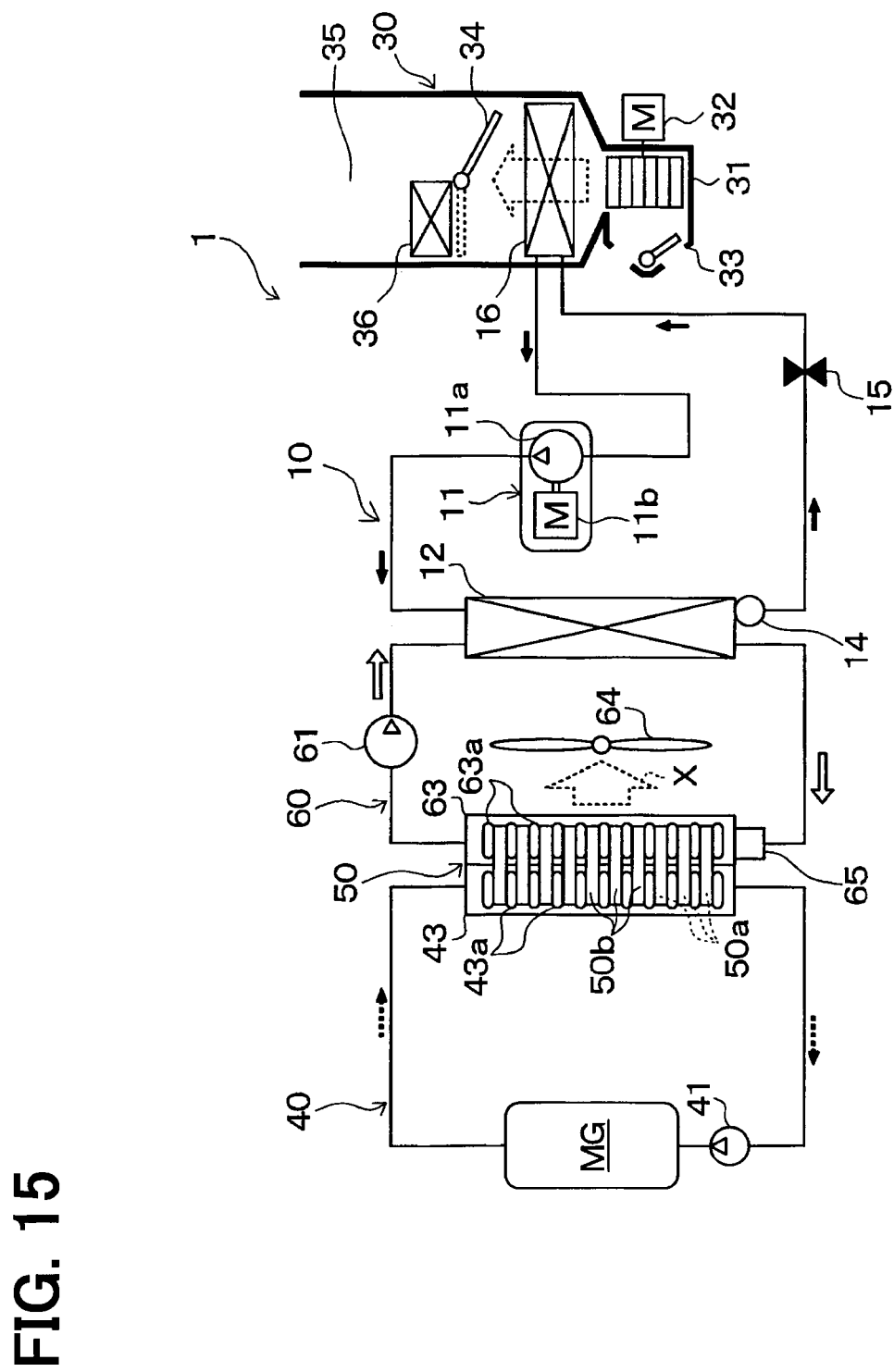
FIG. 15 is a schematic diagram of a total configuration of a vehicular air conditioner in a seventh embodiment.

The present embodiment is, as in configuration of the heat exchange system shown in FIG. 15, a modification of the first embodiment. The heat exchange system of the present embodiment includes, in addition to the heat pump cycle 10 and the coolant circulation circuit 40 in the first embodiment, a first coolant circulation circuit 60 for circulating a refrigerant coolant that cools the refrigerant passing through the refrigerant radiator 12 of the heat pump cycle 10. Further, for example, for the illustration purposes, the coolant for cooling the electric motor MG for traveling is designated as a motor coolant, and a circuit that circulates the motor coolant is designated as a second coolant circulation circuit 40, the coolant pump disposed in the second coolant circulation circuit 40 is designated as a second coolant pump 41, and the heat medium tube of the radiator 43 is designated as a second heat medium tube 43a, and the like.

At first, the heat pump cycle 10 of the present embodiment is described. The refrigerant radiator 12 of the heat pump cycle 10 is formed separately to have a different body from the radiator 43 in the second coolant circulation circuit 40. More practically, the refrigerant radiator 12 of the present embodiment is formed as a water-cooling type heat radiating heat exchanger that performs heat exchange between the discharged refrigerant discharged from the compressor 11 and the refrigerant coolant that is flowing in the first coolant circulation circuit 60, for radiating heat from the discharged refrigerant to the refrigerant coolant. Therefore, in the present embodiment, the blower fan 13 is abolished.

The first coolant circulation circuit 60 is a circulation circuit that circulates the refrigerant coolant for cooling the refrigerant that flows through the refrigerant radiator 12, i.e., by flowing in a coolant passage of the refrigerant radiator 12 the refrigerant coolant that serves as a first heat medium such as, for example, a water solution of ethylene-glycol, which may also be designated as a first heat medium circulation circuit.

In first coolant circulation circuit 60, a first coolant pump 61 that serves as a squeeze pump for press-flowing the refrigerant coolant into the coolant passage of the refrigerant radiator 12. The first coolant pump 61 is an electric-type water pump, and the number of rotations (i.e., a flow amount) of the pump 61 is controlled by a control signal output by the controller.

Further, in first coolant circulation circuit 60, a first coolant radiator 63 for cooling the first coolant is disposed on the outlet side of the coolant passage that is formed inside of the refrigerant radiator 12. The first coolant radiator 63 is a heat radiating heat exchanger that performs heat exchange between the refrigerant coolant (i.e., a first fluid) flowing out from the refrigerant radiator 12 and the outside air (i.e., a third fluid) blown by a blower fan 64 that is described later, for radiating heat from the refrigerant coolant to the outside air.

Here, the blower fan 64 is an electric fan that has an operation rate, i.e., the number of rotations (i.e., a blown air amount) controlled according to a control voltage output by the controller. Further, a refrigerant coolant temperature sensor 65 for detecting the temperature of the refrigerant coolant flowing into the first coolant radiator 63 is disposed on the inlet part of the first coolant radiator 63.

When the controller operates the first coolant pump 61, the first coolant circulation circuit 60 having the above configuration has the refrigerant coolant circulated therein from the first coolant pump 61, to the first coolant radiator 63, and to the first coolant pumps 61, as indicated by a white arrow in FIG. 15.

The first coolant radiator 63 of the present embodiment is formed in one unit together with the radiator 43 of the second coolant circulation circuit 40, to constitute the heat exchanger structure 50 by such one unit structure of the radiator 43 and the first coolant radiator 63. Further, the blower fan 64 of the present embodiment serves as an exterior blower unit to blow the outside air to both of the first coolant radiator 63 and the radiator 43.

The heat exchanger structure 50 of the present embodiment may be realized by replacing a component of the refrigerant radiator 12 of the heat exchanger structure 50 in each of the above-described embodiments with a component of the first coolant radiator 63.

More practically, the refrigerant tube 12a and the refrigerant header tank part 12b of the refrigerant radiator 12 in each of the above-described embodiments may be changed to the first heat medium tube 63a and the first heat medium header tank part (not illustrated) of the first coolant radiator 63 for circulating the refrigerant coolant. For example, the first heat medium tube 63a of the first coolant radiator 63 and the second heat medium tube 43a of the radiator 43 may be alternatively layered with a predetermined gap interposed therebetween, for defining the outside air passage 50a for passing the outside air that is blown by the blower fan 64 in a space between the tubes 63a, 43a. Further, the outer fins 50b may be disposed in the outside air passage 50a for connecting the outer surfaces of the tubes 63a, 43a.

Here, in the present embodiment, the first refrigerant coolant serves as the first heat medium (i.e., a first fluid), and the first coolant radiator 63 serves as a first heat medium radiator, and the motor coolant serves as the second heat medium (i.e., a second fluid), and the radiator 43 serves as a second heat medium radiator. Further, the second coolant pump 41 of the present embodiment serves as a second heat medium flow amount adjustment unit.

The operation of the present embodiment having the above configuration is described in the following. When the operation switch of the vehicular air conditioner is put in an ON state while the operation switch of the operation panel is put in an ON state, the controller controls the operation of each of the control object devices.

More practically, the controller controls the operation of each of the control object devices of the heat pump cycle 10 in the same manner as the first embodiment. Thus, the refrigerant of the heat pump cycle 10 flows in a solid line arrow direction in FIG. 15.

Further, the controller controls the operation of the first coolant pump 61 to have a predetermined discharge amount discharged therefrom, for press-flowing the refrigerant coolant to the refrigerant radiator 12 in the first coolant circulation circuit 60. Thus, the refrigerant coolant flows in a white arrow direction in FIG. 15.

Therefore, when the refrigerant coolant passes the refrigerant radiator 12 in the first coolant circulation circuit 60, the refrigerant coolant absorbs heat from the refrigerant passing through the refrigerant radiator 12 for cooling such refrigerant passing therethrough. Further, the refrigerant coolant which has absorbed heat from the refrigerant to have a temperature rise is then cooled by flowing into the first coolant radiator 63 for radiating heat to the outside air.

Further, regarding the second coolant circulation circuit 40, the controller controls the operation of the second coolant pump 41 to have a predetermined discharge amount discharged therefrom, according to the temperature of the motor coolant flowing into the radiator 43.

More practically, in the present embodiment, when the electric motor MG for traveling is in operation, the inflow amount of the motor coolant flowing into the radiator 43 is decreased by controlling the discharge amount of the coolant pump 41 to have the small flow amount in case that the temperature Tw of the motor coolant decreases below the lowest protection temperature Tlw, which is similar to the first embodiment, and the inflow amount of the motor coolant flowing into the radiator 43 is increased by controlling the discharge amount of the coolant pump 41 to have the large flow amount in case that the temperature Tw of the motor coolant rises above the highest protection temperature Thi.

Further, when the electric motor MG for traveling is not in operation, the discharge amount of the second coolant pump 41 is decreased to have the small flow amount in case that the detection value of the refrigerant coolant temperature sensor 65 (i.e., the temperature of the refrigerant coolant flowing into the first coolant radiator 63) rises equal to or higher than a predetermined first heat medium standard temperature Ta (e.g., 60 to 65 degrees Celsius) and the temperature of the motor coolant is equal to or higher than a predetermined fifth standard temperature T5 (e.g., 50 degrees Celsius) and is equal to or lower than a predetermined fourth standard temperature T4 (e.g., 60 degrees Celsius).

In such manner, even when the temperature of the motor coolant decreases to be equal to or lower than the fourth standard temperature T4 and the temperature difference between the temperature of the refrigerant coolant and the temperature of the motor coolant increases, an unwanted heat exchange between the refrigerant coolant and the motor coolant is restricted for efficiently radiating heat from the refrigerant coolant to the outside air.

Further, when the temperature of the motor coolant is equal to or lower than the fifth standard temperature T5, the discharge amount of the second coolant pump 41 is controlled to have the large flow amount. In such manner, when the temperature of the motor coolant decreases to be equal to or lower than the fifth standard temperature T5 and the temperature difference between the temperature of the refrigerant coolant and the temperature of the motor coolant increases by a large amount, heat exchange between the refrigerant coolant and the motor coolant is facilitated for radiating heat from the refrigerant coolant to both of the outside air and motor coolant.

In the present embodiment, the fourth standard temperature T4 is determined as a similar value as the first standard temperature T1 of the first embodiment, and the fifth standard temperature T5 is determined as a similar value as the second standard temperature T2 of the first embodiment. Further, as for the fourth standard temperature T4, it may be determined as a value that is lower than the temperature of the refrigerant coolant flowing into the first coolant radiator 63 (i.e., the maximum value in a temperature range for, for example, the refrigerant coolant) and is also lower than the temperature of the outside air flowing into the radiator 43. Further, the fifth standard temperature T5 may be set to the temperature that is lower than the fourth standard temperature T4.

As described above, the configuration of the present embodiment that dissipates heat from the discharged refrigerant from the compressor 11 through the first coolant circulation circuit 60 has substantially the same operation effects as the heat exchange system of the first embodiment. In other words, the heat exchange system of the present embodiment realizes an adequate heat exchange among the plural type fluids (i.e., a refrigerant coolant, a motor coolant, and an air) regardless of the temperature change of the motor coolant.

Further, the heat exchange system of the present embodiment may be modified in the following manner.

In the present embodiment, the temperature of the refrigerant coolant flowing into the first coolant radiator 63 is detected by the coolant temperature sensor 65. However, the configuration of the system is not limited to such form. The temperature of the refrigerant coolant flowing into the first coolant radiator 63 may be estimated from the pressure and/or temperature of the discharged refrigerant of the compressor 11, since the temperature of the refrigerant coolant flowing into the first coolant radiator 63 rises by absorbing heat from the refrigerant passing through the refrigerant radiator 12.

Further, in the present embodiment, the operation of the controller is described to control a situation, in which, the discharge amount of the second coolant pump 41 is decreased to have the small flow amount in case that the detection value of the refrigerant coolant temperature sensor 65 rises equal to or higher than the first heat medium standard temperature Ta and the temperature of the motor coolant is equal to or higher than the fifth standard temperature T5 (e.g., 50 degrees Celsius) and is equal to or lower than the fourth standard temperature T4. However, the operation of the controller is not limited to such form.

For example, as shown in the fourth embodiment, the discharge amount of the second coolant pump 41 may be controlled to have the small flow amount when the temperature of the motor coolant is equal to or higher than a sixth standard temperature T6 and is equal to or lower than the fourth standard temperature T4, and the discharge amount of the second coolant pump 41 may be increased as the temperature of the motor coolant further decreases below the fourth standard temperature T4. Further, the sixth standard temperature T6 is set to have a value that is calculated by subtracting a predetermined value (i.e., 10 degrees Celsius in the present embodiment) from the temperature of the refrigerant coolant flowing into the first coolant radiator 63.

In such manner, when the motor coolant temperature is equal to or higher than the sixth standard temperature T6 and is equal to or lower than the fourth standard temperature T4, the discharge amount of the second coolant pump 41 is decreased. Therefore, the outer fin 50b is used to dissipate heat from the refrigerant coolant to the outside air, for an efficient heat dissipation from the refrigerant coolant to the outside air.

In such case, since the sixth standard temperature T6 is set to have a value that is calculated by subtracting a predetermined temperature $\Delta T$ from the temperature of the refrigerant coolant flowing into the first coolant radiator 63, the sixth standard temperature T6 is set according to the temperature of the refrigerant coolant flowing into the first coolant radiator 63.

In such manner, as the temperature of the refrigerant coolant decreases, making it harder to heat the outside air by using the heat from the refrigerant coolant, the temperature difference between the sixth standard temperature T6 and the fourth standard temperature T4 is increased, thereby enabling the heat exchange between the refrigerant coolant and the outside air in a more effective and adequate manner by restricting the unwanted heat exchange between the refrigerant coolant and the motor coolant.

Further, as the motor coolant temperature decreases below the fourth standard temperature T4, the discharge amount of the second coolant pump 41 is increased. Therefore, heat is transferred from the refrigerant coolant not only to the outside air, but also to the motor coolant, for a gradual increase of the heat radiation amount from the refrigerant coolant.

Therefore, regardless of the temperature change of the motor coolant, the heat exchange system can be realized to perform an adequate heat exchange among the plural type fluids (i.e., a refrigerant coolant, a motor coolant, and an air).

Further, among the controls of the second coolant pump 41 in the present embodiment, a control for increasing the discharge amount of the coolant pump 41 may preferably be performed as the motor coolant temperature decreases below the fourth standard temperature T4. However, such a control may be abolished.

Further, among the controls of the second coolant pump 41, a control for controlling the discharge amount of the coolant pump 41 to have the large flow amount may preferably be performed as the motor coolant temperature decreases below the sixth standard temperature T6. However, such a control may be abolished.

Further, in the present embodiment, the discharge amount of the second coolant pump 41 may be changed, just like the sixth embodiment, according to the temperature of the refrigerant coolant flowing into the heat exchanger structure 50, the temperature of the motor coolant and the temperature difference between each of the coolants. Even in such manner, the heat exchange system can be realized to perform an adequate heat exchange among the plural type fluids (i.e., a refrigerant coolant, a motor coolant, and an air) regardless of the temperature change of the motor coolant.

Figure 16:
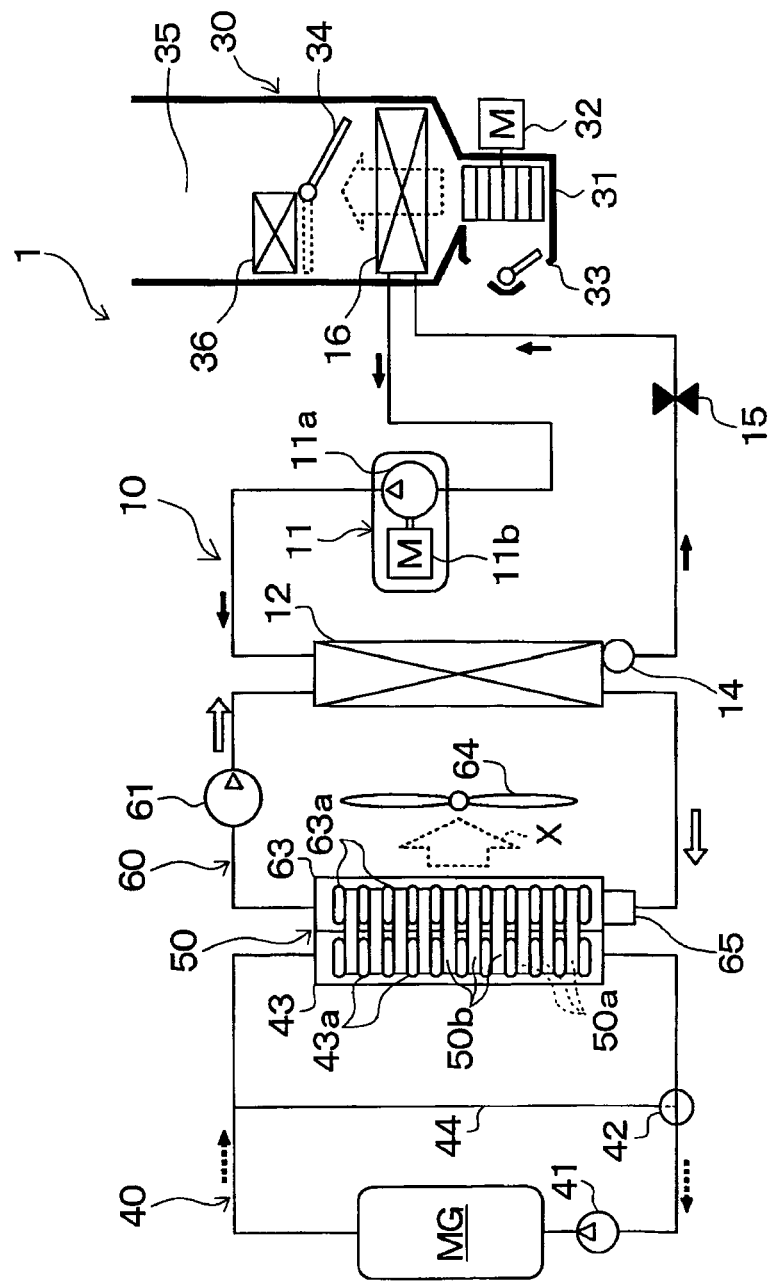
FIG. 16 is a schematic diagram of a total configuration of a vehicular air conditioner, which is partially modified according to the seventh embodiment.

Further, the second coolant circulation circuit 40 described in the present embodiment may be changed to the coolant circulation circuit 40 of the second embodiment. More practically, as shown in a total configuration in FIG. 16, the second coolant circulation circuit 40 may have an electric-type three-way valve 42 and a bypass passage 44 for allowing the second coolant to bypass the radiator 43. In such case, the three-way valve 42 serves as a second heat medium flow amount adjustment unit.

Further, the heat pump cycle 10 of the present embodiment may be changed to the heat pump cycle 10 described in the third embodiment which has the switchable refrigerant circuits.

(Other Embodiments)

The present disclosure is not limited to the above-described embodiments, and may be changed and modified in various manners within the scope of the present disclosure.

(1) In the above-described embodiment, a description of the heat exchange system is based on the following, that is, the refrigerant of the heat pump cycle 10 is used as a first fluid, and the coolant of the electric motor MG for traveling is used as a second fluid, and the outside air (i.e., an air) is used as a third fluid. However, the first to third fluids are not limited to the above. The present disclosure may effectively be applicable to a heat exchange among the plural type fluids when the first fluid has a higher temperature than the third fluid and the second fluid has a relatively large temperature change.

For example, the coolant for cooling an engine of a vehicle may be used as a first fluid. Further, when the vehicle is equipped with an exhaust gas recirculation system (i.e., an EGR system) for NOx reduction, a high temperature coolant flowing out from an EGR cooler for cooling the circulated exhaust gas may be used as the first fluid. Further, when the vehicle is equipped with a supercharger (i.e., a turbocharger), a high temperature coolant flowing out from an intercooler for cooling the compressed air that is compressed by the supercharger may also be used as the first fluid.

Further, a coolant of the engine, a coolant of an inverter, a coolant of a high-pressure battery, a low-temperature coolant flowing into the EGR cooler, a low-temperature coolant flowing into the intercooler and the like may all be used as the second fluid. In such case, the first and the fourth standard temperatures T1, T4 are set to be equal to or lower than the temperature of a fluid flowing into the heat exchanger structure 50.

Further, for example, when the low-temperature coolant flowing into the EGR cooler is used as the second coolant, the first and the fourth standard temperatures T1, T4 may be set to have a value that is equal to or lower than the maximum temperature in a temperature range of the coolant (i.e., about 300 degrees Celsius or lower than). Further, when the low-temperature coolant flowing into the intercooler is used as the second coolant, the first and the fourth standard temperatures T1, T4 may be set to have a value that is equal to or lower than the maximum temperature in a temperature range of the coolant (i.e., about 150 degrees Celsius or lower than).

(2) In the above-described embodiment, the electric motor MG for traveling is used as an external heat source for heating the coolant that serves as the second fluid. However, the external heat source is not limited to such device. For example, when the heat pump cycle 10 is applied to the vehicular air conditioner 1, an engine and/or an electric device such as an inverter for supplying electricity for the electric motor MG for traveling may be used as the external heat source.

Further, when the engine is used as the external heat source, heat not only from the engine coolant but also from the engine exhaust gas may be used as the external heat source. Further, when the heat pump cycle 10 is applied to a stationary air conditioner, a cooling/heating storage device, a cooling/heating device in a vending machine or the like, an engine, an electric motor and/or other electric apparatuses for operating a compressor of the heat pump cycle 10 may be used as the external heat source.

(3) In the above-described first and second embodiments, it is described that the electric heater 36 is used as a heating unit for heating the blowing air in the interior air conditioning unit 30. However, the heating unit is not limited to the electric heater 36. As shown in the third embodiment, a high-pressure refrigerant of the heat pump cycle may be used as the heating unit for heating the blowing air, or a heating heat exchanger (i.e., a heater core) that has other heat medium circulated therein may be used as the heating unit.

(4) The first embodiment describes a situation, in which, when the electric motor MG for traveling is not in operation and the coolant temperature Tw decreases below the lowest protection temperature Tlw, the inflow amount of the coolant flowing into the radiator 43 is decreased by decreasing the discharge amount of the coolant pump 41. However, regardless of the operation/non-operation of the electric motor MG, the inflow amount of the coolant flowing into the radiator 43 may be decreased according to the coolant temperature Tw. Such control is equally applicable to the other embodiments.

(5) In the above-described embodiment, the refrigerant tube 12a of the refrigerant radiator 12, the heat medium tube 43a of the radiator 43 and the outer fin 50b are made of aluminum (i.e., metal) and those parts are brazed by brazing. However, the outer fin 50b may be made of the other highly heat-conductive material, such as a carbon nanotube or the like, and the fin 50b may be connected by using a glue or the like.

(6) In the above-described first and the fifth embodiments, the heat exchanger structure 50 having alternatively-layered refrigerant tubes 12a and the heat medium tubes 43a is described. However, the layered arrangement of the refrigerant tubes 12a and the heat medium tubes 43a is not limited to such form.

Figure 17:
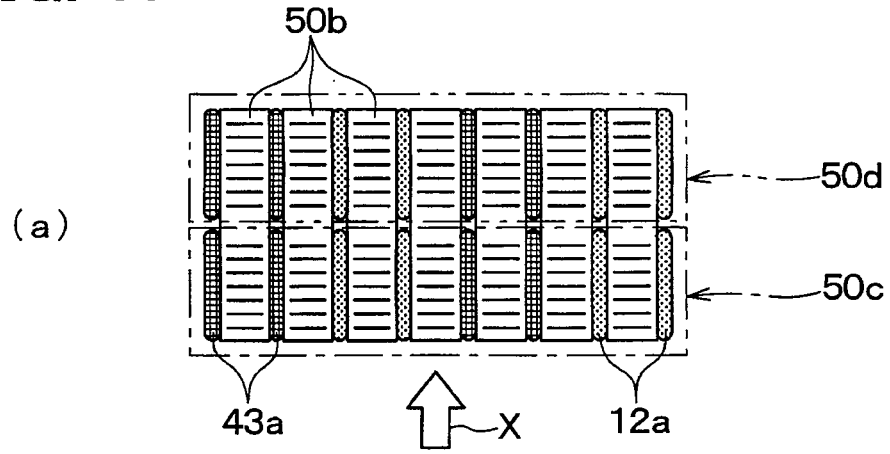
FIG. 17(a), (b), (c) are cross sections of a header tank in the heat exchanger structure in a longitudinal direction in other embodiments of the present disclosure.
Figure 17:
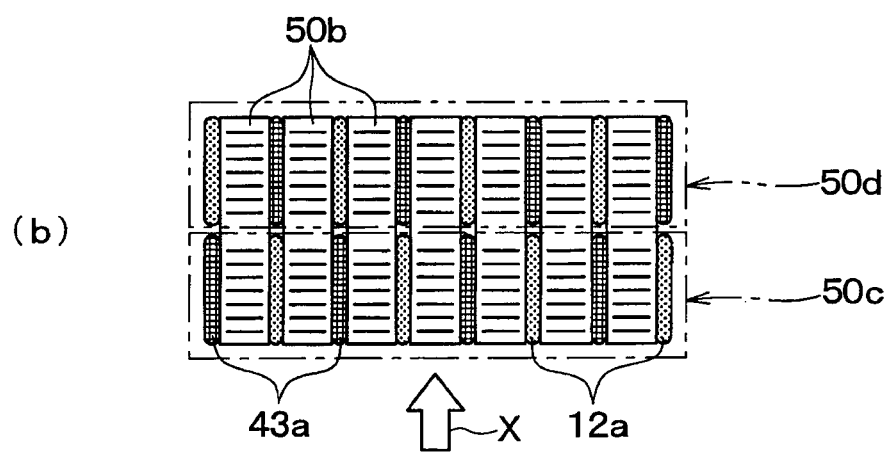
Figure 17:
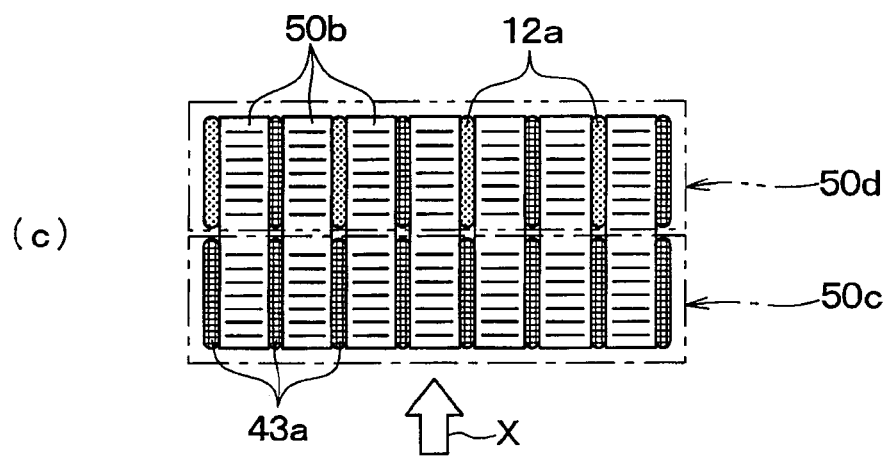

FIG. 17(a), 17(b), 17(c) are sectional views of the header tank seen from one of the longitudinal ends in the heat exchanger structure 50. In FIG. 17(a), 17(b), 17(c), the dot hatching is used to represent the refrigerant tube 12a and the net hatching is used to represent the heat medium tube 43a, for the clarity of illustration.

For example, the layered arrangement of the refrigerant tubes 12a and the heat medium tubes 43a may be formed as a successive layering of plural refrigerant tubes 12a which is followed by a successive layering of plural heat medium tubes 43a. More practically, as shown in FIG. 17(a), the two successive layers of the refrigerant tubes 12a may alternatively be layered with the two successive layers of the heat medium tubes 43a. The number of successive layers may be same for both of the refrigerant tube 12a and the heat medium tube 43a, or may be different for the refrigerant tube 12a and the heat medium tube 43a.

Further, as shown in FIG. 17(b), the upstream side tube group 50c may have an alternate arrangement of the refrigerant tube 12a and the heat medium tube 43a, and the downstream side tube group 50d may also have an alternate arrangement of the refrigerant tube 12a and the heat medium tube 43a, with two aligned tubes aligned in the flow direction X of the outside air being differed from each other. That is, the refrigerant tubes 12a and the heat medium tubes 43a may be arranged in a staggered manner.

Further, as shown in FIG. 17(c), the upstream side tube group 50c may have only the heat medium tubes 43a layered therein, and the downstream side tube group 50d may have an alternative arrangement of the refrigerant tubes 12a and the heat medium tubes 43a.

Such layered arrangement of the refrigerant tubes 12a and the heat medium tubes 43a may be applicable to the heat exchanger structure that has the first heat medium tube 63a and the second heat medium tube 43a described in the seventh embodiment.

(7) In the above-described embodiment, the refrigeration capacity of the heat pump cycle 10 may be improved by controlling the discharge amount of the coolant pump 41 (including the second coolant pump) by the controller.

For example, for a predetermined period after starting the heat pump cycle 10, the discharge amount of the coolant pump 41 may be increased. In such manner, the heat radiation amount from the discharged refrigerant is increased in the heat exchanger structure 50, thereby increasing the refrigeration capacity of the heat pump cycle 10 at the time of starting the heat pump cycle 10.

(8) In each of the above-described embodiments, it is exemplarily described that the discharge amount of the coolant pump 41 (including the second coolant pump) is controlled by the controller according to the temperature of each of the fluids flowing into the heat exchanger structure 50 or the like. However, the heat radiation amount of the refrigerant or the first coolant may be additionally controlled in the heat exchanger structure 50.

For example, in the first to sixth embodiments, when the temperature of the coolant flowing into the radiator 43 rises above the protection standard temperature $T\beta$ that is a value higher than the predetermined first standard temperature $T1$, the heat radiation amount from the refrigerant in the heat exchanger structure 50 may be decreased.

In such manner by decreasing the temperature of the discharged refrigerant, heat of the coolant is transferred to the outside air. Therefore, the increase of the temperature difference between the temperature of the discharged refrigerant and the temperature of the coolant is restricted, thereby enabling heat dissipation to the outside air from both of the discharged refrigerant and the coolant. Further, for example, the protection standard temperature $T\beta$ may be set to the highest protection temperature Thi.

A concrete example for decreasing the heat dissipation from the refrigerant in the heat exchanger structure 50 may be realized, for instance, by decreasing the rotation number of the compressor 11 for decreasing the refrigerant discharge capacity of the compressor 11. In such case, the electric motor 11b for controlling the number of rotations of the compressor 11 serves as a heat radiation amount adjustment unit.

Further, for example, a ratio of the inside air circulated in the vehicle and the outside air introduced from an outside of the vehicle may be controlled by using the inside/outside air switching device 33 in the interior air conditioning unit 30, for introducing an increased amount of the inside air into the vehicle compartment, which is the air conditioning object space. In such case, by introducing by an increased ratio of the inside air having the lower temperature than the outside air, a heat absorption amount by the refrigerant that is required for the evaporator 16 of the heat pump cycle 10 is decreased, thereby decreasing the heat load of the heat pump cycle 10. As a result, the decrease of the heat radiation amount from the refrigerant in the heat exchanger structure 50 can be realized. In such case, the inside/outside air switcher 33 serves as a heat radiation amount adjustment unit.

Further, even in the heat exchange system of the seventh embodiment, the decrease of the heat radiation amount from the refrigerant coolant in the heat exchanger structure 50 is enabled, because the temperature of the refrigerant coolant decreases according to the decrease of the number of rotations of the compressor 11 and/or the decrease of the temperature of the discharged refrigerant by the increase of the ratio of the introduced inside air.

As described above, by the decrease of the temperature of the refrigerant coolant, heat is transferred from the motor coolant to the outside air. In such manner, the increase of the temperature difference between the temperature of the refrigerant coolant and the temperature of the motor coolant is restricted, thereby enabling heat dissipation to the outside air from both of the refrigerant coolant and the motor coolant.

(9) In each of the above-described embodiments, it is described that the heat exchanger structure 50 is formed by combining two heating heat exchangers (i.e., the refrigerant radiator 12 is combined with the radiator 43, or the first coolant radiator 63 is combined with the radiator 43). However, the configuration is not limited to such combination. The heat exchanger structure 50 may be formed by combining three heat exchangers.

(10) In the above-described embodiment, an example of using a normal chlorofluorocarbon type refrigerant as a refrigerant is described. However, the type of refrigerant is not limited to the chlorofluorocarbon. That is, a natural refrigerant such as a carbon dioxide or a hydrocarbon type refrigerant may also be used.

What is claimed is:

1. A heat exchange system comprising:
a refrigerant radiator performing a heat radiation in which a discharged refrigerant that is discharged from a compressor of a heat pump cycle radiates heat, the heat radiation from the discharged refrigerant being caused by heat exchange between the discharged refrigerant and a first heat medium;
a first heat medium radiator having a plurality of first heat medium tubes in which the first heat medium flowing from the refrigerant radiator flows, the first heat medium radiator performing heat radiation in which the first heat medium radiates heat, the heat radiation being caused by heat exchange between the first heat medium and a heat exchange object fluid flowing in a heat exchange object fluid passage;
a second heat medium radiator having a plurality of second heat medium tubes in which a second heat medium flows, the second heat medium radiator performing heat radiation in which the second heat medium radiates heat, the heat radiation being caused by heat exchange between the second heat medium and the heat exchange object fluid;
a second-heat-medium flow amount adjustment unit which adjusts an inflow amount of the second heat medium flowing into the second heat medium radiator; and
an outer fin that is connected to an outer surface of the plurality of first heat medium tubes and an outer surface of the plurality of second heat medium tubes to facilitate heat exchange in both of the first heat medium radiator and the second heat medium radiator and to enable heat transfer between the first heat medium flowing in the plurality of first heat medium tubes and the second heat medium flowing in the plurality of second heat medium tubes, wherein
the plurality of first heat medium tubes include one first heat medium tube that is positioned between two adjacent tubes of the plurality of second heat medium tubes,
the plurality of second heat medium tubes include one second heat medium tube that is positioned between two adjacent tubes of the plurality of first heat medium tubes, and
the heat exchange object fluid passage is defined by a space that is provided at least between the one first heat medium tube and the one second heat medium tube,
a temperature of the first heat medium flowing into the first heat medium radiator is higher than a temperature of the heat exchange object fluid flowing into the first heat medium radiator,
a first standard temperature is set to be equal to or lower than the temperature of the first heat medium, and is set to be higher than a temperature of the heat exchange object fluid, and
the second-heat-medium flow amount adjustment unit
controls a heat exchange among the first heat medium, the second heat medium, and the heat exchange object fluid by changing the inflow amount of the second heat medium,
decreases the inflow amount of the second heat medium when a temperature of the second heat medium flowing into the second heat medium radiator is equal to or higher than a second standard temperature that is calculated by subtracting a predetermined temperature from the temperature of the first heat medium and is equal to or lower than the first standard temperature, as compared to an inflow amount of the second heat medium on a condition that the temperature of the second heat medium is higher than the first standard temperature or lower than the second standard temperature, and increases the inflow amount of the second heat medium as the temperature of the second heat medium decreases below the first standard temperature and causes the first heat medium to radiate heat to the second heat medium.

2. A heat exchange system comprising:

a first heat exchanger having a plurality of first tubes and performing heat radiation in which a first fluid radiates heat to a third fluid flowing in a third fluid passage by performing heat exchange between the first fluid and the third fluid;

a second heat exchanger having a plurality of second tubes and exchanging heat between a second fluid and the third fluid;

a second-fluid flow-amount adjustment unit which adjusts an inflow amount of the second fluid flowing into the second heat exchanger; and an outer fin that is connected to an outer surface of the plurality of first tubes and an outer surface of the plurality of second tubes to facilitate heat exchange in both of the first heat exchanger and the second heat exchanger, and to enable heat transfer between the first fluid flowing in the plurality of first tubes and the second fluid flowing in the plurality of second tubes, wherein the plurality of first tubes include one first tube that is positioned between two adjacent tubes of the plurality of second tubes, the plurality of second tubes include one second tube that is positioned between two adjacent tubes of the plurality of first tubes, the third fluid passage is defined by a space that is provided at least between the one first tube and the one second tube, a temperature of the first fluid flowing into the first heat exchanger and a temperature of the second fluid flowing into the second heat exchanger are higher than a temperature of the third fluid before flowing into the first heat exchanger and the second heat exchanger, the second-fluid flow-amount adjustment unit promotes a heat transfer from the first fluid and the second fluid to the third fluid while maintaining a temperature of the second fluid within a specified temperature range, the second-fluid flow-amount adjustment unit decreases the inflow amount of the second fluid when the temperature of the first fluid is equal to or higher than a temperature of the second fluid and when a temperature difference between the temperature of the first fluid and the temperature of the second fluid is equal to or greater than a predetermined standard temperature difference, the outer fin has an effective heat transfer area connected to the first heat exchanger, the effective heat transfer area provides where the first fluid radiates heat to the third fluid, and the second-fluid flow-amount adjustment unit increases or decreases the effective heat transfer area continuously to account for 50 percent to 99 percent of a surface area of the outer fin and adjusts the heat exchange amount between the first fluid and the second fluid, by changing the inflow amount of the second fluid depending on the temperature difference.

3. The heat exchange system of claim 2, wherein the second-fluid flow-amount adjustment unit increases the inflow amount of the second fluid when the temperature of the first fluid is lower than the temperature of the second fluid and the temperature difference is equal to or greater than the predetermined standard temperature difference.

4. The heat exchange system of claim 2, further comprising:

a heat-radiation-amount adjustment unit adjusting a heat radiation amount of heat possessed by the first fluid in the first heat exchanger, and the heat-radiation-amount adjustment unit decreases the heat radiation amount of heat when the temperature of the second fluid is higher than a predetermined protection standard temperature.

5. The heat exchange system of claim 4, wherein the first fluid is a discharged refrigerant that is discharged from a compressor of a heat pump cycle, and the heat-radiation-amount adjustment unit decreases a refrigerant discharge capacity of the compressor when the temperature of the second fluid is higher than the predetermined protection standard temperature.

6. The heat exchange system of claim 4, wherein the first fluid is a heat medium that is heated by heat possessed by a discharged refrigerant that is discharged from a compressor of a heat pump cycle, and the heat-radiation-amount adjustment unit decreases a refrigerant discharge capacity of the compressor when the temperature of the second fluid is higher than the predetermined protection standard temperature.

7. The heat exchange system of claim 4, wherein the heat exchange system is usable for an air conditioner that cools blowing air that is blown into an air conditioning object space by performing heat exchange between the blowing air and a refrigerant in an evaporator of a heat pump cycle, the first fluid is a heat medium that is heated by heat possessed by a discharged refrigerant that is discharged from a compressor of the heat pump cycle or the discharged refrigerant that is discharged from the compressor, and the heat-radiation-amount adjustment unit including an inside/outside air switching device decreases a heat load of the heat pump cycle by changing a ratio of an inside air and an outside air, in order to have a greater amount of the inside air than an amount of the outside air flowing into the evaporator when the temperature of the second fluid is higher than the predetermined protection standard temperature.

8. A heat exchange system comprising:

a first heat exchanger having a plurality of first tubes and performing a heat radiation in which a first fluid radiates heat to a third fluid flowing in a third fluid passage by performing heat exchange between the first fluid and the third fluid;

a second heat exchanger having a plurality of second tubes and exchanging heat between a second fluid and the third fluid;

a second-fluid flow-amount adjustment unit which adjusts an inflow amount of the second fluid flowing into the second heat exchanger; and an outer fin that is connected to an outer surface of the plurality of first tubes and an outer surface of the plurality of second tubes to facilitate heat exchange in both of the first heat exchanger and the second heat exchanger and to enable heat transfer between the first fluid flowing in the plurality of first tubes and the second fluid flowing in the plurality of second tubes, wherein the plurality of first tubes include one first tube that is positioned between two adjacent tubes of the plurality of second tubes, the plurality of second tubes include one second tube that is positioned between two adjacent tubes of the plurality of first tubes, the third fluid passage is defined by a space that is provided at least between the one first tube and the one second tube, a temperature of the first fluid flowing into the first heat exchanger and a temperature of the second fluid flowing into the second heat exchanger are higher than a temperature of the third fluid before flowing into the first heat exchanger and the second heat exchanger, the second-fluid flow-amount adjustment unit promotes a heat transfer from the first fluid and the second fluid to the third fluid while maintaining the temperature of the second fluid within a specified temperature range, adjusts a heat exchange amount between the first fluid and the third fluid by changing the inflow amount of the second fluid depending on a temperature difference between the temperature of the first fluid and the temperature of the second fluid, and decreases the inflow amount of the second fluid when the temperature of the first fluid is equal to or higher than the temperature of the second fluid and when the temperature difference is equal to or greater than a predetermined standard temperature difference, the outer fin has an effective heat transfer area connected to the first heat exchanger, the effective heat transfer area provides where the first fluid radiates heat to the third fluid, and the second-fluid flow-amount adjustment unit increases or decreases the effective heat transfer area continuously to account for 50 percent to 99 percent of a surface area of the outer fin and adjusts the heat exchange amount between the first fluid and the second fluid, by changing the inflow amount of the second fluid depending on the temperature difference.

9. The heat exchange system of claim 8, wherein
the second-fluid flow-amount adjustment unit increases the inflow amount of the second fluid when the temperature of the first fluid is lower than the temperature of the second fluid and the temperature difference is equal to or greater than the predetermined standard temperature difference.

10. The heat exchange system of claim 8, wherein
the second-fluid flow-amount adjustment unit changes the heat exchange amount between the first fluid and the third fluid indirectly by changing the inflow amount of the second fluid on a condition that the first fluid and the second fluid are flowing in the first heat exchanger and the second heat exchanger respectively.

11. The heat exchange system of claim 2, wherein
the first fluid is a refrigerant circulating in a heat pump cycle, and
the second fluid is a cooling water circulating in a coolant circuit.

12. The heat exchange system of claim 11, wherein
the heat pump cycle cools an air, which is blown into a vehicle compartment of a vehicle, by performing a heat exchange between the air and the refrigerant in an evaporator disposed in the heat pump cycle, and
the coolant circuit cools a motor by performing a heat exchange between the cooling water and an outside air drawn from an outside of the vehicle.

13. The heat exchange system of claim 8, wherein
the first fluid is a refrigerant circulating in a heat pump cycle, and
the second fluid is a cooling water circulating in a coolant circuit.

14. The heat exchange system of claim 13, wherein
the heat pump cycle cools an air, which is blown into a vehicle compartment of a vehicle, by performing a heat exchange between the air and the refrigerant in an evaporator disposed in the heat pump cycle, and
the coolant circuit cools a motor by performing a heat exchange between the cooling water and an outside air drawn from an outside of the vehicle.

\* \* \* \* \*